(12) United States Patent
Ong

(10) Patent No.: US 8,031,278 B2
(45) Date of Patent: Oct. 4, 2011

(54) PIXELS USING ASSOCIATED DOT POLARITY AND ASSOCIATED DOT SWITCHING ELEMENTS FOR MULTI-DOMAIN VERTICAL ALIGNMENT LIQUID CRYSTAL DISPLAYS

(75) Inventor: Hiap L. Ong, Diamond Bar, CA (US)

(73) Assignee: Hiap L. Ong and Kyoritsu Optronics Co., Ltd. (TW)

( * ) Notice: Subject to any disclaimer, the term of this patent is extended or adjusted under 35 U.S.C. 154(b) by 544 days.

(21) Appl. No.: 12/131,005

(22) Filed: May 30, 2008

(65) Prior Publication Data

US 2009/0040403 A1 Feb. 12, 2009

Related U.S. Application Data

(63) Continuation of application No. 11/751,454, filed on May 21, 2007, which is a continuation-in-part of application No. 11/227,595, filed on Sep. 15, 2005, now Pat. No. 7,630,033.

(60) Provisional application No. 60/779,815, filed on May 22, 2006, provisional application No. 60/779,843, filed on May 22, 2006.

(51) Int. Cl.
*G02F 1/141* (2006.01)
*G02F 1/1343* (2006.01)

(52) U.S. Cl. ............. 349/37; 349/143; 349/48; 349/108
(58) Field of Classification Search .................. 349/108, 349/106, 143, 144, 145, 48, 43, 37
See application file for complete search history.

(56) References Cited

U.S. PATENT DOCUMENTS 7,589,703 B2 * 9/2009 Su .................................. 345/87

* cited by examiner

*Primary Examiner* — Thoi V Duong
(74) *Attorney, Agent, or Firm* — Silicon Valley Patent Group, LLP; Edward S. Mao

(57) ABSTRACT

A multi-domain vertical alignment liquid crystal display that does not require physical features on the substrate (such as protrusions and ITO slits) is disclosed. Each pixel of the MVA LCD is subdivided into color components, which are further divided into color dots. The drive component areas, i.e. where switching elements and storage capacitors are located, are converted to associated dots by adding an electrode that can be electrically biased. The voltage polarity of the color dots and associated dots are arranged so that fringe fields in each color dot causes multiple liquid crystal domains in each color dot. Specifically, the color dots and associated dots of a pixel are arranged so that associated dots have opposite polarity as compared to neighboring color dots.

25 Claims, 53 Drawing Sheets

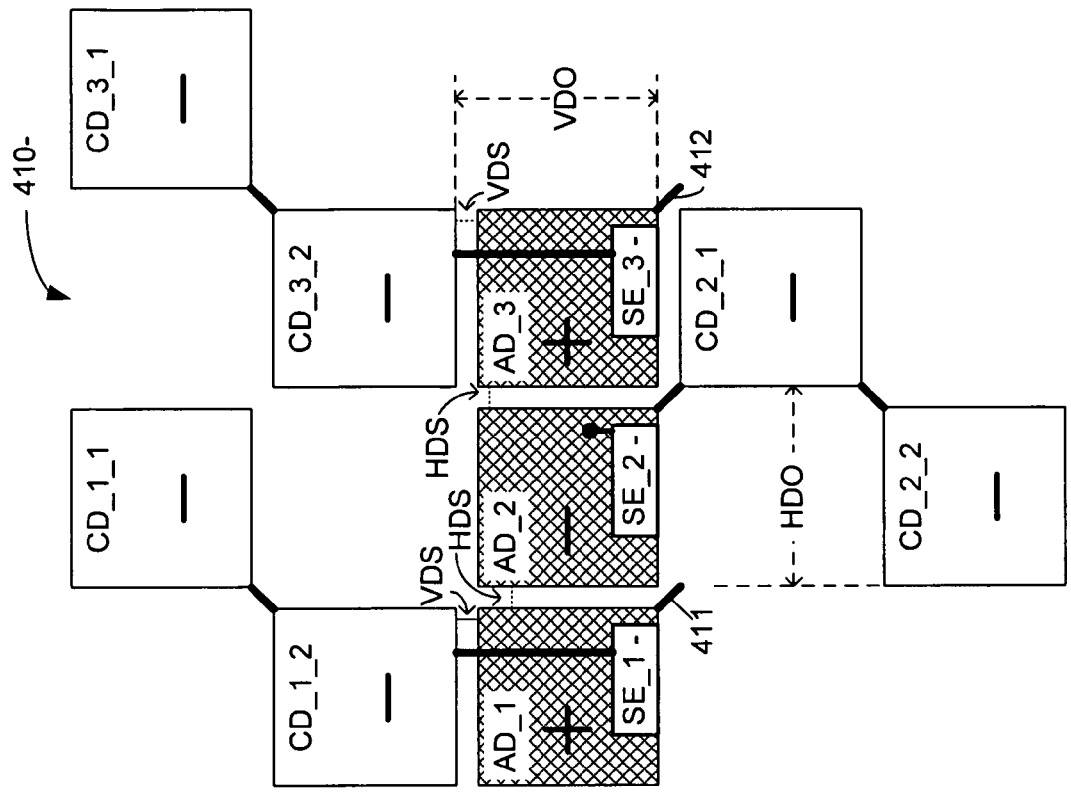
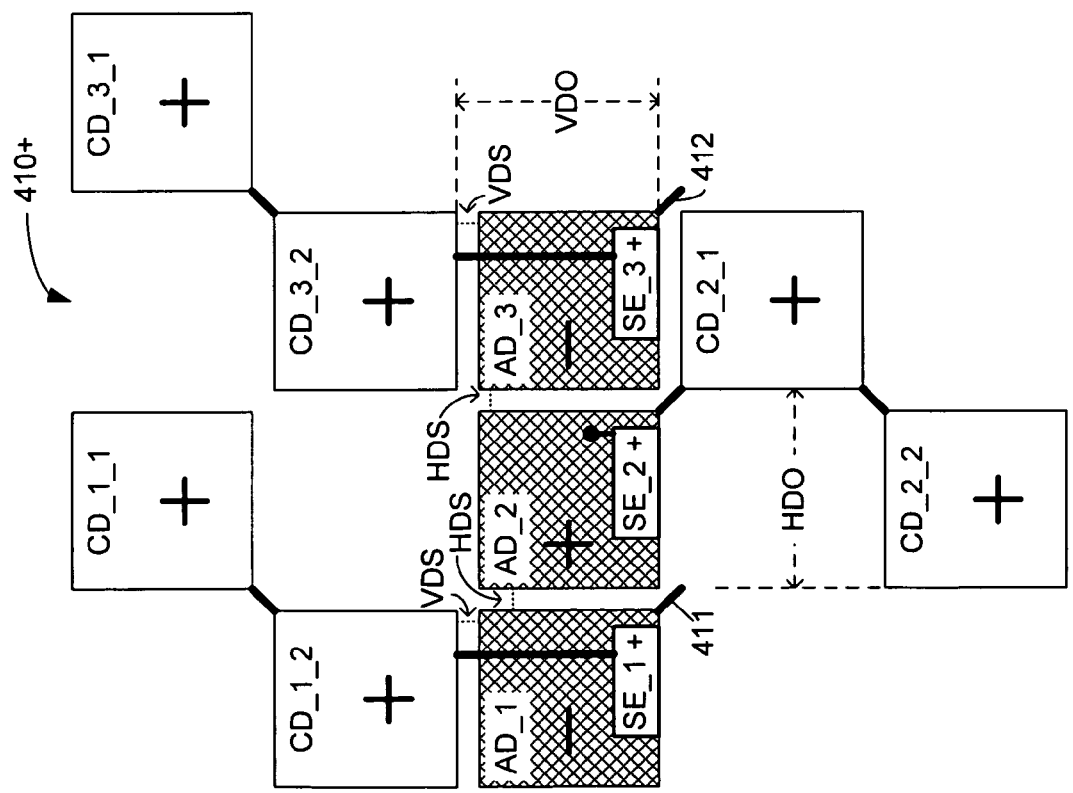

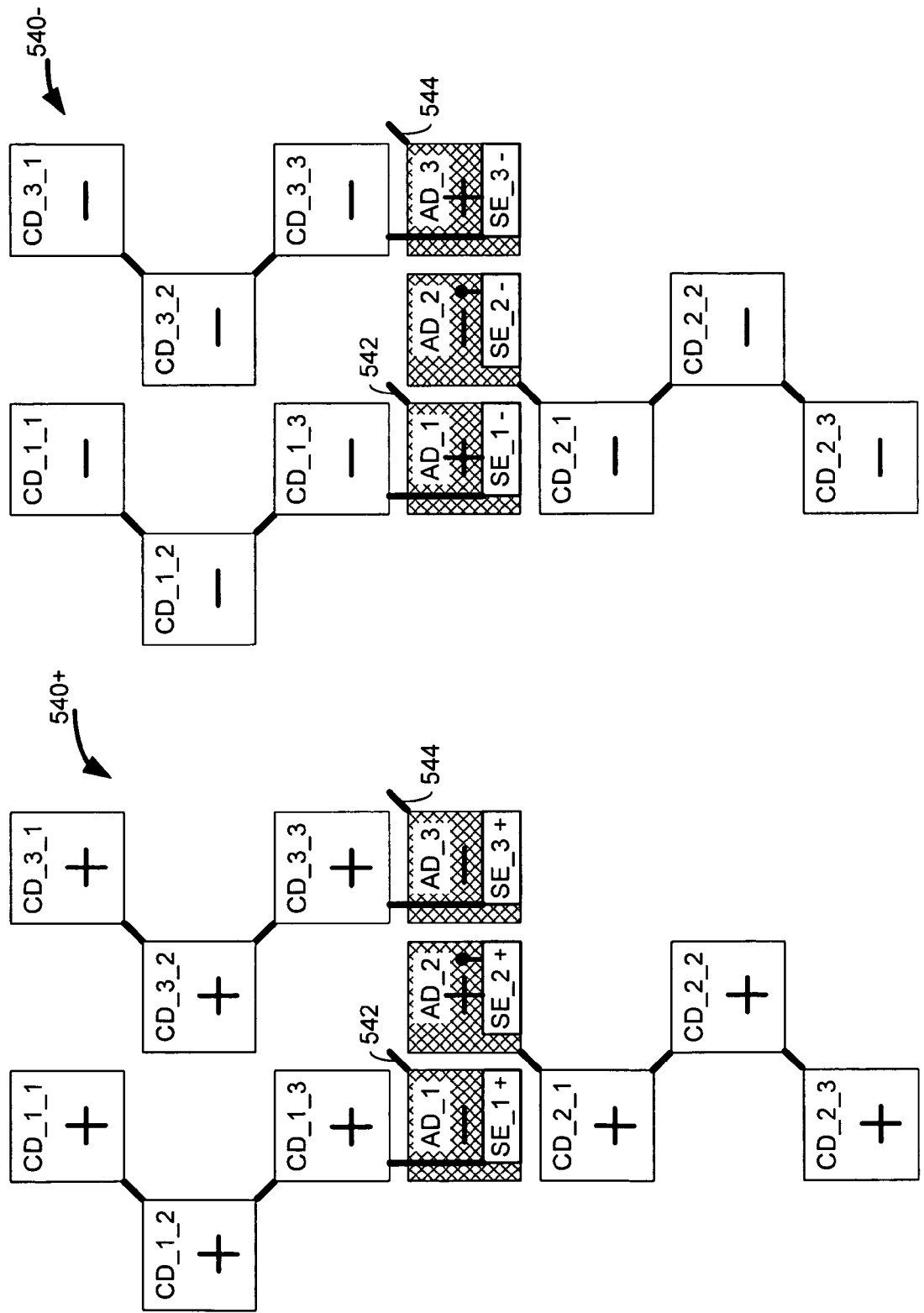

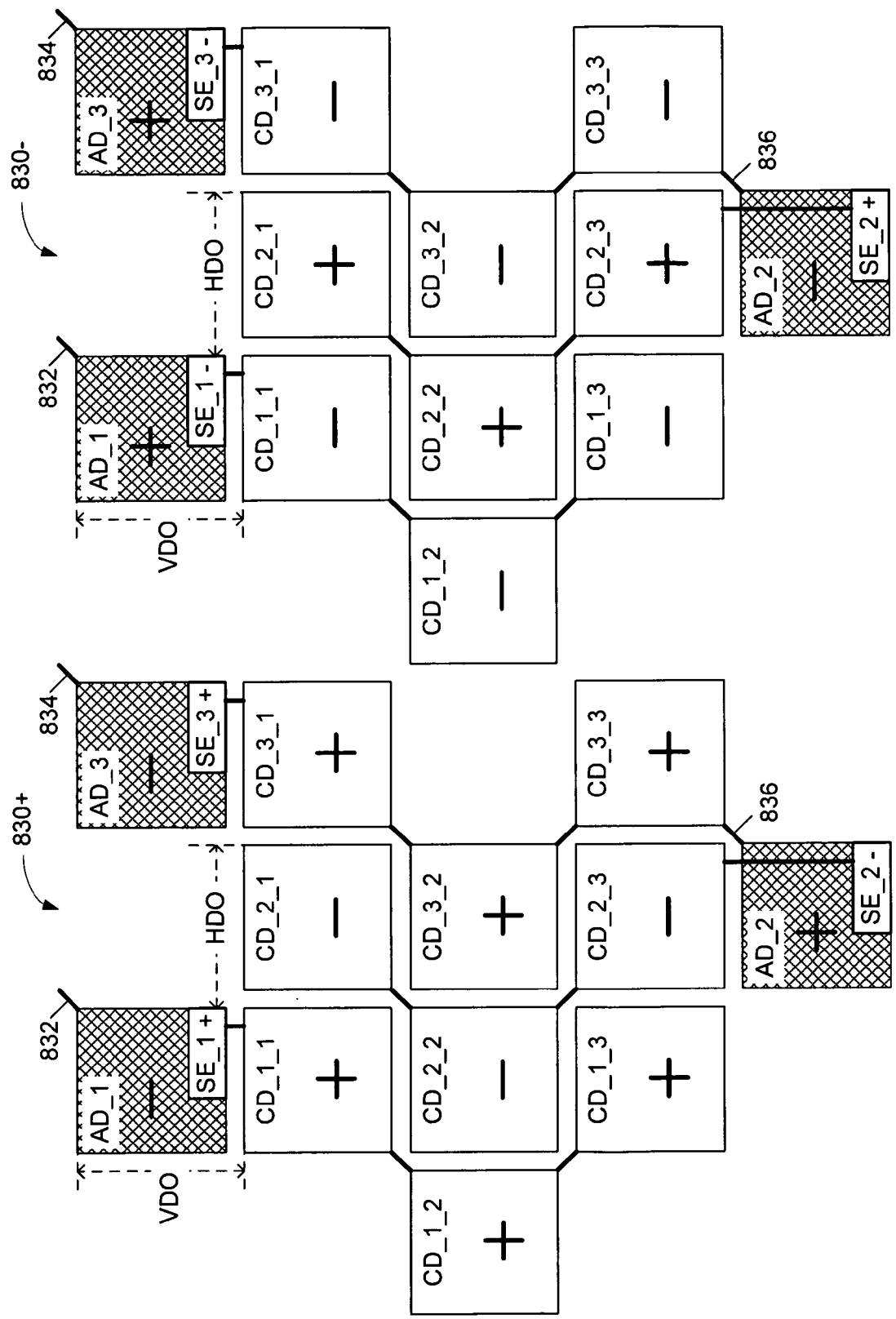

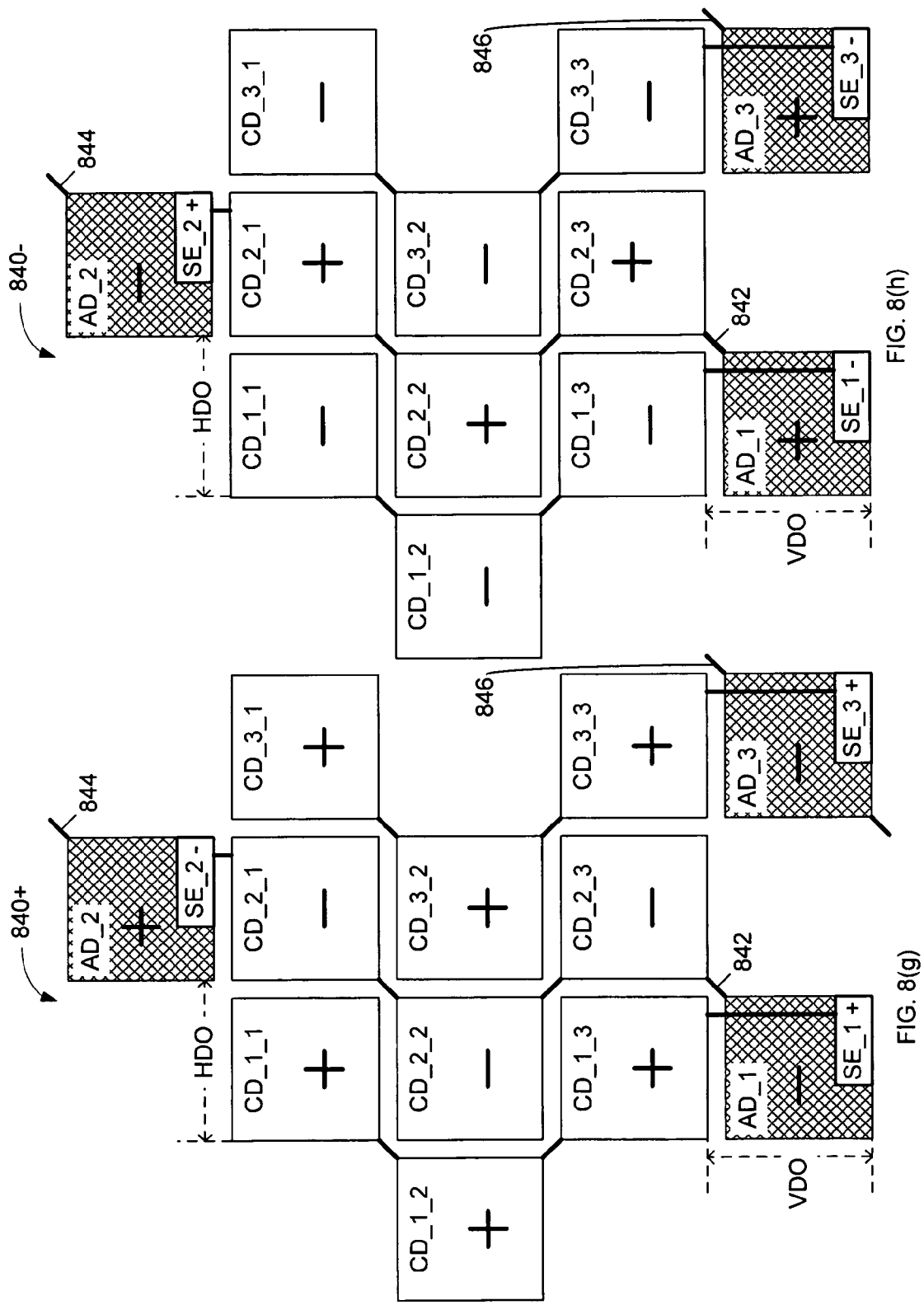

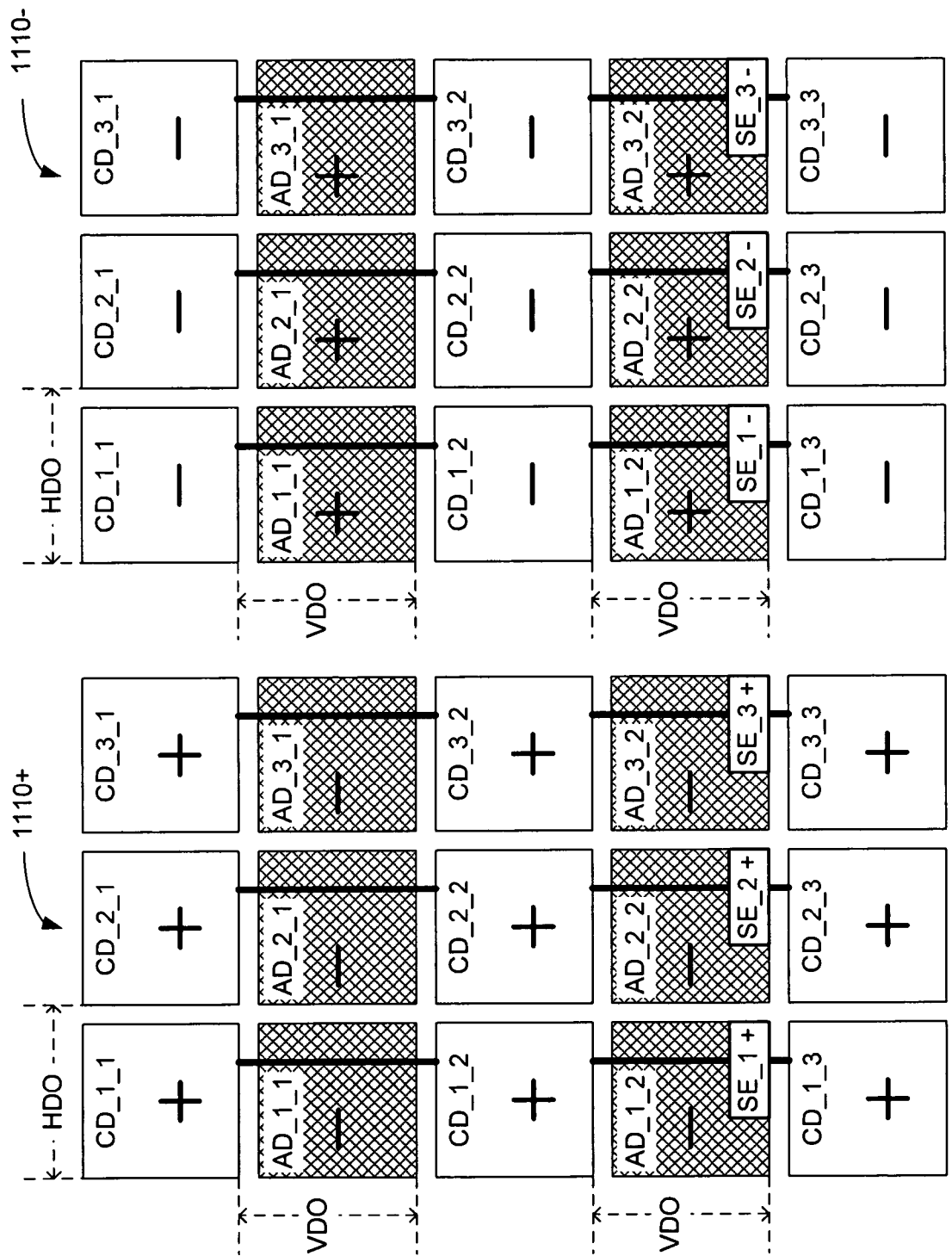

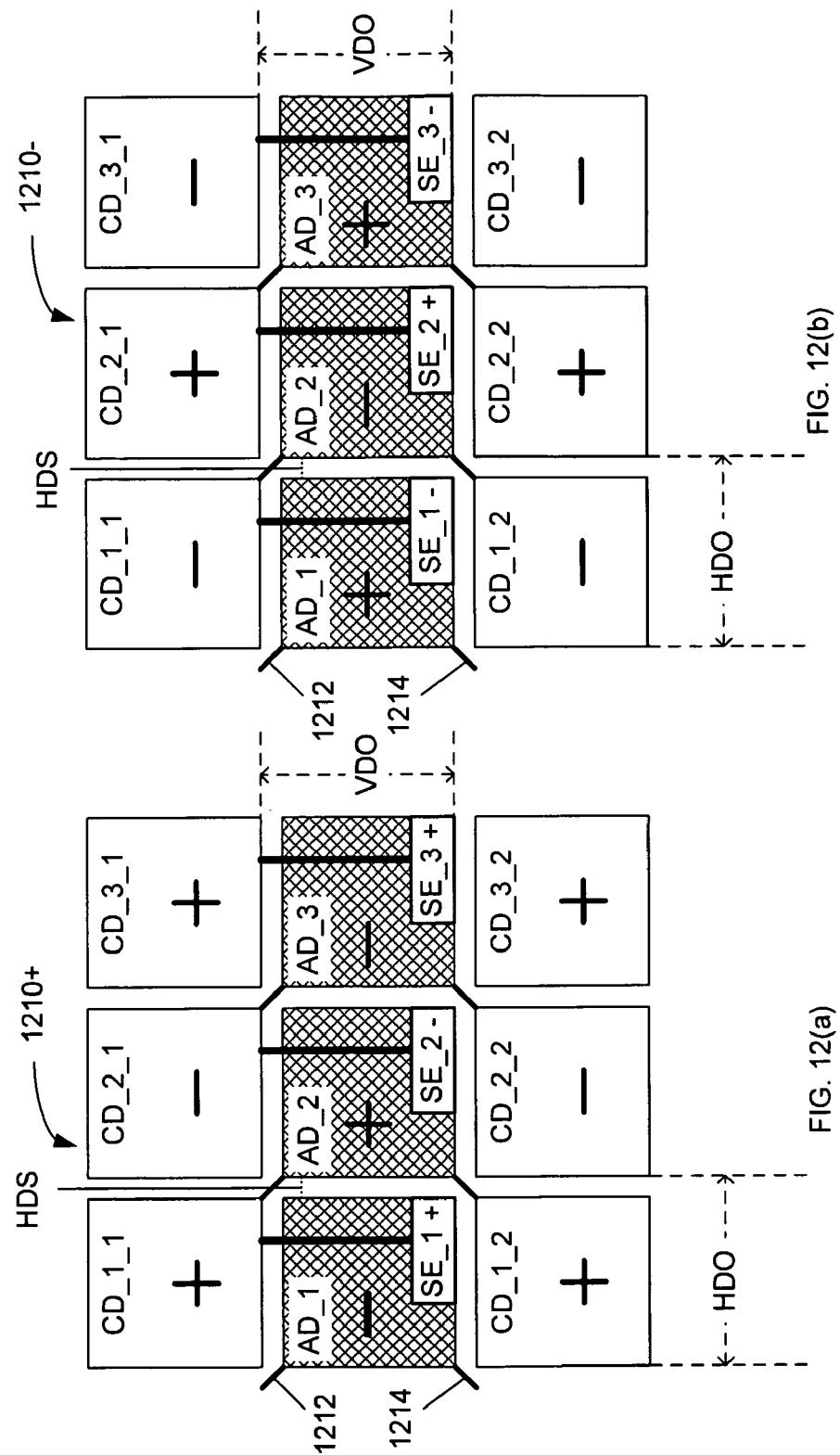

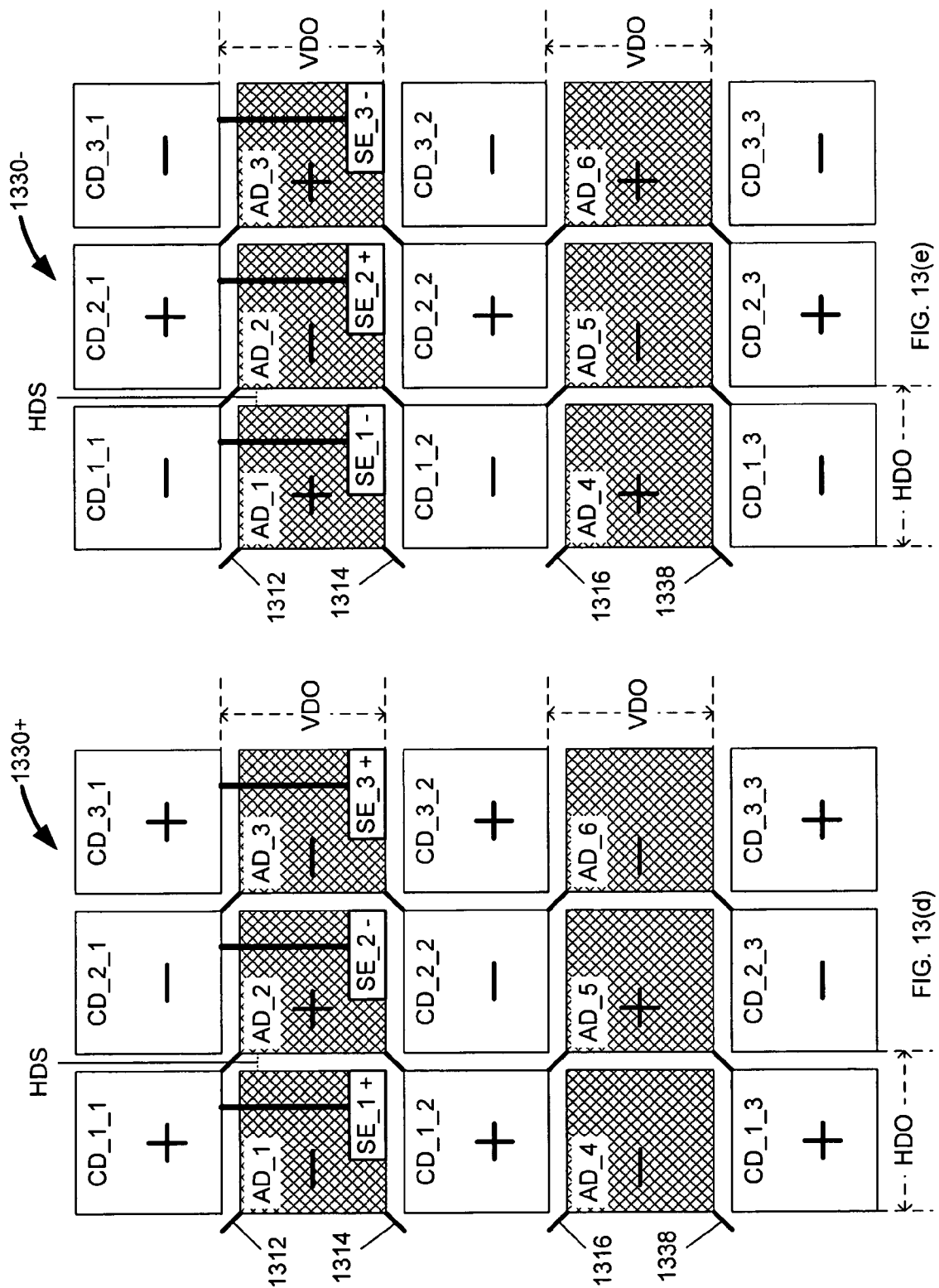

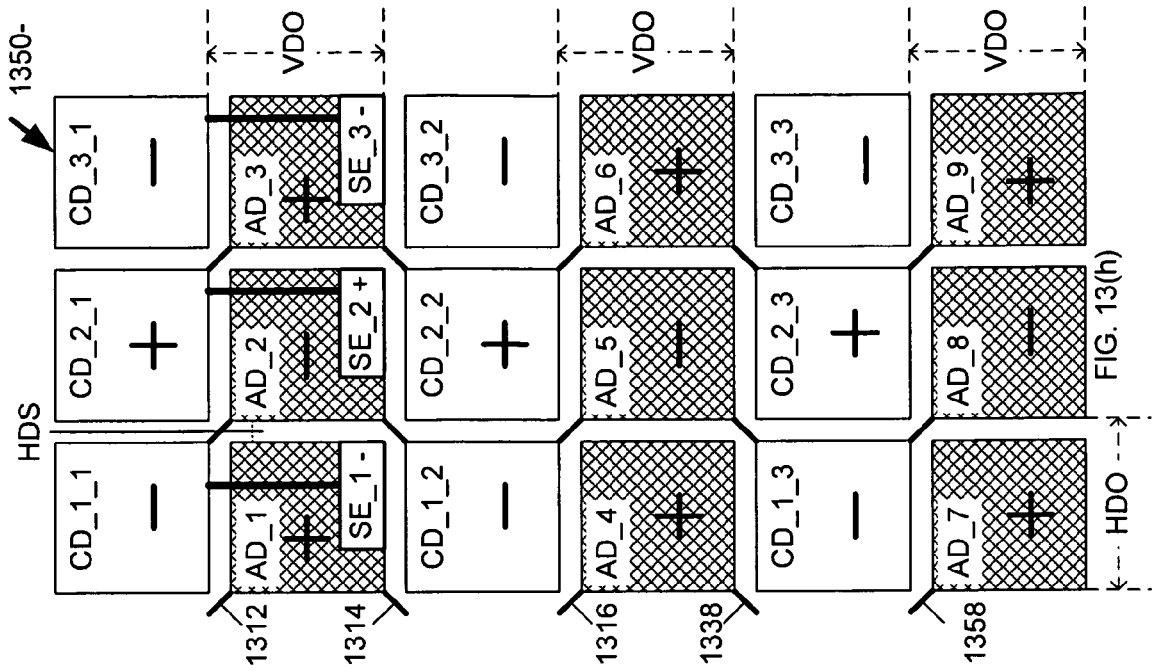
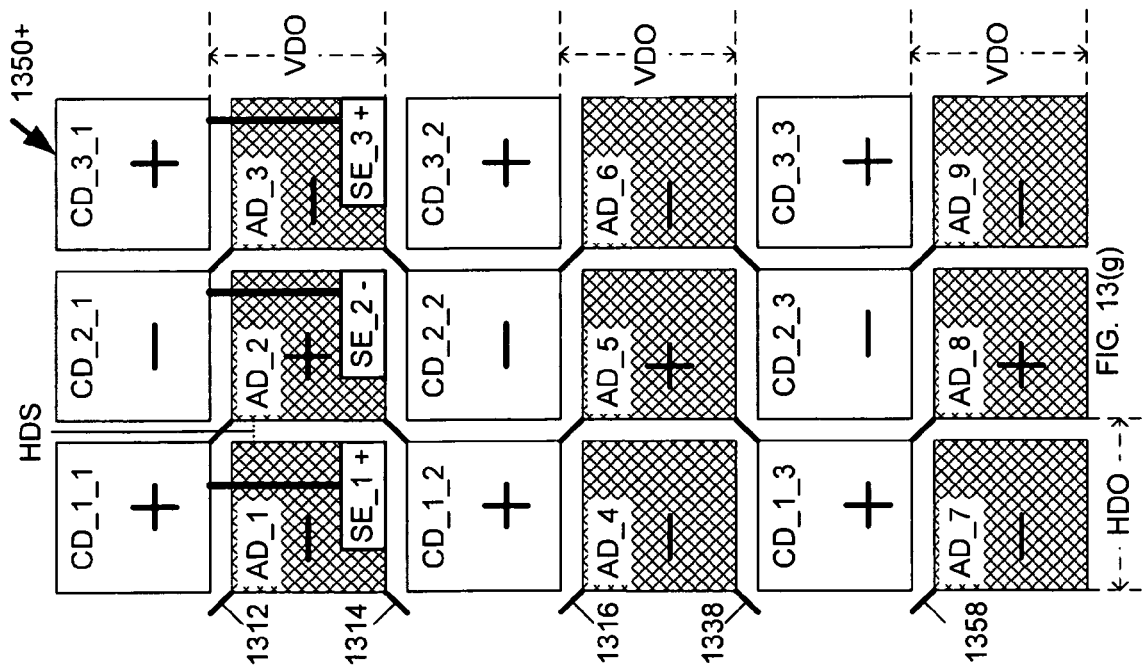

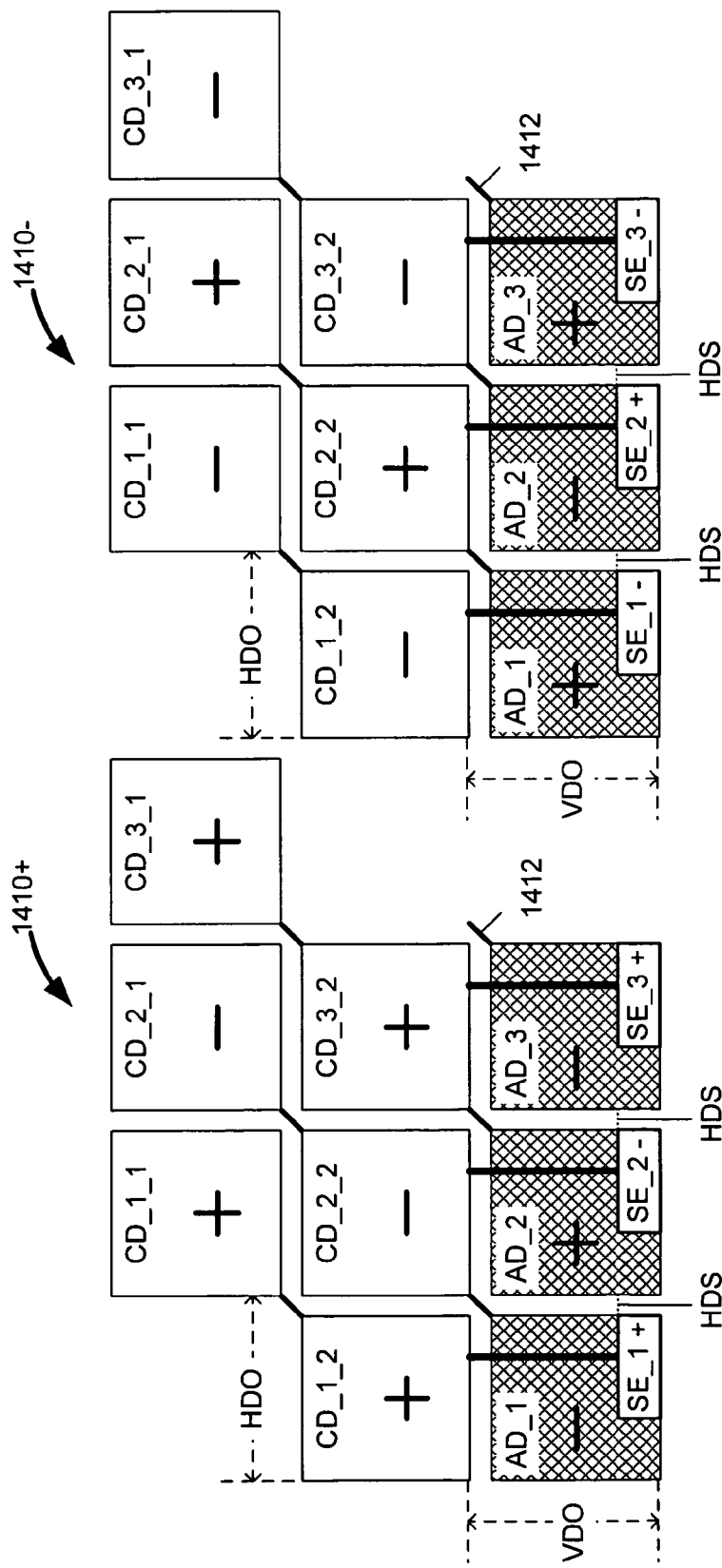

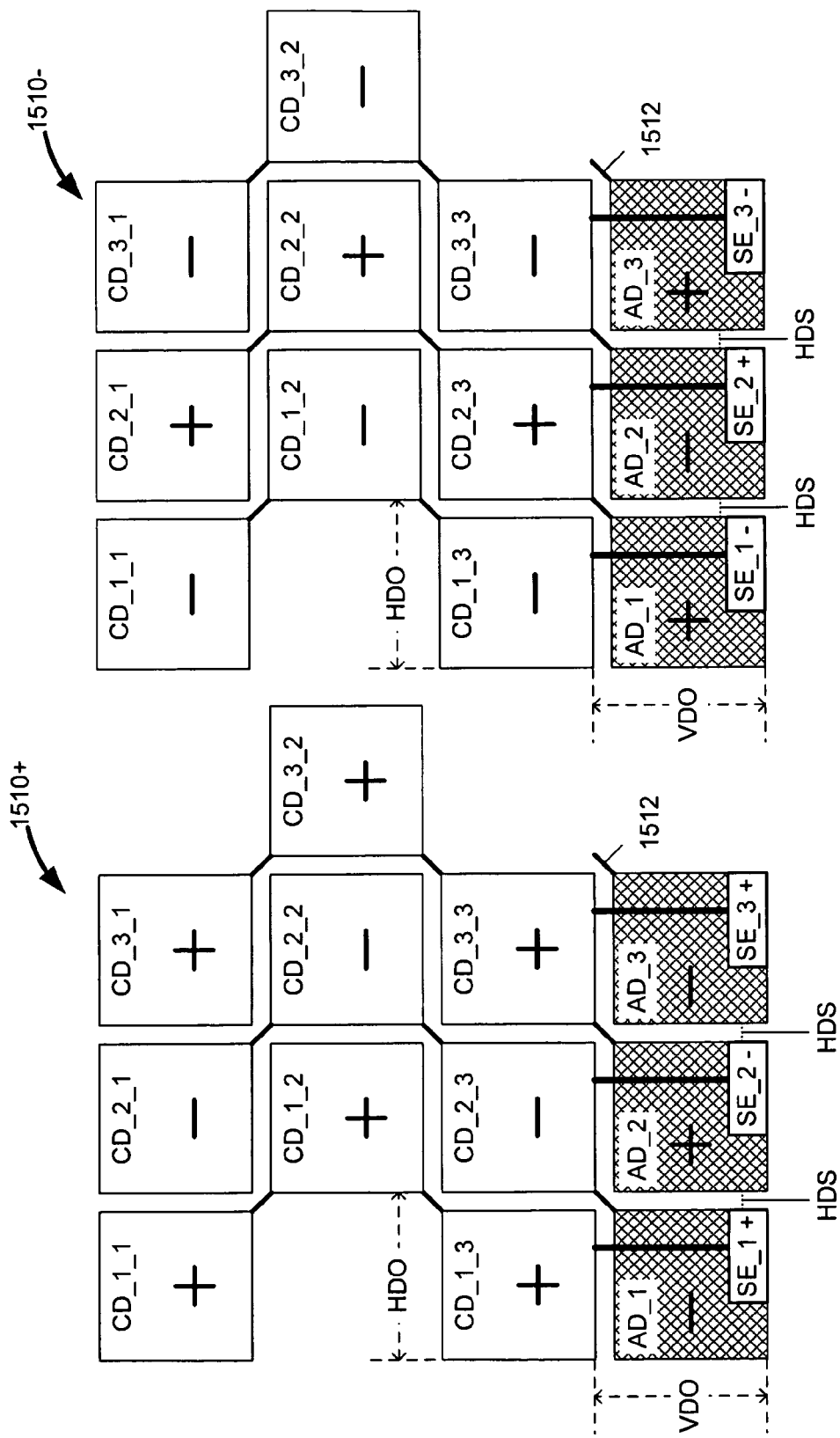

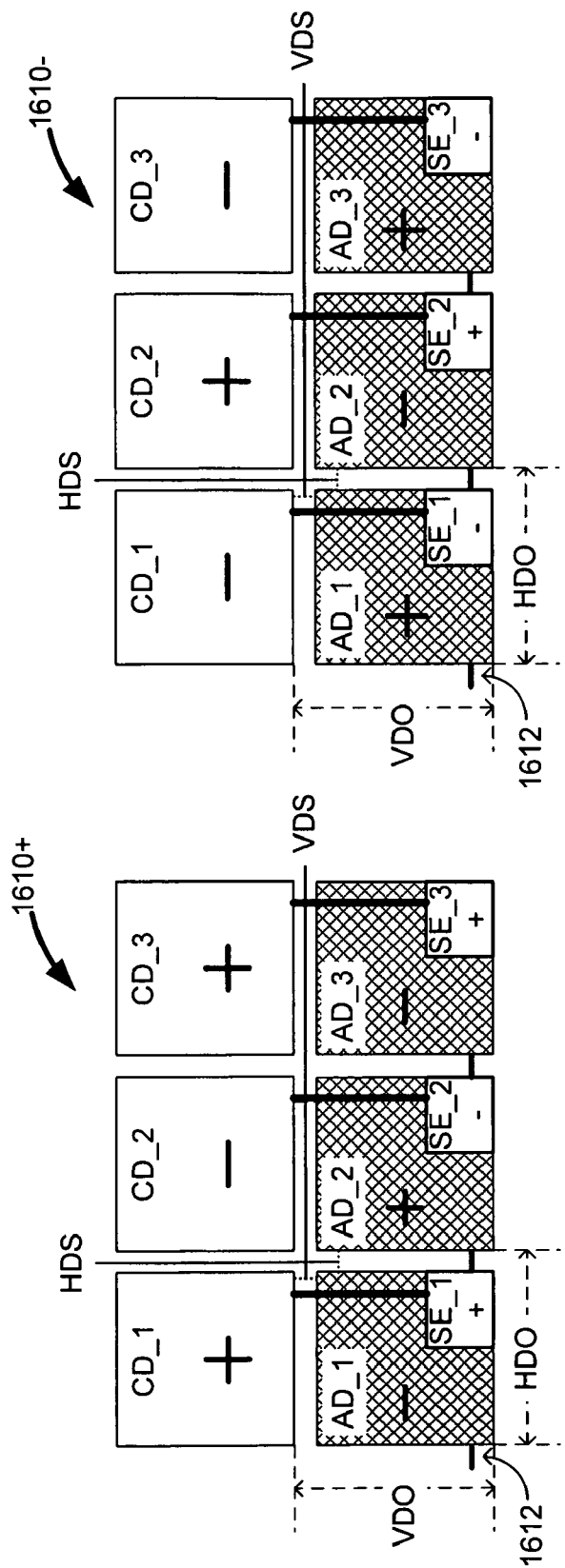

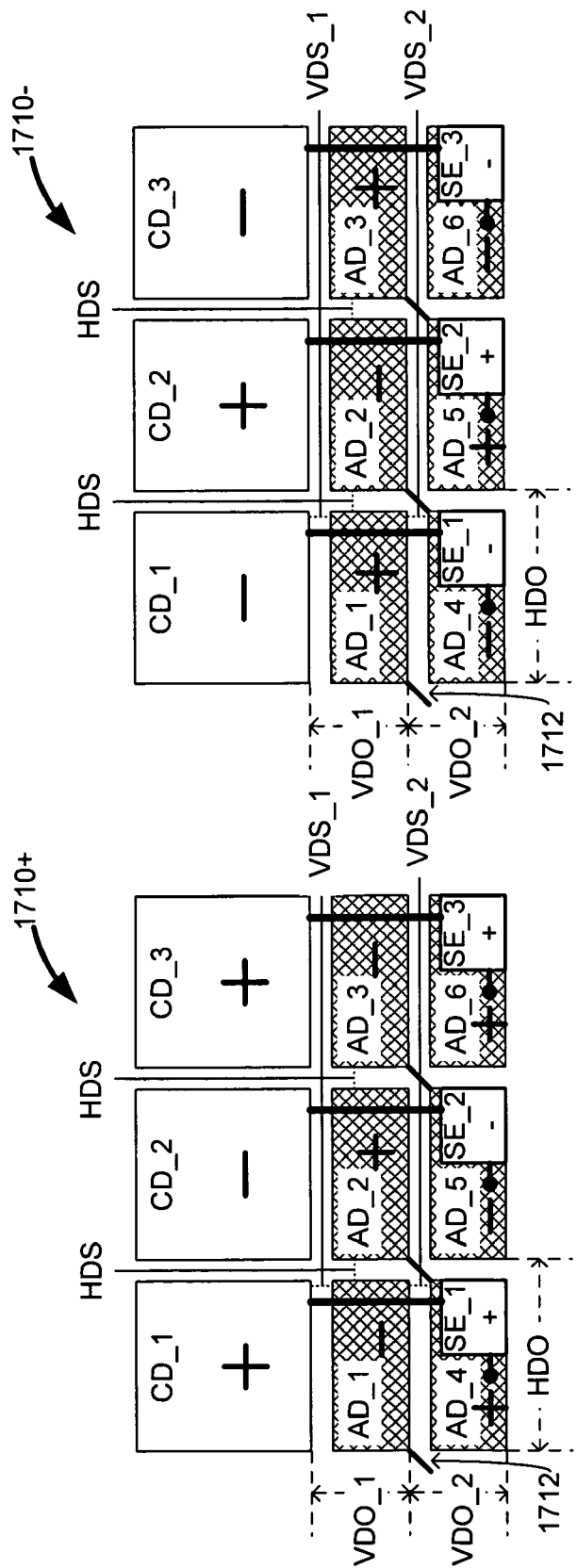

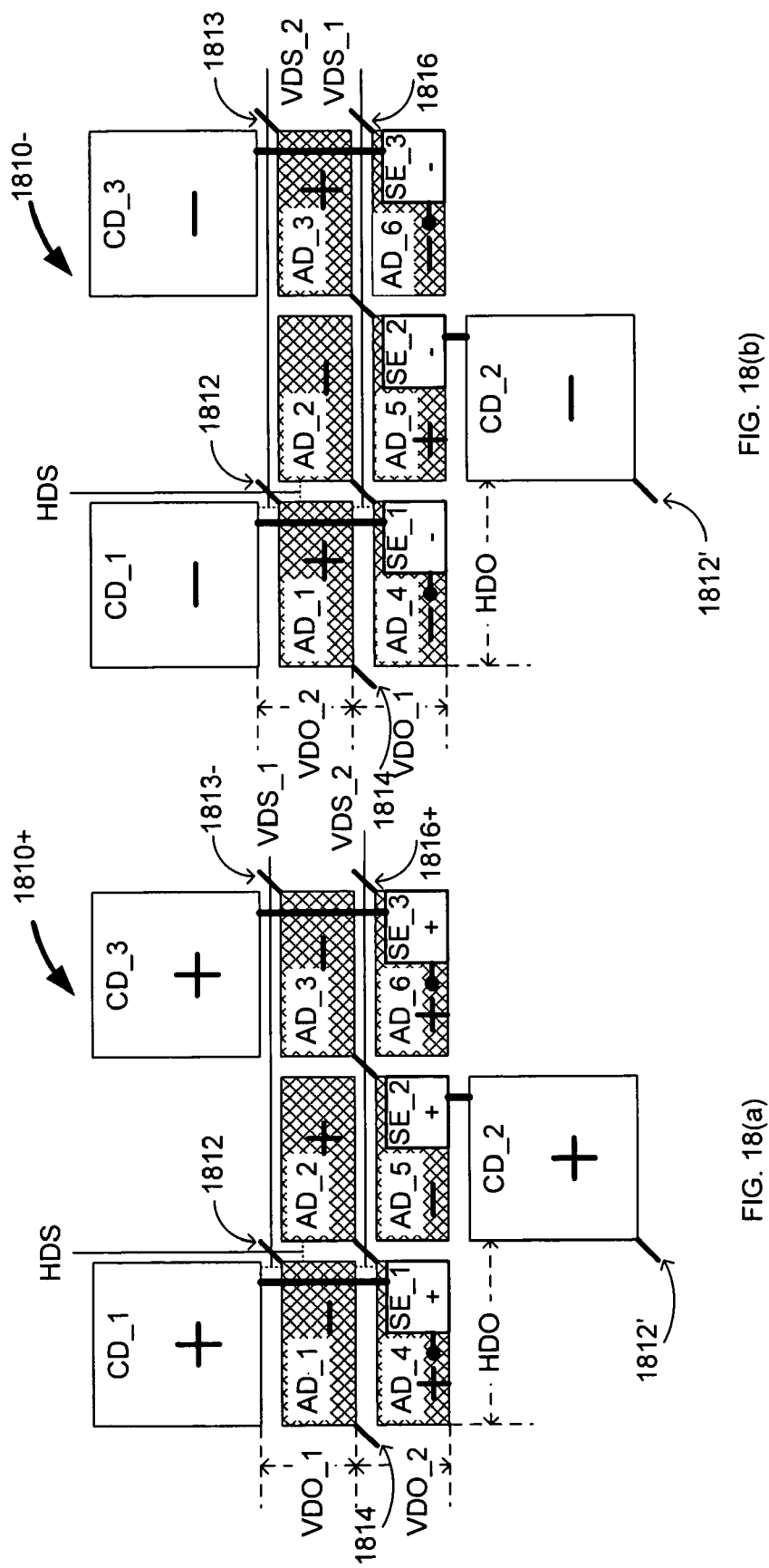

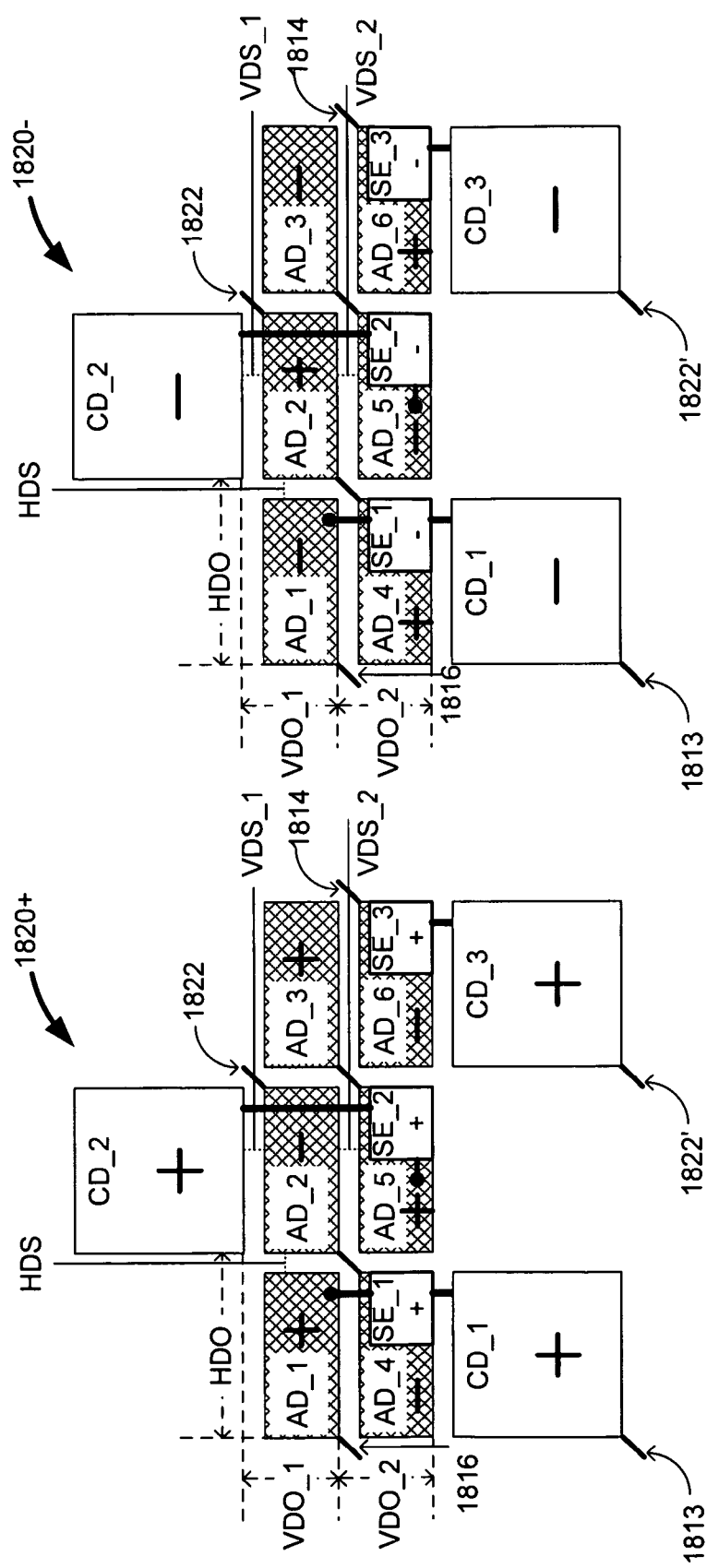

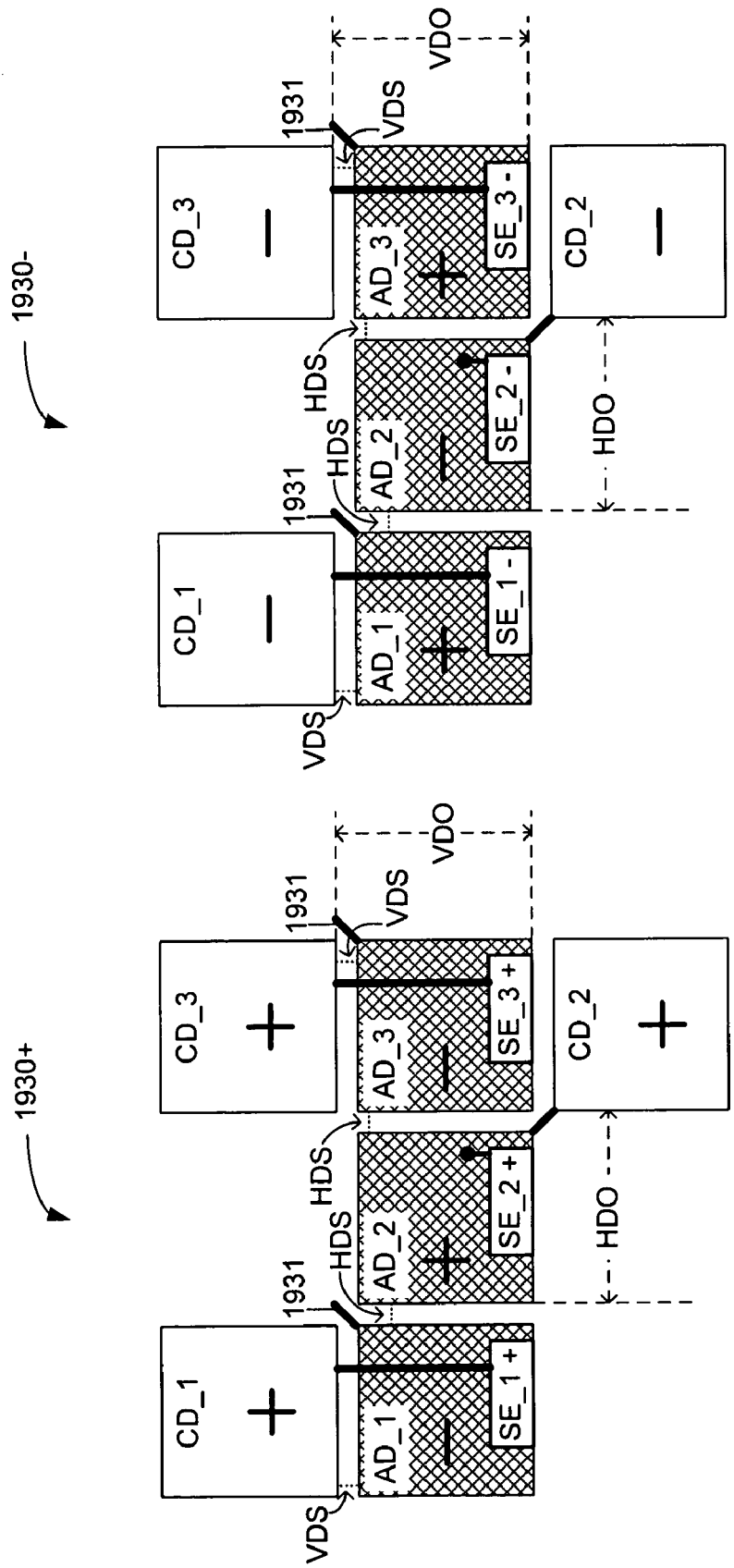

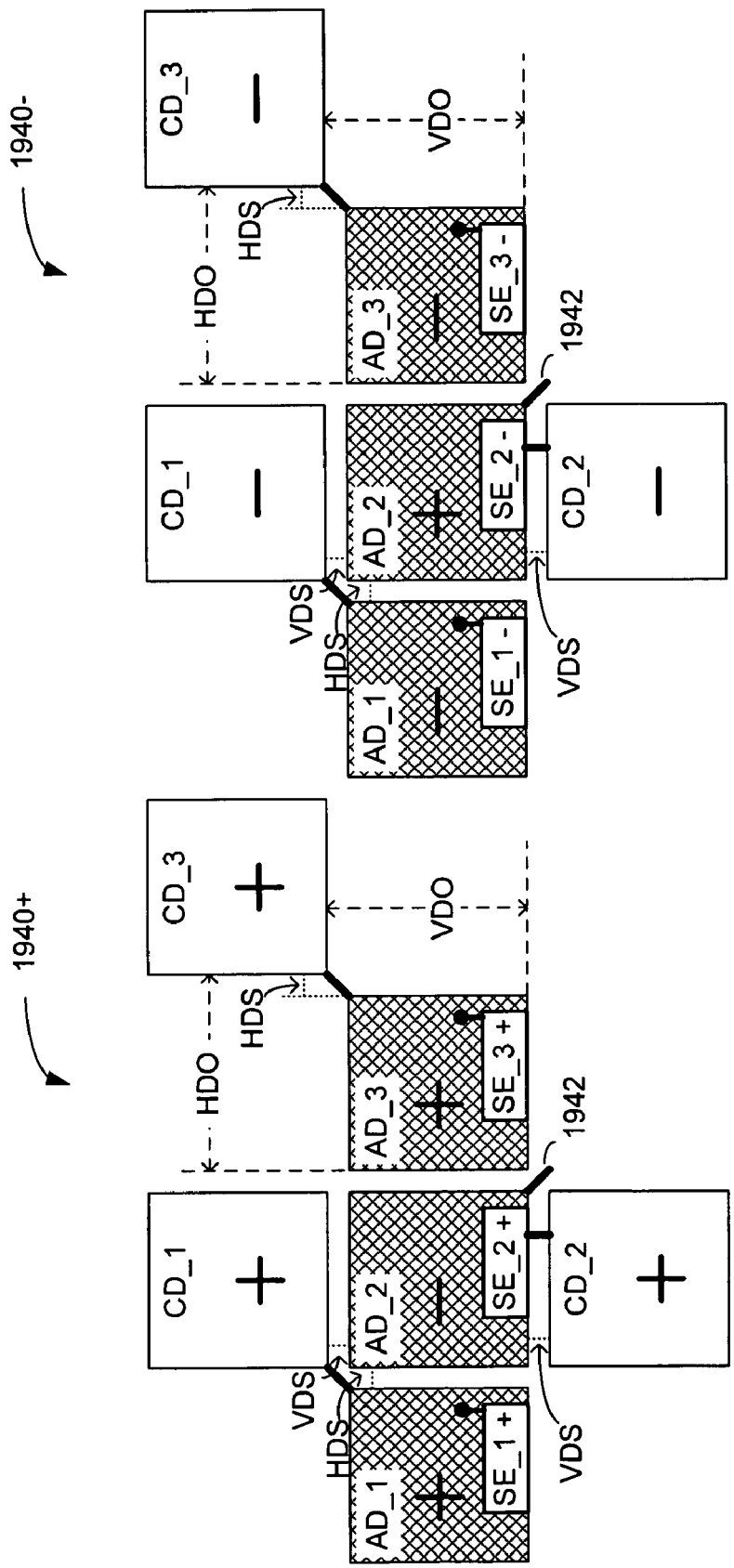

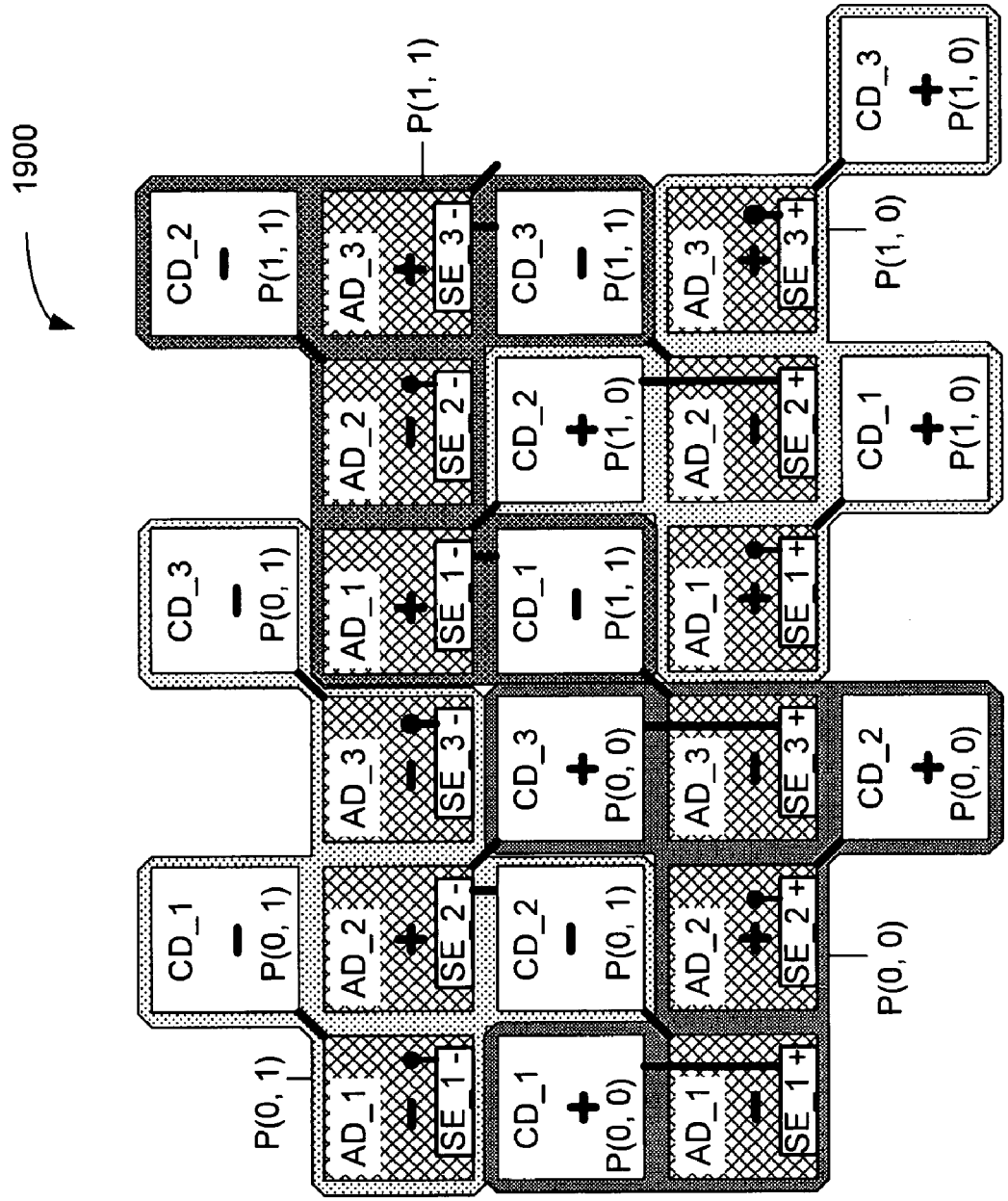

PIXELS USING ASSOCIATED DOT POLARITY AND ASSOCIATED DOT SWITCHING ELEMENTS FOR MULTI-DOMAIN VERTICAL ALIGNMENT LIQUID CRYSTAL DISPLAYS

RELATED APPLICATIONS

This application is a continuation of U.S. application Ser. No. 11/751,469 entitled "PIXELS USING ASSOCIATED DOT POLARITY FOR MULTI-DOMAIN VERTICAL ALIGNMENT LIQUID CRYSTAL DISPLAYS" filed by Hiap L. Ong on May 21, 2007, which claimed the benefit of U.S. Provisional Patent Application Ser. No. 60/799,815, entitled "Multi-domain vertical alignment liquid crystal display with row inversion drive scheme", by Hiap L. Ong, filed on May 22, 2006, and also claimed the benefit of U.S. Provisional Patent Application Ser. No. 60/799,815, entitled "Multi-domain Vertical Alignment liquid crystal display with row inversion drive scheme", by Hiap L. Ong, filed May 22, 2006, and also claimed the benefit of U.S. Provisional Patent Application Ser. No. 60/799,843, entitled "Method To Conversion of Row Inversion To Have Effective Pixel Inversion Drive Scheme", by Hiap L. Ong, filed May 22, 2006.

U.S. application Ser. No. 11/751,469 is incorporated by reference herein in its entirety.

BACKGROUND OF THE INVENTION

1. Field of the Invention

The present invention relates to liquid crystal displays (LCDs). More specifically, the present invention relates large-pixel multi-domain vertical alignment LCDs, which can be manufactured with smooth substrates.

2. Discussion of Related Art

Liquid crystal displays (LCDs), which were first used for simple monochrome displays, such as calculators and digital watches, have become the dominant display technology. LCDs are used routinely in place of cathode ray tubes (CRTs) for both computer displays and television displays. Various drawbacks of LCDs have been overcome to improve the quality of LCDs. For example, active matrix displays, which have largely replaced passive matrix displays, reduce ghosting and improve resolution, color gradation, viewing angle, contrast ratios, and response time as compared to passive matrix displays.

However, the primary drawback of conventional twisted nematic LCDs is the viewing angle is very narrow and the contrast ratio is low. Even the viewing angle of active matrixes is much smaller than the viewing angle for CRT. Specifically, while a viewer directly in front of an LCD receives a high quality image, other viewers to the side of the LCD would not receive a high quality image. Multi-domain vertical alignment liquid crystal displays (MVA LCDs) were developed to improve the viewing angle and contrast ratio of LCDs. FIGS. 1(a)-1(c) illustrate the basic functionality of a pixel of a vertical alignment LCD 100. For clarity, the LCD of FIG. 1 uses only a single domain. Furthermore, for clarity, the LCDs of FIGS. 1(a)-1(c) (and FIG. 2) described in terms of gray scale operation.

LCD 100 has a first polarizer 105, a first substrate 110, a first electrode 120, a first alignment layer 125, liquid crystals 130, a second alignment layer 140, a second electrode 145, a second substrate 150, and a second polarizer 155. Generally, first substrate 110 and second substrate 150 are made of a transparent glass. First electrode 120 and second electrode 145 are made of a transparent conductive material such as ITO (Indium Tin Oxide). First alignment layer 125 and second alignment layer 140, which are typically made of a polyimide (PI) layer, align liquid crystals 130 vertically in a resting state. In operation, a light source (not shown) sends light from beneath first polarizer 105, which is attached to first substrate 110. First polarizer 105 is generally polarized in a first direction and second polarizer 155, which is attached to second substrate 150, is polarized perpendicularly to first polarizer 105. Thus, light from the light source would not pass through both first polarizer 105 and second polarizer 155 unless the light polarization were to be rotated by 90 degrees between first polarizer 105 and second polarizer 155. For clarity, very few liquid crystals are shown. In actual displays, liquid crystals are rod like molecules, which are approximately 5 angstroms in diameter and 20-25 angstroms in length. Thus, there are over 10 million liquid crystal molecules in a pixel that is 100 μm width by 300 μm length by 3 μm height.

In FIG. 1(a), liquid crystals 130 are vertically aligned. In the vertical alignment, liquid crystals 130 would not rotate light polarization from the light source. Thus, light from the light source would not pass through LCD 100 and gives a completely optical black state and a very high contrast ratio for all color and all cell gap. Consequently MVA LCDs provide a big improvement on the contrast ratio over the conventional low contrast twisted nematic LCDs. However, as illustrated in FIG. 1(b), when an electric field is applied between first electrode 120 and second electrode 145, liquid crystals 130 reorientate to a tilted position. Liquid crystals in the tilted position rotate the polarization of the polarized light coming through first polarizer 105 by ninety degrees so that the light can then pass through second polarizer 155. The amount of tilting, which controls the amount of light passing through the LCD (i.e., brightness of the pixel), is proportional to the strength of the electric field. Generally, a single thin-film-transistor (TFT) is used for each pixel. However for color displays, a separate TFT is used for each color component (typically, Red, Green, and Blue)

However, the light passing through LCD 100 is not uniform to viewers at different viewing angles. As illustrated in FIG. 1(c), a viewer 210 that is left of center would see a bright pixel because the broad (light rotating) side of liquid crystals 130 face viewer 210. A viewer 220 that is centered on the pixel would see a gray pixel because the broad side of liquid crystals 130 is only partially facing viewer 220. A viewer 230 that is right of center would see a dark pixel because the broad side of liquid crystals 130 is barely facing viewer 230.

Multi-domain vertical alignment liquid crystal displays (MVA LCDs) were developed to improve the viewing angle problems of single-domain vertical alignment LCDs. FIG. 2 illustrates a pixel of a multi-domain vertical alignment liquid crystal display (MVA LCD) 200. MVA LCD 200 includes a first polarizer 205, a first substrate 210, a first electrode 220, a first alignment layer 225, liquid crystals 235, liquid crystals 237, protrusions 260s, a second alignment layer 240, a second electrode 245, a second substrate 250, and a second polarizer 255. Liquid crystals 235 form the first domain of the pixel and liquid crystals 237 form the second domain of the pixel. When an electric field is applied between first electrode 220 and second electrode 245, protrusions 260 cause liquid crystals 235 to tilt in a different direction than liquid crystals 237. Thus, a viewer 272 that is left of center would see the left domain (liquid crystals 235) as black and the right domain (liquid crystals 237) as white. A viewer 274 that is centered would see both domains as gray. A viewer 276 that is right of center would see the left domain as white and the right domain as black. However, because the individual pixels are small, all three viewers would perceive the pixel as being gray. As explained above, the amount of tilting of the liquid crystals is controlled by the strength of the electric field between electrodes 220 and 245. The level of grayness perceived by the viewer directly related to the amount of tilting of the liquid crystals. MVA LCDs can also be extended to use four domains so that the LC orientation in a pixel is divided into 4 major domains to provide wide symmetrical viewing angles both vertically and horizontally.

Thus, multi-domain vertical alignment liquid crystal displays, provide wide symmetrical viewing angles, however, the cost of manufacturing MVA LCDs are very high due to the difficulty of adding protrusions to the top and bottom substrates and the difficulty of properly aligning the protrusions on the top and bottom substrates. Specifically, a protrusion on the bottom substrate must be located at the center of two protrusions on the top substrate; any misalignment between the top and bottom substrates will reduce the product yield. Other techniques of using physical features to the substrates, such as ITO slits, which have been used in place of or in combination with the protrusions, are also very expensive to manufacture. Furthermore, the protrusions and ITO slits inhibit light transmission and thus reduce the brightness of the MVA LCDs. Hence, there is a need for a method or system that can provide multi-domain vertical alignment liquid crystal displays, without the need for difficult to manufacture physical features such as protrusions and ITO-slits, and without the need to have ultra precise alignment of the top and bottom substrates.

SUMMARY

Accordingly, the present invention provides a MVA LCD that does not require protrusions or ITO slits. Thus manufacturing of MVA LCDs in accordance with the present invention is less expensive than conventional MVA LCDs. Specifically, a MVA LCD in accordance with one embodiment of the present invention subdivides a pixel into color components, which are further subdivided into color dots. Furthermore drive component areas, where the switching elements and storage capacitors may be located are converted to associated dots by adding an electrode that can be electrically biased. In most embodiments of the present invention, the color dots and associated dots (which are electrically biased) are arrange to form a checkerboard pattern of dot polarities or alternating row pattern of dot polarities. Fringe fields in each color dot are amplified by the different dot polarities of neighboring color dots or associate dots. The amplified fringe fields of a color dot cause the liquid crystals inside the color dot to reorientate and tilt in different direction to form multiple crystal domains.

In one embodiment of the present invention, a pixel includes a first color component with a first first-component color dot, a first switching element, and a first associated dot. The first first-component color dot has an electrode coupled to the first switching element, which is located within the first associated dot. The first switching element and the first first-component color dot have a first polarity and the associated dot has a second polarity. The first first-component color dot is horizontally aligned with the first associated dot and vertically separated from the first associated dot by at least a vertical dot spacing. A second associated dot is horizontally aligned with the first associated dot. A second switching element is located in the second associated dot. The second switching element is coupled to an electrode of a first second-component color dot. Various other embodiments of the present invention adds addition color dots, switching elements, and associated dots.

In another embodiment of the present invention, a pixel includes a first color component with a first first-component color dot, a first switching element, a first associated dot, second color component with a first second-component color dot, a second switching element, a second associated dot. The first switching element is coupled to an electrode of the first first-component color dot and an electrode of the first associated dot. The second switching element is coupled to an electrode of the first second-component color dot and an electrode of the second associated dot. The first switching element, the first first-component color dot, and the first associated dot have a first polarity. The first switching element, the first second-component color dot, and the second associated dot have a second polarity. and the associated dot has a second polarity. Various other embodiments of the present invention adds addition color dots, switching elements, and associated dots.

The present invention will be more fully understood in view of the following description and drawings.

BRIEF DESCRIPTION OF THE DRAWINGS

FIGS. 4(*c*)-4(*d*) illustrate a pixel design in accordance with one embodiment of the present invention.

FIG. 4(*e*) illustrates a liquid crystal display in accordance with one embodiment of the present invention.

FIGS. 5(*c*)-5(*d*) illustrate a pixel design in accordance with one embodiment of the present invention.

FIGS. 5(*e*)-5(*f*) illustrate a pixel design in accordance with one embodiment of the present invention.

FIGS. 5(*g*)-5(*h*) illustrate a pixel design in accordance with one embodiment of the present invention.

FIG. 6(*b*) illustrates a liquid crystal display in accordance with one embodiment of the present invention.

FIG. 7(*b*) illustrates a liquid crystal display in accordance with one embodiment of the present invention.

FIGS. 8(*c*)-8(*d*) illustrate a pixel design in accordance with one embodiment of the present invention.

FIGS. 8(*e*)-8(*f*) illustrate a pixel design in accordance with one embodiment of the present invention.

FIGS. 8(*g*)-8(*h*) illustrate a pixel design in accordance with one embodiment of the present invention.

FIG. 8(*i*) illustrates a liquid crystal display in accordance with one embodiment of the present invention.

FIGS. 11(a)-11(b) illustrate a pixel design in accordance with one embodiment of the present invention.

FIGS. 12(a)-12(b) illustrate a pixel design in accordance with one embodiment of the present invention.

FIGS. 13(d)-13(e) illustrate a pixel design in accordance with one embodiment of the present invention.

FIGS. 13(g)-13(h) illustrate a pixel design in accordance with one embodiment of the present invention.

FIGS. 14(a)-14(b) illustrate a pixel design in accordance with one embodiment of the present invention.

FIGS. 15(a)-15(b) illustrate a pixel design in accordance with one embodiment of the present invention.

FIGS. 16(a)-16(b) illustrate a pixel design in accordance with one embodiment of the present invention.

FIGS. 17(a)-17(b) illustrate a pixel design in accordance with one embodiment of the present invention.

FIGS. 18(a)-18(b) illustrate a pixel design in accordance with one embodiment of the present invention.

FIGS. 18(c)-18(d) illustrate a pixel design in accordance with one embodiment of the present invention.

FIGS. 19(e)-19(f) illustrate a pixel design in accordance with one embodiment of the present invention.

FIGS. 19(g)-19(h) illustrate a pixel design in accordance with one embodiment of the present invention.

FIG. 19(i) illustrates a liquid crystal display in accordance with one embodiment of the present invention.

DETAILED DESCRIPTION

As explained above, conventional MVA LCDs are very expensive to manufacture due to the use of physical features, such as protrusions or ITO slits, for creating the multiple domains of each pixel. However, MVA LCDs in accordance with the principles of the present invention use fringe fields to create multiple-domains and do not require the use of physical features (such as protrusions or ITO slits) on the substrate. Furthermore, without the requirement of physical features the difficulty of aligning the physical features of the top and bottom substrate is also eliminated. Thus, MVA LCDs in accordance with the present invention are higher yield and less expensive to manufacture than conventional MVA LCDs.

Figure 1B:
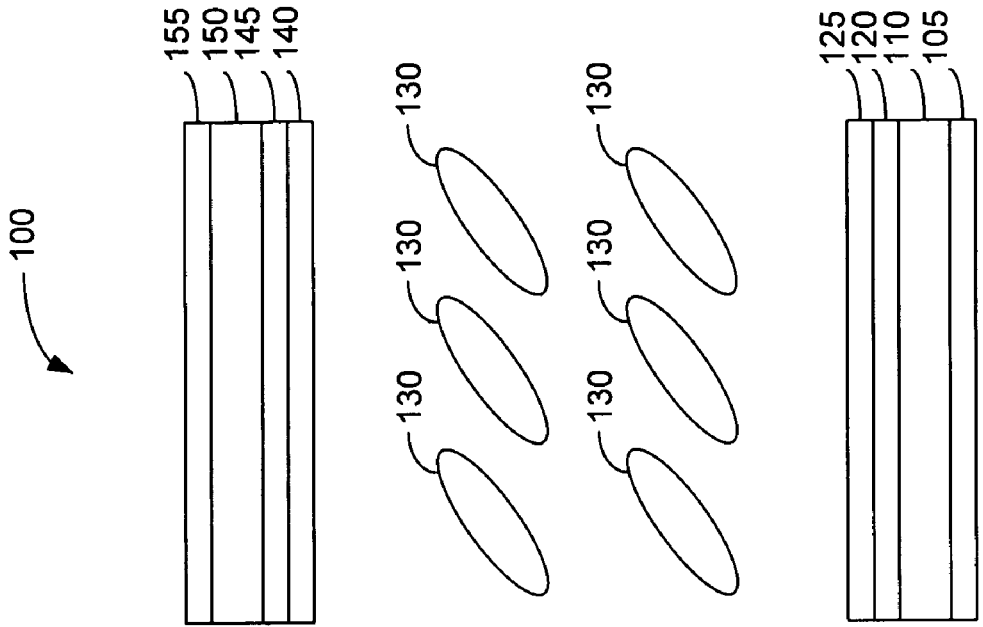
FIGS. 1(*a*)-1(*c*) are three illustrations of a pixel of a conventional single domain vertical alignment LCD.
Figure 1A:
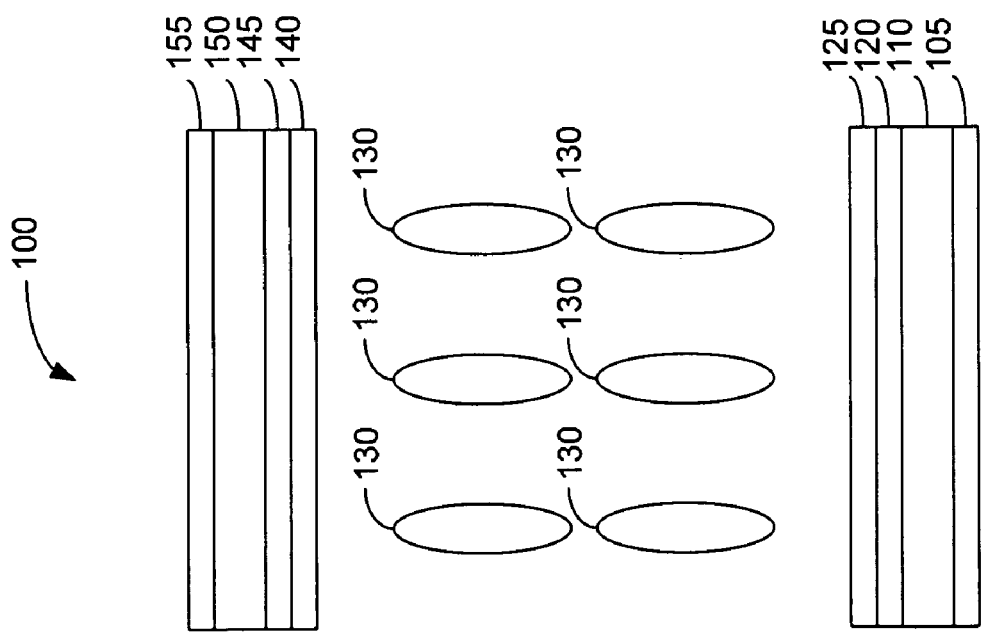
Figure 1C:
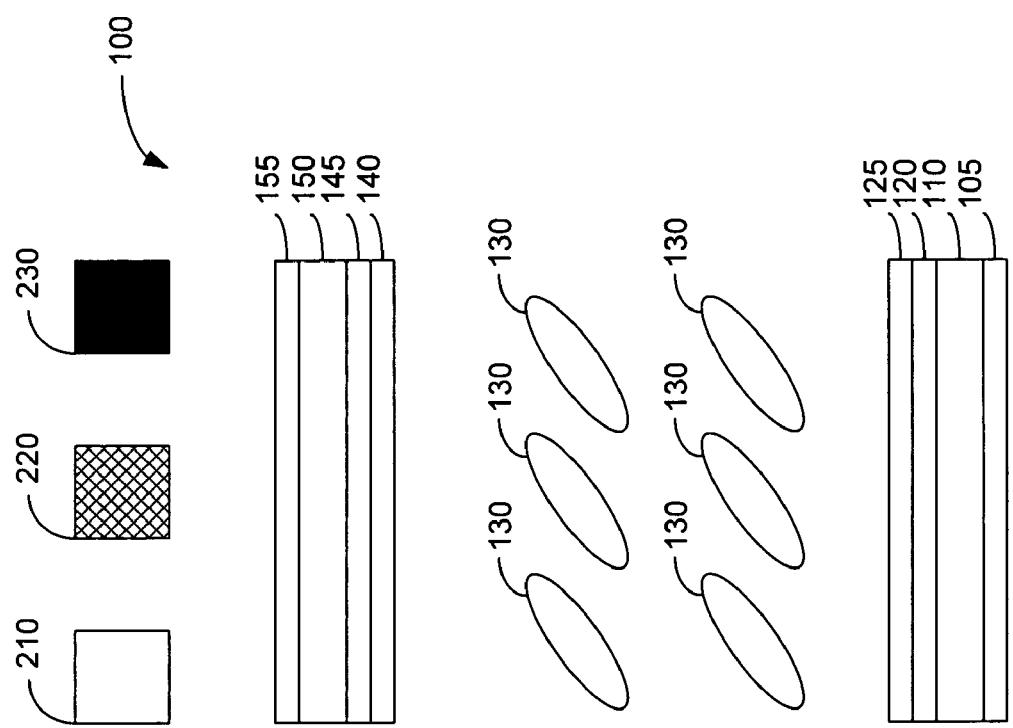
Figure 2:
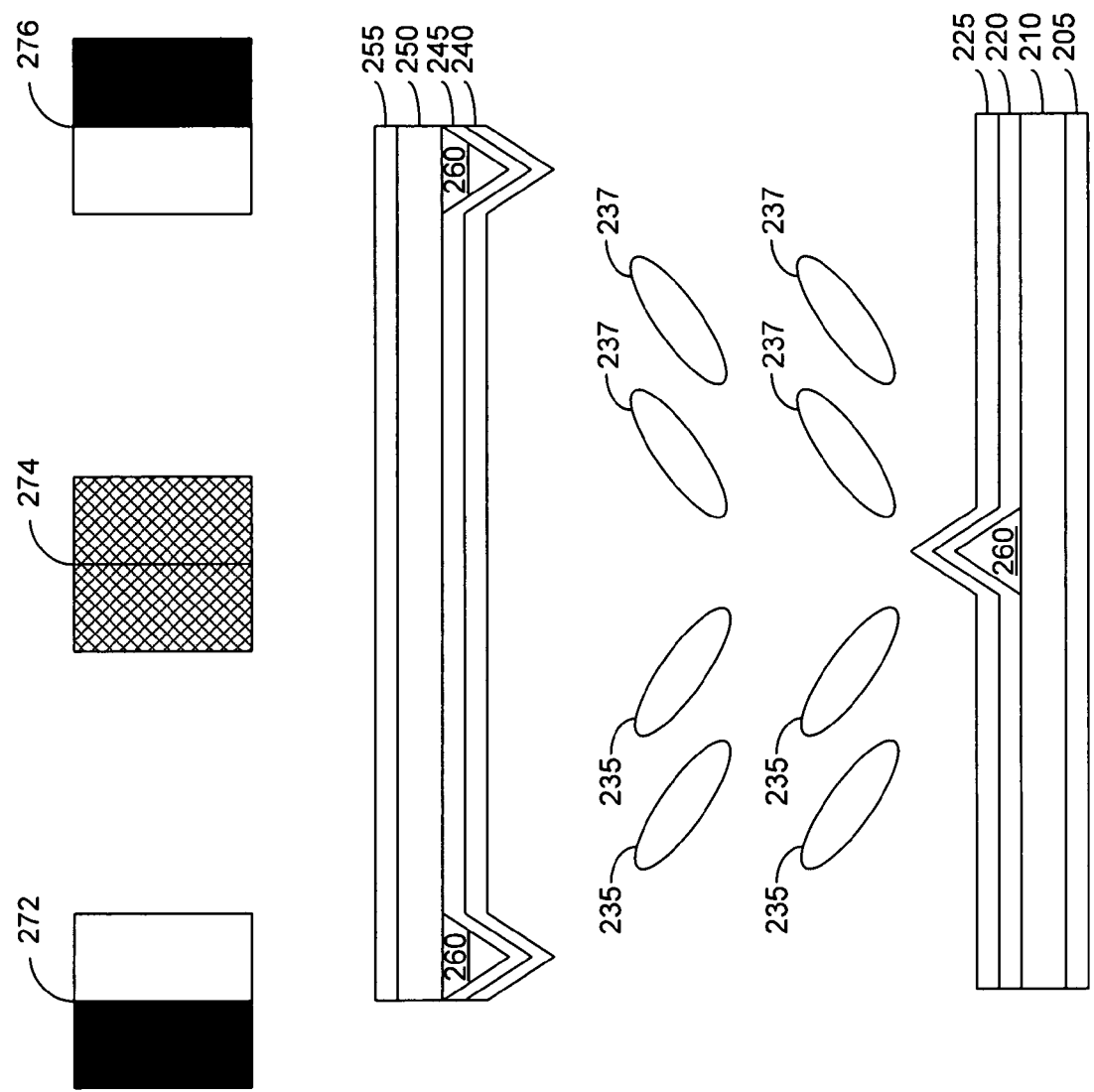
FIG. 2 is an illustration of a pixel of a conventional multi-domain vertical alignment LCD.
Figure 3A:
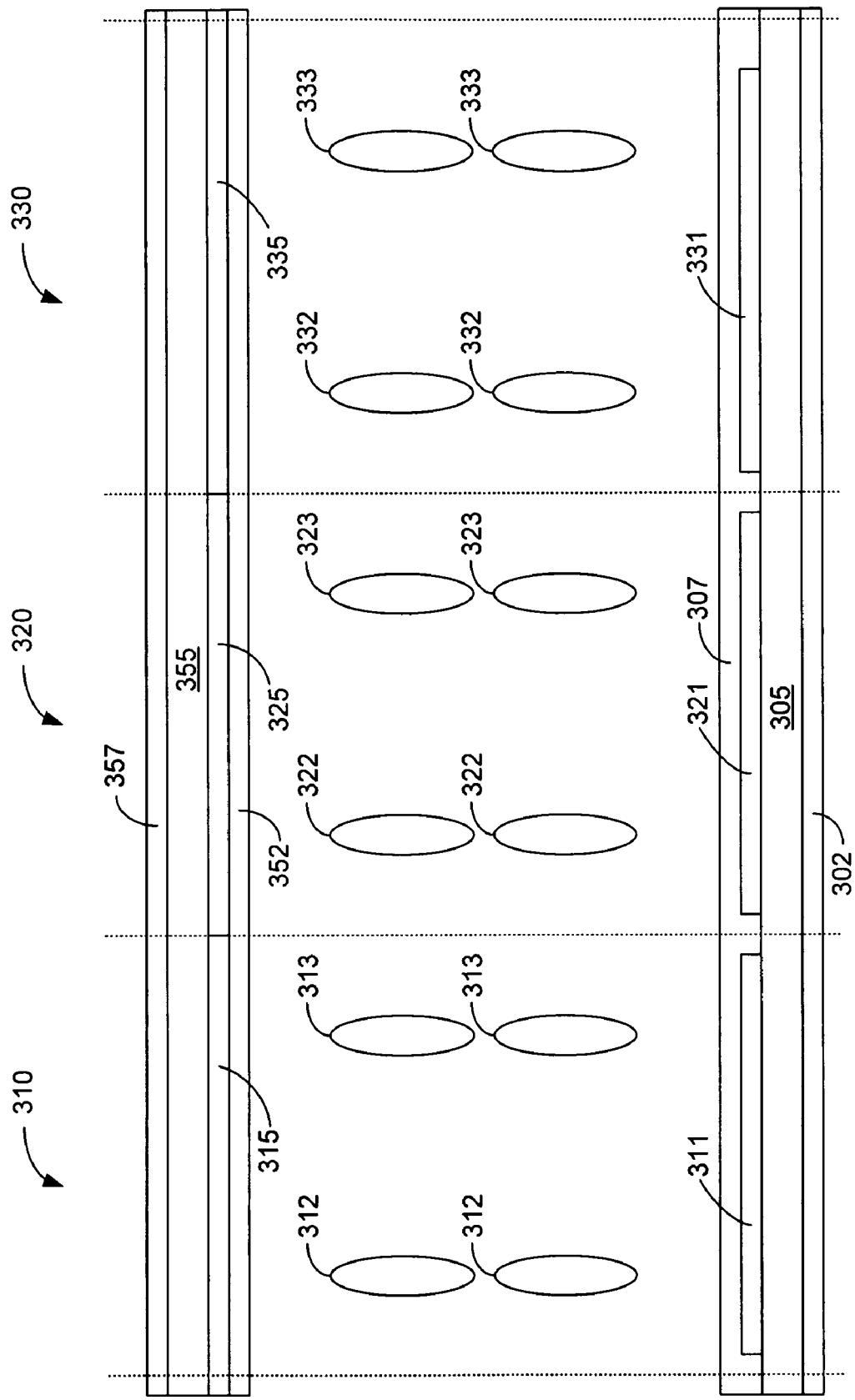
FIGS. 3(*a*)-3(*b*) illustrate a multi-domain vertical alignment liquid crystal display in accordance with one embodiment of the present invention.
Figure 3B:
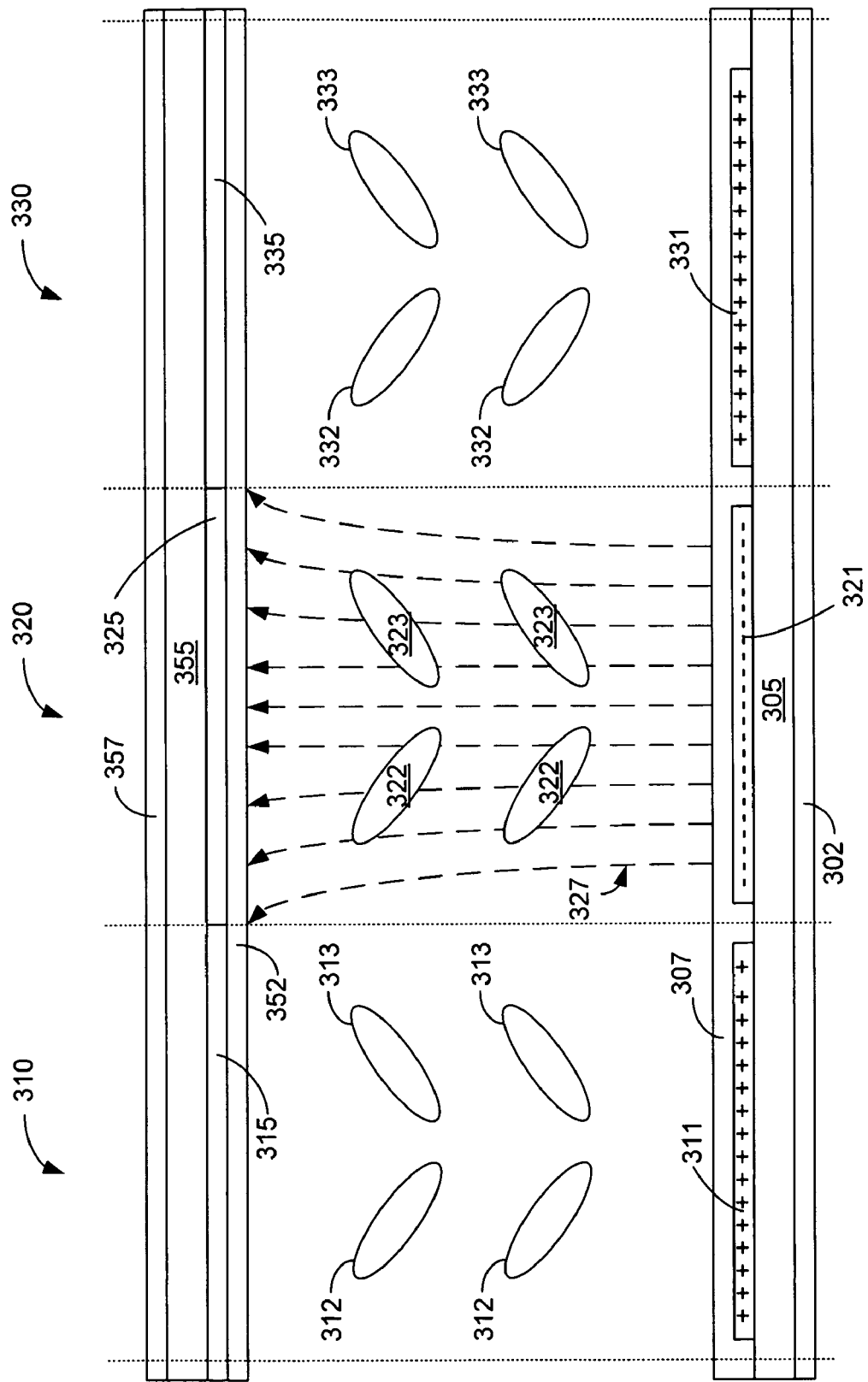

FIGS. 3(a) and 3(b) illustrate the basic concept used in accordance with the present invention to create a multi-domain vertical alignment liquid crystal display (MVA LCD) 300 without resorting to physical features on the substrates. Specifically FIG. 3 shows pixels 310, 320, and 330 in between a first substrate 305 and a second substrate 355. A first polarizer 302 is attached to first substrate 305 and a second polarizer 357 is attached to second substrate 355. Pixel 310 includes a first electrode 311, liquid crystals 312, liquid crystals 313 and a second electrode 315. Pixel 320 includes a first electrode 321, liquid crystals 322, liquid crystals 323 and a second electrode 325. Similarly, pixel 330 includes a first electrode 331, liquid crystals 332, liquid crystals 333 and a second electrode 335. The electrodes are typically constructed using a transparent conductive material such as ITO. Furthermore, a first alignment layer 307 covers the electrodes on first substrate 305. Similarly a second alignment layer 352 covers the electrodes on second substrate 355. Both LC alignment layers 307 and 352 provide a vertical LC alignment. As explained in more detail below, electrodes 315, 325, and 335 are held at a common voltage V_Com. Therefore, to ease manufacturing, electrodes 315, 325, and 335 are created as a single structure (as shown in FIGS. 3(a) and 3(b)). MVA LCD 300 operates pixels 310, 320, and 330 using alternating polarities. For example, if the polarities of pixels 310 and 330 are positive then the polarity of pixel 320 would be negative. Conversely, if the polarities of pixel 310 and 330 are negative then the polarity of pixel 320 would be positive. Generally, the polarity of each pixel would switch between frames, but the pattern of alternating polarities is maintained in each frame.

In FIG. 3(a), pixels 310, 320, and 330 are in the "OFF" state, i.e. with the electric field between the first and second electrodes turned off. In the "OFF" state some residual electric field may be present between the first and second electrode. However, the residual electric field is generally too small to tilt the liquid crystals.

In FIG. 3(b), pixels 310, 320, and 330 are in the "ON" state. 3(b) uses "+" and "−" to denote the voltage polarity of the electrodes. Thus, electrodes 311, and 331 have positive voltage polarity and electrodes 321 has negative voltage polarity. Substrate 355 and electrodes 315, 325, and 335 are kept at common voltage V_com. The voltage polarity is defined with respect to the V_com voltage, where a positive polarity is obtained for voltages higher than V_com, and a negative polarity is obtained for voltage smaller than V_com. Electric field 327 (illustrated using field lines) between electrodes 321 and 325 causes liquid crystals 322 and liquid crystals 323 to tilt. In general, without protrusions or other features the tilting direction of the liquid crystals is not fixed for liquid crystals with a vertical LC alignment layers at 307 and 352. However, the fringe field at the edges of the pixel can influence the tilting direction of the liquid crystals. For example, electric field 327 between electrode 321 and electrode 325 is vertical around the center of pixel 320 but is tilted to the left in the left part of the pixel, and tiled to the right in the right part of the pixel. Thus, the fringe field between electrode 321 and electrode 325 cause liquid crystals 323 to tilt to the right to form one domain and cause liquid crystals 322 to tilt to the left to from a second domain. Thus, pixel 320 is a multi-domain pixel with a wide symmetrical viewing angle Similarly, the electric field (not shown) between electrode 311 and electrode 315 would have fringe fields that cause liquid crystals 313 to reorientate and tilt to the right in the right side in pixel 310 and cause liquid crystals 312 to tilt to the left in the left side in pixel 310. Similarly, the electric field (not shown) between electrode 331 and electrode 335 would have fringe fields that cause liquid crystals 333 to tilt to the right in the right side in pixel 330 and cause liquid crystals 332 to tilt to the left in the left side in pixel 330.

Alternating polarity of adjacent pixels amplifies the fringe field effect in each pixel. Therefore, by repeating the alternating polarity pattern between rows of pixels (or columns of pixels), a multi domain vertical alignment LCD is achieved without physical features. Furthermore, an alternating polarity checkerboard pattern can be used to create four domains in each pixel.

However, fringe field effects are relatively small and weak, in general. Consequently, as pixels become larger, the fringe fields at the edge of the pixels would not reach all the liquid crystals within a pixel. Thus, in large pixels the direction of tilting for the liquid crystals not near the edge of the pixels would exhibit random behavior and would not produce a multi-domain pixel. Generally, fringe field effects of pixels would not be effective to control liquid crystal tilt when the pixels become larger than 40-60 μm. Therefore, for large pixel LCDs a novel pixel division method is used to achieve multi-domain pixels. Specifically, for color LCDs, pixels are divided into color components. Each color component is controlled by a separate switching device, such as a thin-film transistor (TFT). Generally, the color components are red, green, and blue. In accordance with the present invention, the color components of a pixel are further divided into color dots.

The polarity of each pixel switches between each successive frame of video to prevent image quality degradation, which may result from twisting the liquid crystals in the same direction in every frame. However, the dot polarity switching may cause other image quality issues such as flicker if all the switching elements are of the same polarity. To minimize flicker, the switching elements (e.g. are transistors) are arranged in a switching element driving scheme that include positive and negative polarities. Furthermore, to minimize cross talk the positive and negative polarities of the switching elements should be arranged in a uniform pattern, which provides a more uniform power distribution. Various switching element driving schemes are used by the embodiments of the present invention. The three main switching element driving schemes are switching element point inversion driving scheme, switching element row inversion driving scheme, and switching element column inversion driving scheme. In the switching element point inversion driving scheme, the switching elements form a checkerboard pattern of alternating polarities. In the switching element row inversion driving scheme, the switching elements on each row have the same polarity; however, each switching element in one row has the opposite polarity as compared to the polarity of switching elements in adjacent rows. In the switching element column inversion driving scheme, the switching elements on each column have the same polarity; however, a switching element in one column has the opposite polarity as compared to the polarity of switching elements in adjacent columns. While the switching element point inversion driving scheme provides the most uniform power distribution, the complexity and additional costs of switching element point inversion driving scheme over switching element row inversion driving scheme or switching element column inversion driving scheme may not be cost effective. Thus, most LCD displays for low cost or low voltage applications are manufactured using switching element row inversion driving scheme while switching element point inversion driving scheme is usually reserved for high performance applications.

Figure 4C:
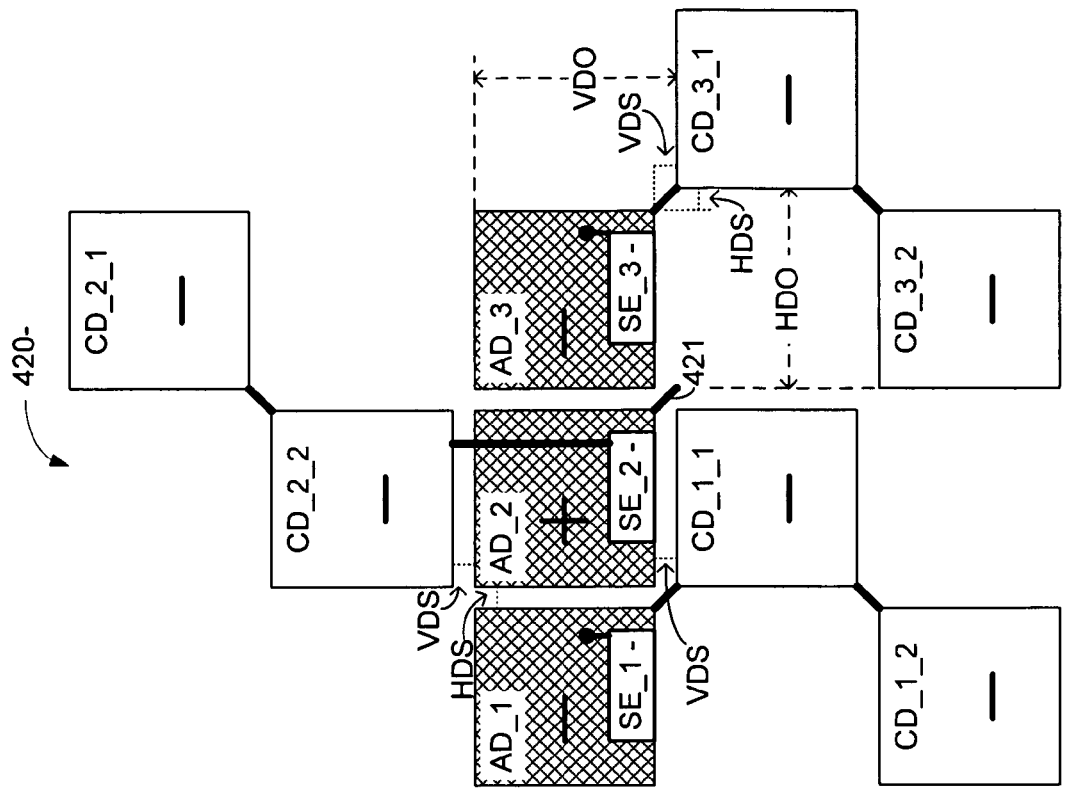
FIGS. 4(*a*)-4(*b*) illustrate a pixel design in accordance with one embodiment of the present invention.

FIGS. 4(a)-4(d) illustrate novel spread pixel designs that are used together in accordance with one embodiment of the present invention. The color dots of a spread pixel are spread out to allow color dots of multiple spread pixels to be interleaved. Specifically, FIGS. 4(a) and 4(b) show different dot polarity patterns of a spread pixel design 410 (labeled 410+ and 410− as described below) that use a switching element row inversion driving scheme. In actual operation a pixel will switch between a first dot polarity pattern and a second dot polarity pattern between each image frame. For clarity, the dot polarity pattern, in which the first color dot of the first color component has a positive polarity, is referred to as the positive dot polarity pattern. Conversely, the dot polarity pattern in which the first color dot of the first color component has a negative polarity is referred to as the negative dot polarity pattern. Specifically, in FIG. 4(a), pixel design 410 has a positive dot polarity pattern (and is thus labeled 410+) and in FIG. 4(b), pixel design 410 has a negative dot polarity pattern (and is thus labeled 410−). In pixel design 410, all the color dots have the same polarity for each dot polarity pattern, however other embodiments of the present invention may have color dots with different polarities with the other driving schemes.

Spread pixel design 410 has three color components. Each of the three color components is divided into two color dots. For clarity, the color dots are referenced as CD_X_Y, where X is a color component (from 1 to 3) and Y is a dot number (from 1 to 2). In addition, pixel design 410 includes an associated dot (AD_1, AD_2, and AD_3) for each color component. A switching element (SE_1, SE_2, and SE_3) for each color component is located within the associated dot. Spread pixel design 410, like many other embodiments of the present invention, incorporates the associated dots in various dot polarity patterns (as described below) to amplify the intrinsic fringe field effects to enhance and control the multiple domains of liquid crystals. Furthermore, in many embodiments of the present invention, the associated dot is opaque, which improves black output in displays. In other embodiments the associated dot is colored the same as the associated color component. In most embodiments of the present invention thin film transistors are used as the switching elements.

In many embodiments of the present invention, the associated dot covers the drive component area that is occupied by the switching device and/or storage capacitor as well as the area that was used to manufacture the switching device and/or storage capacitors. For these embodiments, the associated dots are manufactured by depositing an insulating layer over the switching device and/or storage capacitors. Followed by depositing an electrically conductive layer to form the associated dot. The associated dots are electrically connected to specific switching devices and or certain color dots. The storage capacitors are electrically connected to specific switching devices and color dot electrodes to compensate and offset the capacitance change on the liquid crystal cells during the switching-on and switching-off processes of the liquid crystal cells. Consequently, the storage capacitors are used to reduce the cross-talk effects during the switching-on and switching-off processes of the liquid crystal cells. A patterning mask is used when it is necessary to form the patterned electrode for the associated dots. A color layer is added to form a light shield for the associated dot. In general, the color layer is black however some embodiments use different color to achieve a desired color pattern or shading. In some embodiments of the present invention, the color layer is manufactured on top or underneath the switching element. Other embodiments may also place a color layer on top of the glass substrate of the display.

In other embodiments of the present invention, the associated dot is an area independent of the switching elements. Furthermore, some embodiments of the present invention, have additional associated dots not directly related to the switching elements. Generally, the associated dot includes an active electrode layer such as ITO or other conductive layer, and is connected to a nearby color dot or powered in some other manner. For opaque associated dots, a black matrix layer can be added on the bottom of the conductive layer to form the opaque area. In some embodiments of the present invention, the black matrix can be fabricated on the ITO glass substrate side to simplify the fabrication process. The additional associated dots improve the effective use of display area to improve the aperture ratio and to form the multiple liquid crystal domains within the color dots. Some embodiments of the present invention use associate dots to improve color performance. For example, careful placement of associated dots can allow the color of nearby color dots to be modified from the usual color pattern.

In general, the color dots and associated dots are arranged in a grid pattern, where each dot (color or associated) is separated from adjacent dots by a horizontal dot spacing HDS and a vertical dot spacing VDS. However in many embodiments of the present invention color dots and associated dots could be of different size or shapes. In these embodiments the rows for the associated dots will have a different height than rows with color dots.

In pixel design 410, associated dots AD_1, AD_2, and AD_3 are arranged sequentially on a row. Associated dots AD_1 is separated from associated dot AD_2 by a horizontal dot spacing HDS. Similarly, associated dot AD_2 is separated from associated dot AD_3 by horizontal dot spacing HDS. Switching elements SE_1, SE_2, and SE_3 are positioned within associated dots AD_1, AD_2, and AD_3, respectively. The first color component of spread pixel design 410 has two color dots CD_1_1 and CD_1_2 in a right-left zigzag pattern (as used herein a right-left zigzag pattern includes a first color dot and a second color dot to the left and below the first color dot). The first color component is arranged so that color dot CD_1_2 is horizontally aligned with associated dot AD_1 and offset vertically above associated dot AD_1 by a vertical dot offset VDO so that color dot CD_1_2 is vertically separated from associated dot AD_1 by vertical dot spacing VDS. Vertical dot offset VDO as used herein refers to the distance which causes the "offset" dots to be vertically separated by vertical dot spacing VDS and thus is dependent on the color dot height or associated dot height. For example if the color dot height is equal to the associated dot height the vertical dot offset is equal to the color dot height plus the vertical dot spacing. In general, to improve the optical transmission, vertical dot spacing VDS is much smaller than the color dot heights. Horizontal dot offset HDO is used similarly for horizontal offsets. In general, to have properly amplified fringe field effects, the vertical dot spacing is equal to the horizontal dot spacing for the color dot. "Above" and "below" denote positioning in the plane of the page. The electrode in color dot CD_1_2 is coupled to switching element SE_1 and the electrode of color dot CD_1_1 is coupled to switching element SE_1 via the electrode of color dot CD_1_2. Generally, the electrodes and conductors are formed a transparent conductive material such as ITO (Indium Tin Oxide). The second color component of spread pixel design 410 has two color dots CD_2_1 and CD_2_2, in a right-left zigzag pattern. The second color component is arranged so that color dot CD_2_1 and is horizontally aligned with associated dot AD_3 offset vertically below associated dot AD_3 by vertical dot offset VDO (Thus, color dot CD_2_1 is vertically separated from associated dot AD_3 by vertical dot spacing VDS). The electrode of color dot CD_2_1 is coupled to switching element SE_2 and the electrode of color dot CD_2_2 is coupled to switching element SE_2 via the electrode of color dot CD_2_1. As explained below, the electrode of associated dot AD_2 is also coupled to switching element SE_2. Therefore, many embodiments of the present invention would couple the electrode of CD_2_1 to switching element SE_2 via the electrode of associated dot AD_2. The third color component of spread pixel design 410 has two color dots CD_3_1, and CD_3_2 in a right-left zigzag pattern and arranged so that color dot CD_3_2 is horizontally aligned with associated dot AD_3 and offset vertically above associated dot AD_3 by vertical dot offset VDO. The electrode of color dot CD_3_2 is coupled to switching element SE_3 and the electrode of color dot CD_3_1 is coupled to switching element SE_3 via the electrode of color dot CD_3_2.

As explained above fringe fields in each of the color dots are amplified if adjacent dots have opposite polarities. The present invention makes use of the associated dots as well as the color dots to achieve multiple liquid crystal domains. In general, the polarities of associated dots are assigned so that the associated dot polarity is the opposite of the polarity of any neighboring color dots. Furthermore, in many embodiments of the present invention using pixel design 410, the color dots and the associated dots are assigned so that a checkerboard pattern of polarities is formed.

The polarity of the color dots, associated dots, and switching elements are shown using "+" and "−" signs. Thus, in FIG. 4(*a*), switching elements SE_1, SE_2, and SE_3, and all of the color dots have positive polarity as denoted by "+". Associated dot AD_2 also has positive polarity; however, associated dots AD_1 and AD_3 have negative polarity, as denoted by "−". Associated dot AD_1 is adjacent to associated dot AD_2 and color dot CD_1_2, thus to have a checkerboard pattern of polarities (as described below), the polarity of associated dot AD_1 is opposite of the polarity of associated dot AD_2 (and color dot CD_1_2. Similarly, the polarity of associated dot AD_3 is opposite the polarity of associated dot AD_2. FIG. 4(*b*) shows pixel design 410 with the negative dot polarity pattern. For the negative dot polarity pattern, switching elements SE_1, SE_2, and SE_3, and all of the color dots have negative polarity. Associated dot AD_2 also has negative polarity; however, associated dots AD_1 and AD_3 have positive polarity for the reasons described above. Because associated dot AD_2 has the same polarity as switching element SE_2, the electrode of associated dot AD_2 can be coupled to switching element SE_2. However, associated dots AD_1 and AD_3 have polarities that are opposite switching elements SE_1, SE_2, and SE_3. Thus, the electrode of associated dots AD_1 and AD_3 are coupled to another switching element.

Figure 4D:
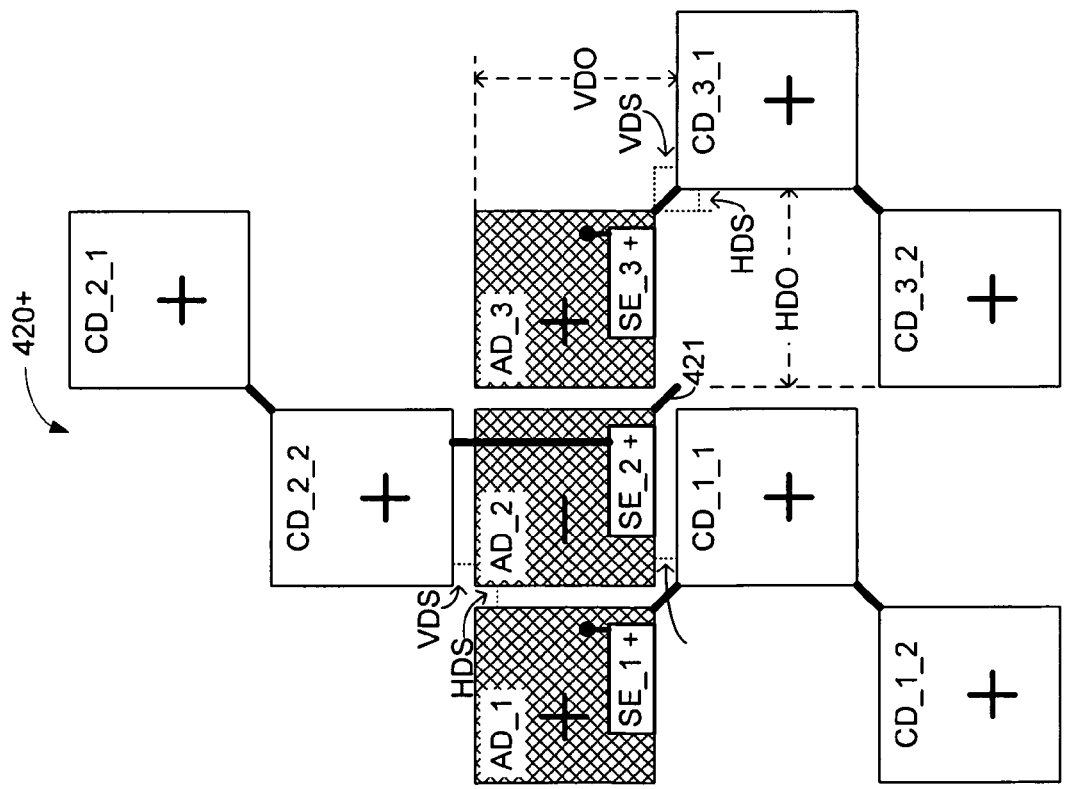

As explained above, a checkerboard pattern of dot polarities is desirable to amplify the fringe fields in each color dot. Thus, the color dots that are diagonally adjacent to associated dots AD_1 and AD_3 will have the appropriate polarity. Thus, in some embodiments of the present invention the electrode of associated dot AD_1 is coupled to the electrode of at least one diagonally adjacent color dot from another pixel. Similarly, the electrode of associated dot AD_3 is coupled to the electrode of at least one diagonally adjacent color dot from another pixel. In the particular embodiment of the present invention shown in FIGS. 4(a) and 4(b), associated dots AD_1 and AD_3 are coupled to the color dot that is to the right and below associated dots AD_1 and AD_3, respectively. For clarity these connections are illustrated by ITO connectors 411 and 412, respectively FIGS. 4(c) and 4(d) show different dot polarity patterns of a spread pixel design 420 (labeled 420+ and 420−) that can be used in a display using a switching element row inversion driving scheme. As explained above, a pixel will switch between a first dot polarity pattern and a second dot polarity pattern between each image frame. Specifically, in FIG. 4(c), pixel design 420 has a positive dot polarity pattern (and is labeled 420+) and in FIG. 4(d), pixel design 420 has a negative dot polarity pattern (and is labeled 420−). Like pixel design 410, all the color dots in pixel design 420 also have the same polarity for each dot polarity pattern, however other embodiments of the present invention may have color dots with different polarities.

Spread pixel design 420 has three color components. Each of the three color components is further divided into two color dots. In addition, pixel design 420 includes an associated dot (AD_1, AD_2, and AD_3) for each color component. A switching element (SE_1, SE_2, and SE_3), for each color component is located within the associated dot.

In pixel design 420, associated dots AD_1, AD_2, and AD_3 are arranged sequentially on a row. Associated dots AD_1 is separated from associated dot AD_2 by horizontal dot spacing HDS. Similarly, associated dot AD_2 is separated from associated dot AD_3 by horizontal dot spacing HDS.

The first color component of spread pixel design 420 has two color dots CD_1_1 and CD_1_2 in a right-left zigzag pattern. The first color component is arranged so that color dot CD_1_1 is horizontally aligned with associated dot AD_2 and offset vertically below associated dot AD_2 by vertical dot offset VDO so that associated dot AD_2 is vertically separated from color dot CD_1_1 by vertical dot spacing VDS. The electrode in color dot CD_1_1 is coupled to switching element SE_1 and the electrode of color dot CD_1_2 is coupled to switching element SE_1 via the electrode of color dot CD_1_1. The second color component of spread pixel design 420 has two color dots CD_2_1 and CD_2_2, in a right-left zigzag pattern and is arranged so that color dot CD_2_2 and is horizontally aligned with associated dot AD_2 offset vertically above associated dot AD_2 by vertical dot offset VDO. The electrode of color dot CD_2_2 is coupled to switching element SE_2 and the electrode of color dot CD_2_1 is coupled to switching element SE_2 via the electrode of color dot CD_2_2. The third color component of spread pixel design 420 has two color dots CD_3_1, and CD_3_2 in a right-left zigzag pattern and arranged so that color dot CD_3_1 is offset horizontally to the right of associated dot AD_3 by a horizontal dot offset HDO, so that color dot CD_3_1 is horizontally separated from associated dot AD_3 by horizontal dot spacing HDS, and offset vertically below associated dot AD_3 by vertical dot offset VDO, so that color dot CD_3_1 is vertically separated from associated dot AD_3 by vertical dot spacing VDS. The electrode of color dot CD_3_1 is coupled to switching element SE_3 and the electrode of color dot CD_3_2 is coupled to switching element SE_3 via the electrode of color dot CD_3_1.

The polarities of the color dots and associated dots are assigned so that a checkerboard pattern of polarities can be formed using pixel design 410 and pixel design 420 as described below and illustrated in FIG. 4(e). In FIG. 4(c) pixel design 420 is in the positive dot polarity pattern. Therefore, switching elements SE_1, SE_2, and SE_3, and all of the color dots have positive polarity as denoted by "+". Associated dots AD_1 and AD_3 also have positive polarity; however, associated dot AD_2 has negative polarity, as denoted by "−". Associated dot AD_2 is adjacent to associated dots AD_1 and AD_3 and color dots CD_1_1 and CD_2_2, thus to have a checkerboard pattern of polarities (as described below), the polarity of associated dot AD_2 is opposite of the polarity of associated dots AD_1 and AD_3 and color dots CD_1_1 and CD_2_2. FIG. 4(d) shows pixel design 420 with the negative dot polarity pattern. For the negative dot polarity pattern, switching elements SE_1, SE_2, and SE_3, and all of the color dots have negative polarity. Associated dots AD_1 and AD_3 also have negative polarity; however, associated dot AD_2 has positive polarity for the reasons described above. Because associated dots AD_1 and AD_3 have the same polarity as switching element SE_1 and SE_3, respectively, the electrode of associated dots AD_1 and AD_3 can be coupled to switching elements SE_1 and SE_3, respectively. However, associated dot2 AD_2 has a polarity that is the opposite of switching elements SE_1, SE_2, and SE_3. Thus, the electrode of associated dot AD_2 is coupled to another switching element.

As explained above, a checkerboard pattern of dot polarities is desirable to amplify the fringe fields in each color dot. Thus, the color dots that are diagonally adjacent to associated dot AD_2 should have the appropriate polarity. Thus, in some embodiments of the present invention the electrode of associated dot AD_2 is coupled to the electrode of at least one diagonally adjacent color dot from another pixel. In the particular embodiment of the present invention embodied in pixel design 420, the electrode of associated dot AD_2 is coupled to the electrode of the color dot that is to the right and below associated dot AD_2 as are illustrated by ITO connections 421.

Figure 4E:
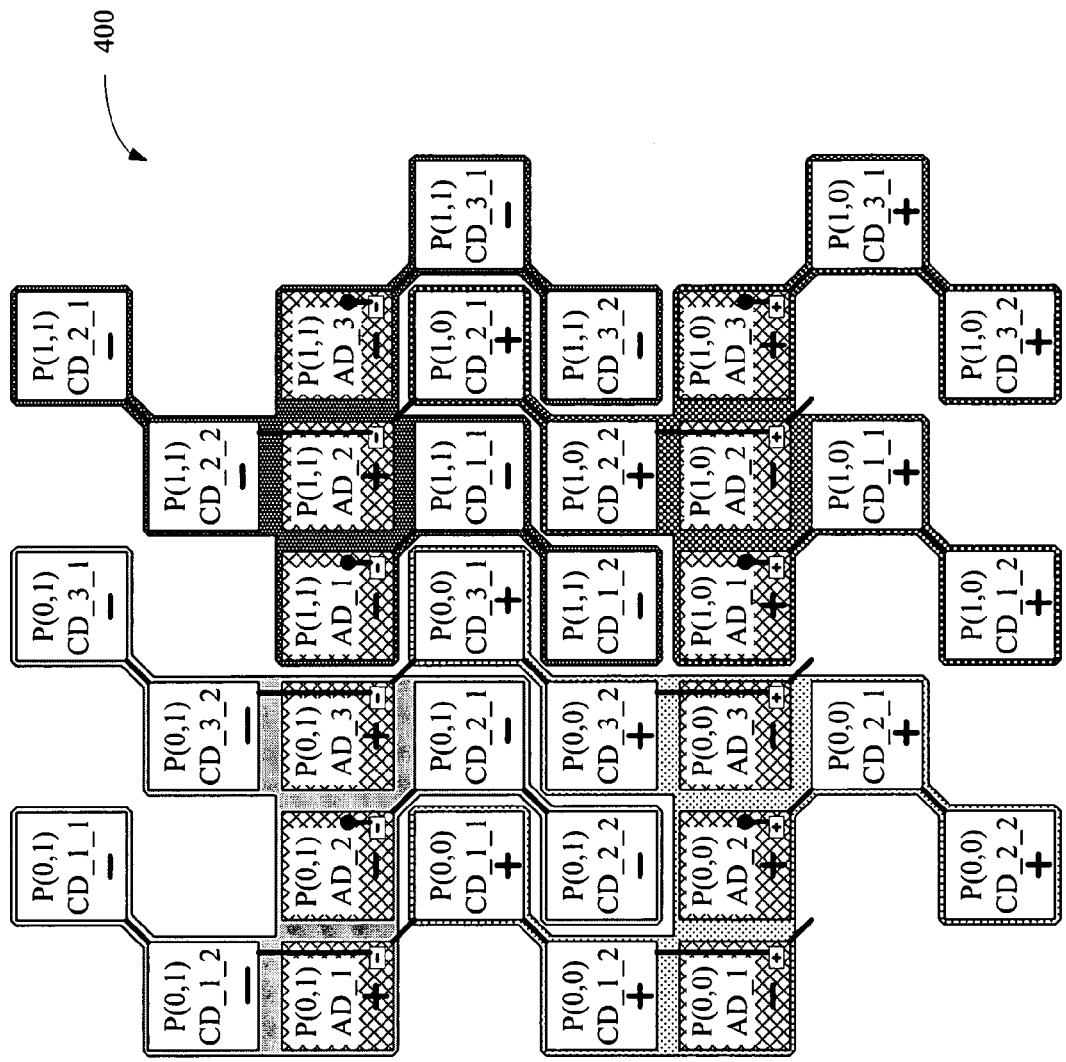

FIG. 4(e) shows a portion of a display 400 that combines pixels using pixel designs 410 and pixel design 420 to create a checkerboard pattern of color dot polarities. For clarity, the gate lines and source lines that power the switching elements are omitted in FIG. 4(e). Gate lines and source lines are illustrated and described in details in other Figures. Furthermore, the background area of each pixel is shaded to more clearly show the components of each pixel. This shading is for illustrative purposes only. Each row of display 400 has alternating pixels of pixel design 410 and pixel design 420. For example in row 0, pixel P(0,0) uses pixel design 410 and pixel P(1,0) uses pixel design 420. Pixel P(2,0) (not shown) would use pixel design 410. Similarly, in row 1, pixel P(0,1) uses pixel design 410 and pixel P(1,1) uses pixel design 420, and pixel P(2, 1) (not shown) uses pixel design 410. Within a row the associated dots of adjacent pixels are vertically aligned and horizontally separated by one horizontal dot spacing HDS (not labeled in FIG. 4(e)). The rows in display 400 are horizontally aligned and vertically interleaved so that some color dots from row 0 are vertically aligned with some of the color dots of row 1. Specifically, color dot CD_1_1 of pixel P(0,0) is vertically aligned with color dot CD_2_1 of pixel P(0, 1).

All the pixels on a row have the same polarity. However, alternating rows have different polarities. Thus for example, row 0 is shown with positive dot polarity while row 1 is show with negative dot polarity. In the next frame row 0 would have negative dot polarity while row 1 would have positive dot polarity. In general, even numbered rows have a first dot polarity pattern and odd number rows have a second dot polarity pattern. This arrangement of row polarity is an example of switching element row inversion driving scheme, which is often referred to as simply "row inversion." In general a pixel P(X,Y) in display 400 uses pixel design 410 where Y is even and uses pixel design 420 where Y is odd. Furthermore, pixel P(X,Y) has a first dot polarity pattern when Y is even and a second dot polarity pattern when Y is odd. In a particular embodiment of the present invention, each color dot has a width of 43 micrometers and a height of 47 micrometers. Each associated dot has a width of 43 micrometers and a height of 39 micrometers. The horizontal and vertical dot spacing is 4 micrometers.

As illustrated in FIG. 4(*e*), using the pixel designs described above, display 400 has a checkerboard pattern of dot polarities. Thus, each color dot will have four liquid crystal domains. Because each row of switching elements have the same polarity, while alternating rows of switching elements of opposite polarity, display 400 can achieve four liquid crystal domains while only requiring a switching element row inversion driving scheme.

The principles of the present invention embodied by pixel designs 410 and 420 are applicable to many other pixel designs. Using the same principles described above one skilled in the art can adapt the teachings presented herein for use with displays using other pixel designs. For example, another embodiment of the present invention can use a left-right zigzag pattern for each color component (as used herein a left-right zigzag pattern includes a first color dot and a second color dot to the right and below the first color dot.

Furthermore, many embodiments of the present invention have more than two color dots per color component. For example, FIGS. 5(*a*)-5(*h*) show four additional spread pixel designs (510, 520, 530 and 540) each having three color dots per color components. Like pixel design 410, all the color dots in pixel designs 510, 520, 530, and 540 have the same polarity for each dot polarity pattern. Spread pixel design 510, 520, 530 and 540 have three color components. Each of the three color components is further divided into three color dots. In addition, spread pixel designs 510, 520, 530 and 540 include an associated dot (AD_1, AD_2, and AD_3) for each color component. A switching element (SE_1, SE_2, and SE_3), for each color component is located within the associated dot. Associated dots AD_1, AD_2, and AD_3 are arranged sequentially on a row. Associated dots AD_1 is separated from associated dot AD_2 by horizontal dot spacing HDS (not labeled due to space constraints). Similarly, associated dot AD_2 is separated from associated dot AD_3 by horizontal dot spacing HDS.

Specifically, FIG. 5(*a*) shows the positive dot polarity pattern of a spread pixel design 510 (labeled as 510+). As explained above, a pixel will switch between a first dot polarity pattern and a second dot polarity pattern between each image frame. In pixel design 510, the first color component of spread pixel design 510 has three color dots CD_1_1, CD_1_2, and CD_1_3 arranged in a right-left-right zigzag pattern. The first color component is positioned so that color dot CD_1_1 is horizontally aligned with associated dot AD_1 and offset vertically below associated dot AD_1 by vertical dot offset VDO. The electrode in color dot CD_1_1 is coupled to switching element SE_1; the electrode of color dot CD_1_2 is coupled to switching element SE_1 via the electrode of color dot CD_1_1; and the electrode of color dot CD_1_3 is coupled to switching element SE_1 via the electrodes of color dots CD_1_2 and CD_1_1. The second color component of spread pixel design 510 has three color dots CD_2_1, CD_2_2, and CD_2_3 arranged in a left-right-left zigzag pattern. The second color component is positioned so that color dot CD_2_3 is offset horizontally to the left of associated dot AD_2 by horizontal dot spacing HDS and offset vertically above associated dot AD_2 by vertical dot offset VDO. The electrode of associated dot AD_2 is coupled to switching element SE_2. The electrode in color dot CD_2_3 is coupled to switching element SE_2 via the electrode of associated dot AD_2; the electrode of color dot CD_2_2 is coupled to switching element SE_2 via the electrodes of color dot CD_2_3 and associated dot AD_2; and the electrode of color dot CD_2_1 is coupled to switching element SE_2 via the electrodes of color dots CD_2_3 and CD_2_2 and associated dot AD_2. Some embodiments of the present invention may couple the electrode of color dot CD_2_3 without using the electrode of associated dot AD_2. The third color component of spread pixel design 510 has three color dots CD_3_1, CD_3_2, and CD_3_3 arranged in a right-left-right zigzag pattern. The third color component is positioned so that color dot CD_3_1 is horizontally aligned with associated dot AD_3 and offset vertically below associated dot AD_3 by vertical dot offset VDO. A switching element SE_3 is positioned within associated dot AD_3. The electrode in color dot CD_3_1 is coupled to switching element SE_3; the electrode of color dot CD_3_2 is coupled to switching element SE_3 via the electrode of color dot CD_3_1; and the electrode of color dot CD_3_3 is coupled to switching element SE_3 via the electrodes of color dots CD_3_2 and CD_3_1.

As explained above, a checkerboard pattern of dot polarities is desirable to amplify the fringe fields in each color dot. In FIG. 5(*a*) pixel design 510 is in the positive dot polarity pattern. Accordingly, switching elements SE_1, SE_2, and SE_3, and all of the color dots have positive polarity as denoted by "+". To achieve the checkerboard pattern, associated dot AD_2 also has positive polarity. Thus, the electrode of associated dot AD_2 can be coupled to switching element SE_2. However, associated dots AD_1 and AD_3 have negative polarity, as denoted by "−". In a checkerboard pattern of polarities, the color dots that are diagonally adjacent to associated dots AD_1 and AD_3 should have the appropriate polarity. Thus, in some embodiments of the present invention the electrode of associated dots AD_1 and AD_3 are coupled to the electrode of at least one diagonally adjacent color dot from another pixel. In the particular embodiment of pixel design 510, the electrode of associated dot AD_1 and AD_3 are coupled to the electrode of the color dots that are to the right and below associated dot AD_1 and AD_3, respectively. For clarity, these connections are illustrated by ITO connectors 511 and 512, respectively. As illustrated in FIG. 5(*b*), when pixel design 510 (labeled 510−) is in the negative dot polarity pattern, switching elements SE_1, SE_2, and SE_3, and all of the color dots have negative polarity. Associated dot AD_2 also has negative polarity. However, associated dots AD_1 and AD_3 have positive polarity.

FIG. 5(*c*) shows the positive dot polarity pattern of a spread pixel design 520 (labeled 520+). As explained above, a pixel will switch between a first dot polarity pattern and a second dot polarity pattern between each image frame. In pixel design 520, the first color component of spread pixel design 520 has three color dots CD_1_1, CD_1_2, and CD_1_3 arranged in a left-right-left zigzag pattern. The first color component is positioned so that color dot CD_1_3 is offset horizontally to the left of associated dot AD_1 by horizontal dot offset HDO and offset vertically above associated dot AD_1 by vertical dot offset VDO. As explained in more detail below, the electrode of associated dot AD_1 is coupled to switching element SE_1. The electrode in color dot CD_1_3 is coupled to switching element SE_1 via the electrode of associated dot AD_1; the electrode of color dot CD_1_2 is coupled to switching element SE_1 via the electrodes of color dot CD_1_3 and the electrode of associated dot AD_1; and the electrode of color dot CD_1_1 is coupled to switching element SE_1 via the electrodes of color dots CD_1_2 and CD_1_3 and the electrode of associated dot AD_1. In some embodiments of the present invention, the electrode of color dot CD_1_3 is coupled directly to switching element SE_1. The second color component of spread pixel design 520 has three color dots CD_2_1, CD_2_2, and CD_2_3 arranged in a right-left-right zigzag pattern. The second Color component is positioned so that color dot CD_2_1 is horizontally aligned with associated dot AD_2 and offset vertically below associated dot AD_2 by vertical dot offset VDO. The electrode in color dot CD_2_1 is coupled to switching element SE_2; the electrode of color dot CD_2_2 is coupled to switching element SE_2 via the electrode of color dot CD_2_1; and the electrode of color dot CD_2_3 is coupled to switching element SE_1 via the electrodes of color dots CD_2_1 and CD_2_2. The third color component of spread pixel design 510 has three color dots CD_3_1, CD_3_2, and CD_3_3 arranged in a left-right-left zigzag pattern. The third color component is positioned so that color dot CD_3_3 is offset horizontally to the left of associated dot AD_3 by horizontal dot offset HDO and offset vertically above associated dot AD_3 by vertical dot offset VDO. The electrode of associated dot AD_3 is coupled to switching element SE_3. The electrode in color dot CD_3_3 is coupled to switching element SE_3 via the electrode of associated dot AD_3; the electrode of color dot CD_3_2 is coupled to switching element SE_3 via the electrode of color dot CD_3_3 and the electrode of associated dot AD_3; and the electrode of color dot CD_3_1 is coupled to switching element SE_3 via the electrodes of color dots CD_3_2 and CD_3_3 and the electrode of associated dot AD_3. Some embodiments of the present invention may couple the electrode of color dot CD_3_3 directly to switching element SE_3.

Figure 5B:
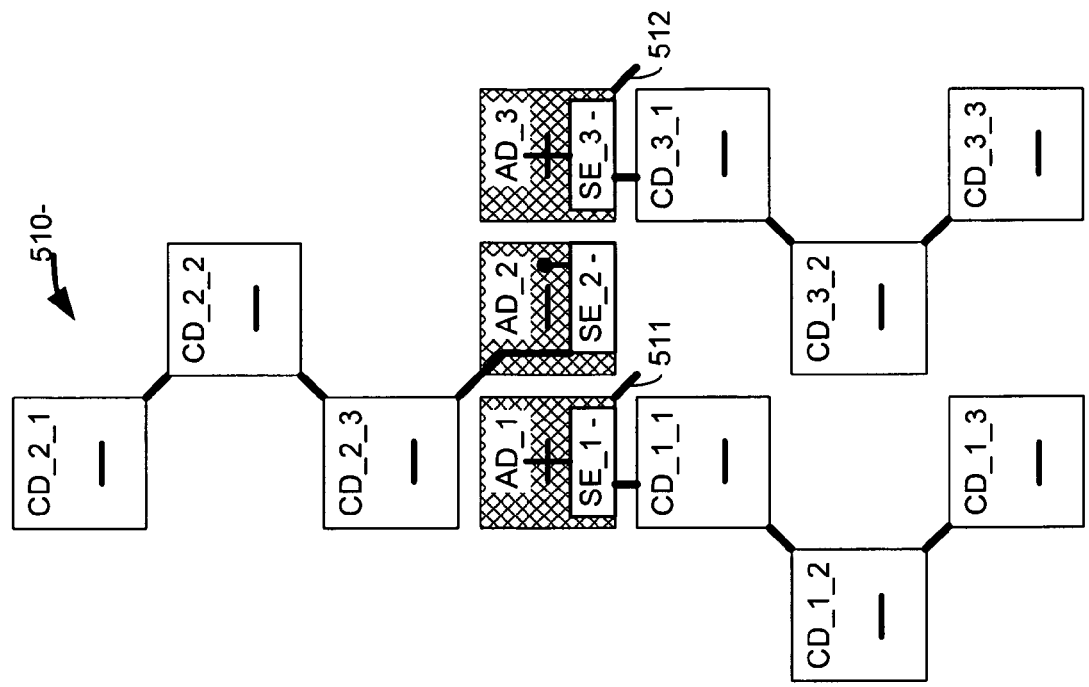
FIGS. 5(*a*)-5(*b*) illustrate a pixel design in accordance with one embodiment of the present invention.
Figure 5A:
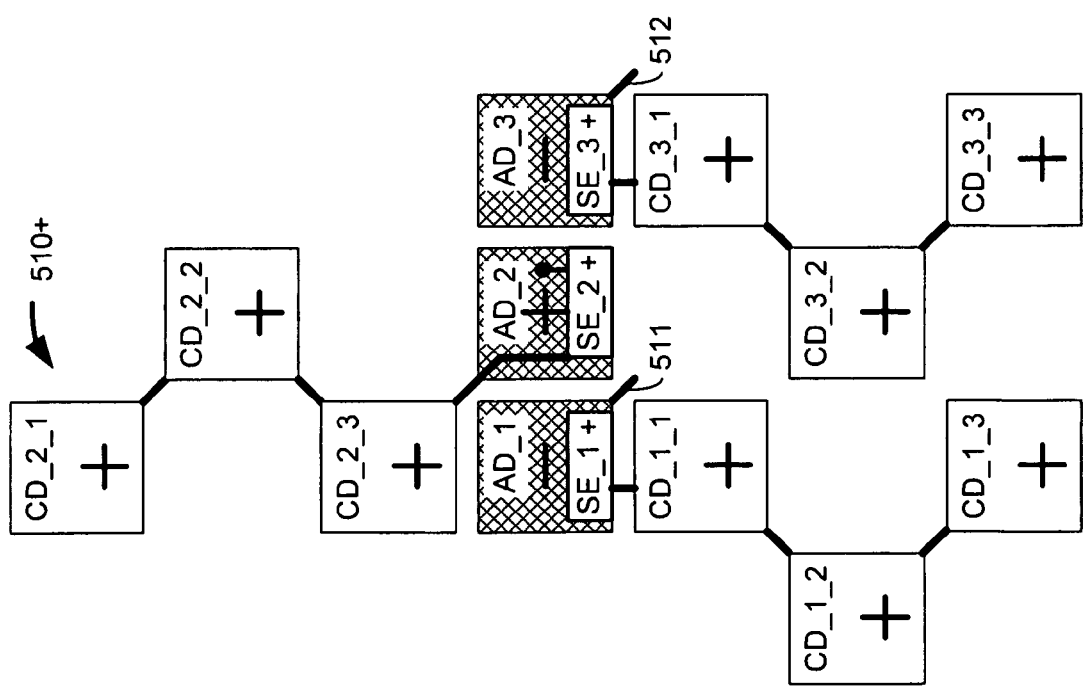
Figure 5D:
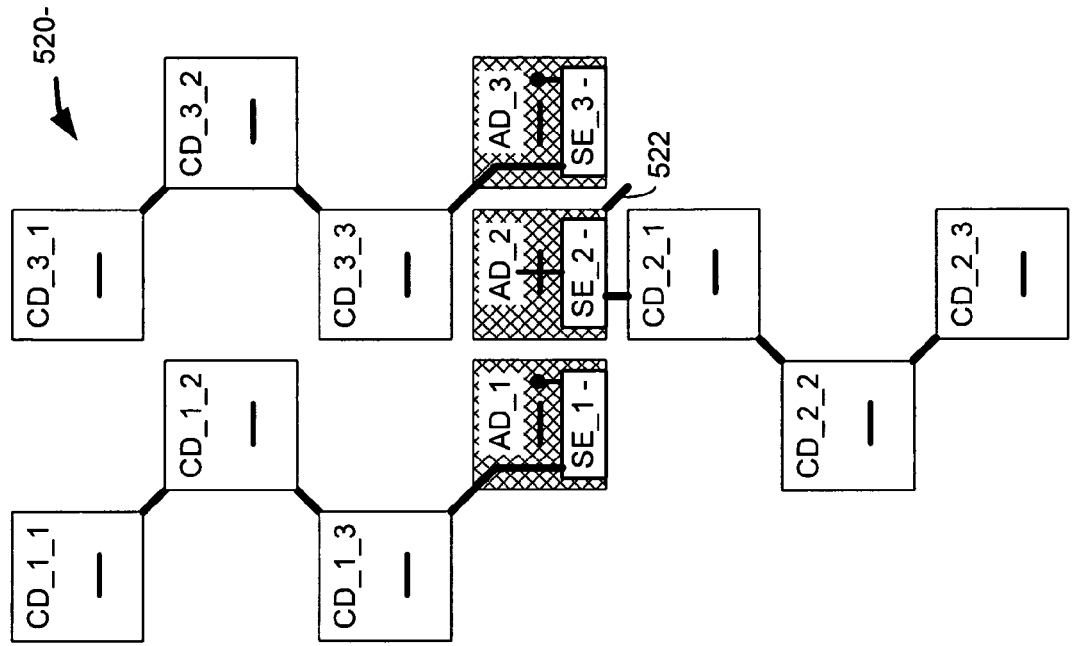
Figure 5C:
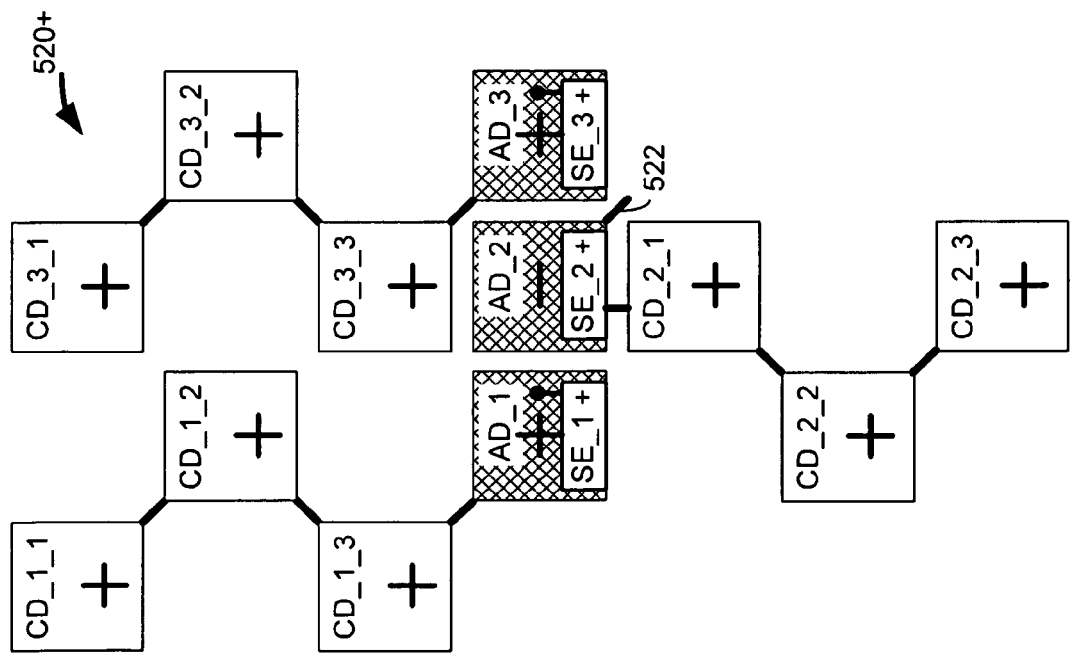

As explained above, a checkerboard pattern of dot polarities is desirable to amplify the fringe fields in each color dot. In FIG. 5(c) pixel design 520 is in the positive dot polarity pattern. Therefore, switching elements SE_1, SE_2, and SE_3, and all of the color dots have positive polarity as denoted by "+". To achieve the checkerboard pattern, associated dots AD_1 and AD_3 also have positive polarity. Therefore, the electrodes of associated dots AD_1 and AD_3 can be coupled to switching elements SE_1 and SE_3, respectively. However, associated dot AD_2 should have negative polarity, as denoted by "−". In a checkerboard pattern of polarities, the color dots that are diagonally adjacent to associated dot AD_2 should have the appropriate polarity. Thus, in some embodiments of the present invention the electrode of associated dot AD_2 is coupled to the electrode of at least one diagonally adjacent color dot from another pixel. In the particular embodiment of pixel design 520, the electrode of associated dot AD_2 is coupled to the electrode of the color dot that is to the right and below associated dot AD_2. For clarity, this connection is illustrated by ITO connector 522. As illustrated in FIG. 5(d), when pixel design 520 (labeled as 520−) is in the negative dot polarity pattern, switching elements SE_1, SE_2, and SE_3, and all of the color dots have negative polarity. Associated dots AD_1 and AD_3 also have negative polarity. However, associated dot AD_2 has positive polarity.

Figure 5F:
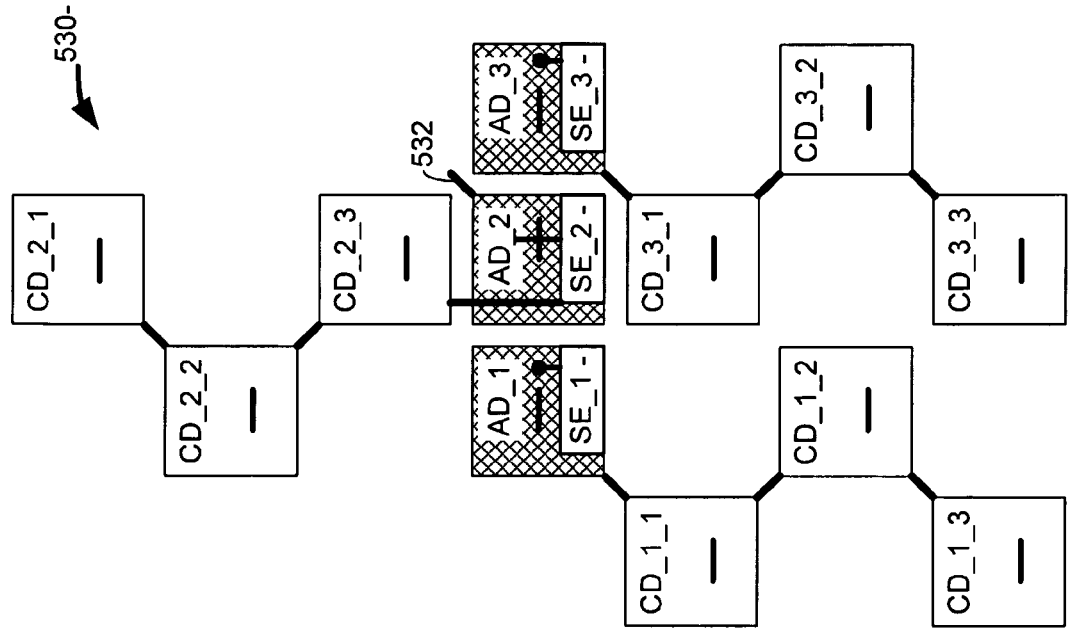
Figure 5E:
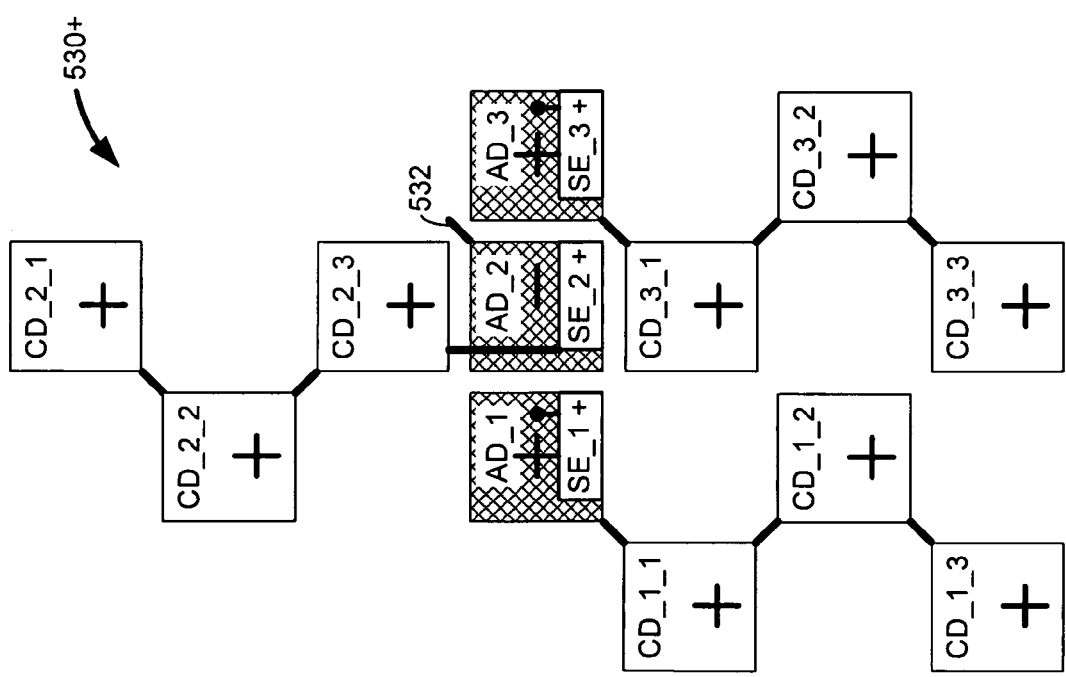

FIG. 5(e) shows the positive dot polarity pattern of a spread pixel design 530 (labeled 530+). As explained above, a pixel will switch between a first dot polarity pattern and a second dot polarity pattern between each image frame. In pixel design 530, the first color component of spread pixel design 530 has three color dots CD_1_1, CD_1_2, and CD_1_3 arranged in a left-right-left zigzag pattern. The first color component is positioned so that color dot CD_1_1 is offset horizontally to the left of associated dot AD_1 by horizontal dot offset HDO and offset vertically below associated dot AD_1 by vertical dot offset VDO. The electrode of associated dot AD_1 is coupled to switching element SE_1. The electrode in color dot CD_1_1 is coupled to switching element SE_1 via the electrode of associated dot AD_1; the electrode of color dot CD_1_2 is coupled to switching element SE_1 via the electrode of color dot CD_1_1 and the electrode of associated dot AD_1; and the electrode of color dot CD_1_3 is coupled to switching element SE_1 via the electrodes of color dots CD_1_2 and CD_1_1 and the electrode of associated dot AD_1. The second color component of spread pixel design 530 has three color dots CD_2_1, CD_2_2, and CD_2_3 arranged in a right-left-right zigzag pattern. The second color component is positioned so that color dot CD_2_3 is horizontally aligned with associated dot AD_2 and offset vertically above associated dot AD_2 by vertical dot offset VDO. The electrode in color dot CD_2_3 is coupled to switching element SE_2; the electrode of color dot CD_2_2 is coupled to switching element SE_2 via the electrode of color dot CD_2_3; and the electrode of color dot CD_2_1 is coupled to switching element SE_2 via the electrodes of color dots CD_2_3 and CD_2_2. The third color component of spread pixel design 530 has three color dots CD_3_1, CD_3_2, and CD_3_3 arranged in a left-right-left zigzag pattern. The third color component is positioned so that color dot CD_3_1 is offset horizontally to the left of associated dot AD_3 by horizontal dot offset HDO and offset vertically below associated dot AD_3 by vertical dot spacing VDO. The electrode of associated dot AD_3 is coupled to switching element SE_3. The electrode in color dot CD_3_1 is coupled to switching element SE_3 via the electrode of associated dot AD_3; the electrode of color dot CD_3_2 is coupled to switching element SE_3 via the electrode of color dot CD_3_1 and the electrode of associate dot AD_3; and the electrode of color dot CD_3_3 is coupled to switching element SE_3 via the electrodes of color dots CD_3_2 and CD_3_1 and the electrode of associate dot AD_3.

As explained above, a checkerboard pattern of dot polarities is desirable to amplify the fringe fields in each color dot. In FIG. 5(e) pixel design 530 is in the positive dot polarity pattern. Therefore, switching elements SE_1, SE_2, and SE_3, and all of the color dots have positive polarity as denoted by "+". To achieve the checkerboard pattern, associated dots AD_1 and AD_3 also have positive polarity. Thus, the electrodes of associated dots AD_1 and AD_3 can be coupled to switching elements SE_1 and SE_3, respectively. However, associated dot AD_2 has negative polarity, as denoted by "−". In a checkerboard pattern of polarities, the color dots that are diagonally adjacent to associated dot AD_2 should have the appropriate polarity. Thus, in some embodiments of the present invention the electrode of associated dot AD_2 is coupled to the electrode of at least one diagonally adjacent color dot from another pixel. In the particular embodiment of pixel design 530, the electrode of associated dot AD_2 is coupled to the electrode of the color dot that is to the right and above associated dot AD_2. This connection is illustrated by ITO connector 532. As illustrated in FIG. 5(f) when pixel design 530 in the negative dot polarity pattern (labeled 530−), switching elements SE_1, SE_2, and SE_3, and all of the color dots have negative polarity. Associated dots AD_1 and AD_3 also have negative polarity. However, associated dot AD_2 has positive polarity.

FIG. 5(g) shows the positive dot polarity pattern of a spread pixel design 540 (labeled 540+). As explained above, a pixel will switch between a first dot polarity pattern and a second dot polarity pattern between each image frame. In pixel design 540, the first color component of spread pixel design 510 has three color dots CD_1_1, CD_1_2, and CD_1_3 arranged in a right-left-right zigzag pattern. The first color component is positioned so that color dot CD_1_1 is horizontally aligned with associated dot AD_1 by horizontal dot offset HDO and offset vertically above associated dot AD_1 by vertical dot offset VDO. The electrode in color dot CD_1_3 is coupled to switching element SE_1; the electrode of color dot CD_1_2 is coupled to switching element SE_1 via the electrode of color dot CD_1_3; and the electrode of color dot CD_1_1 is coupled to switching element SE_1 via the electrodes of color dots CD_1_2 and CD_1_3. The second color component of spread pixel design 540 has three color dots CD_2_1, CD_2_2, and CD_2_3 arranged in a left-right-left zigzag pattern. The second color component is positioned so that color dot CD_2_1 is offset horizontally to the left of associated dot AD_2 by horizontal dot offset HDO and offset vertically below associated dot AD_2 by vertical dot offset VDO. The electrode of associated dot AD_2 is coupled to switching element SE_2. The electrode in color dot CD_2_1 is coupled to switching element SE_2; the electrode of color dot CD_2_2 is coupled to switching element SE_2 via the electrode of color dot CD_2_1 and the electrode of associated dot AD_2; and the electrode of color dot CD_2_3 is coupled to switching element SE_2 via the electrodes of color dots CD_2_1 and CD_2_2 and the electrode of associated dot AD_2. The third color component of spread pixel design 540 has three color dots CD_3_1, CD_3_2, and CD_3_3 arranged in a right-left-right zigzag pattern. The third color component is positioned so that color dot CD_3_3 is horizontally aligned with associated dot AD_3 and offset vertically above associated dot AD_3 by vertical dot offset VDO. The electrode in color dot CD_3_3 is coupled to switching element SE_3; the electrode of color dot CD_3_2 is coupled to switching element SE_3 via the electrode of color dot CD_3_3; and the electrode of color dot CD_3_1 is coupled to switching element SE_3 via the electrodes of color dots CD_3_2 and CD_3_3.

As explained above, a checkerboard pattern of dot polarities is desirable to amplify the fringe fields in each color dot. In FIG. 5(g) pixel design 540 is in the positive dot polarity pattern. Therefore, switching elements SE_1, SE_2, and SE_3, and all of the color dots have positive polarity as denoted by "+". To achieve the checkerboard pattern, associated dot AD_2 also has positive polarity. Thus, the electrode of associated dot AD_2 is coupled to switching element SE_2. However, associated dots AD_1 and AD_3 have negative polarity, as denoted by "–". In a checkerboard pattern of polarities, the color dots that are diagonally adjacent to associated dots AD_1 and AD_3 should have the appropriate polarity. Thus, in some embodiments of the present invention the electrode of associated dots AD_1 and AD_3 are coupled to the electrode of at least one diagonally adjacent color dot from another pixel. In the particular embodiment of pixel design 540, the electrode of associated dot AD_1 and AD_3 are coupled to the electrode of the color dots that are to the right and above associated dot AD_1 and AD_3, respectively. These connections are illustrated by ITO connectors 542 and 544, respectively. As illustrated in FIG. 5(h), when pixel design 540 is in the negative dot polarity pattern (labeled as 540–), switching elements SE_1, SE_2, and SE_3, and all of the color dots have negative polarity. Associated dot AD_2 also has negative polarity. However, associated dots AD_1 and AD_3 have positive polarity, as denoted by "–".

Figure 6A:
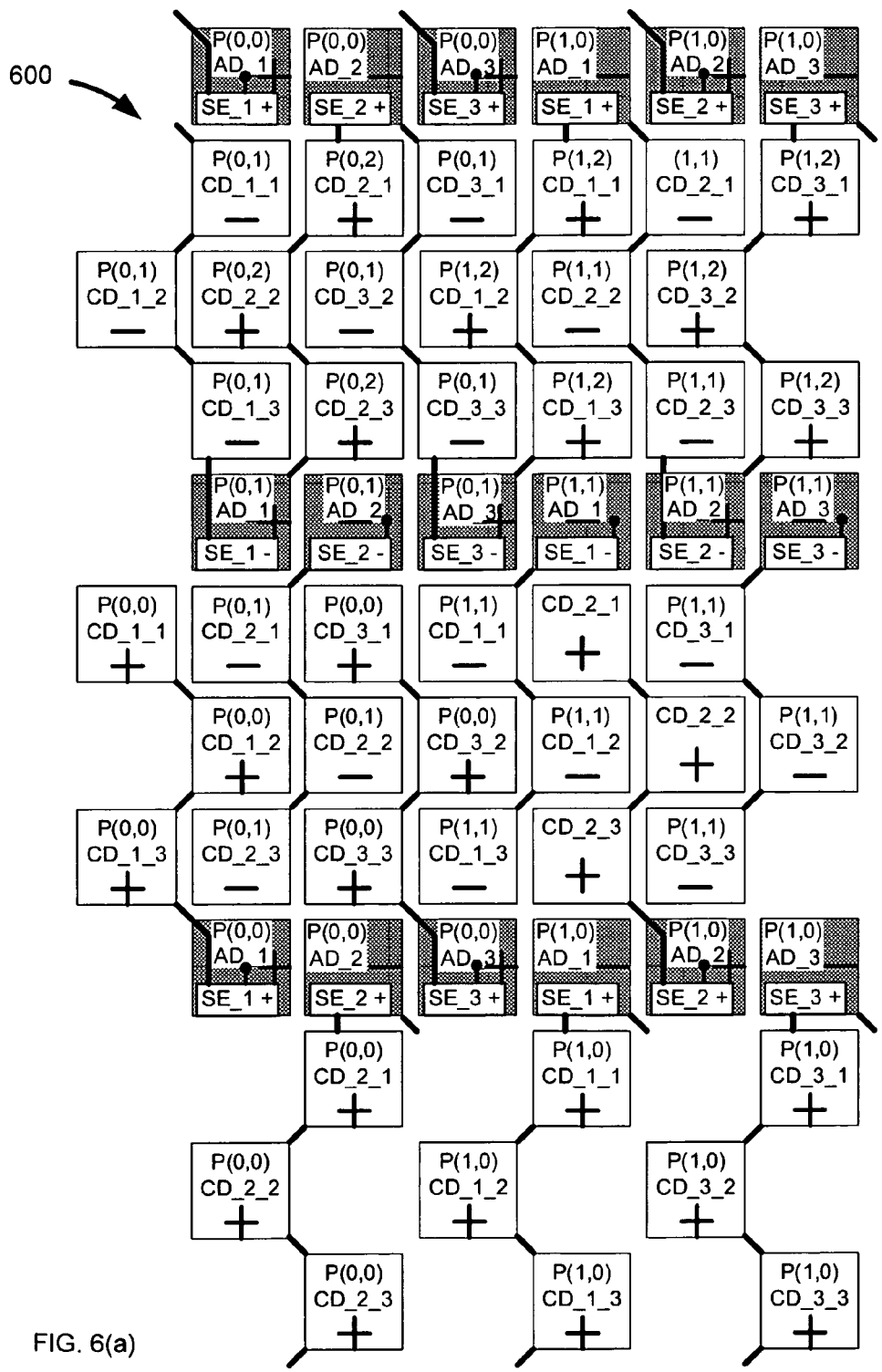
FIG. 6(*a*) illustrates a liquid crystal display in accordance with one embodiment of the present invention.

FIG. 6(a)) shows a portion of a display 600 that combines pixels using pixel designs 510, 520, 530 and 540 to create a checkerboard pattern of color dot polarities. For clarity, the gate lines and source lines that power the switching elements are omitted in FIG. 6(a). Gate lines and source lines are illustrated and described in details in FIG. 6(b). Furthermore, the background area of each pixel is shaded to more clearly show the components of each pixel. This shading is for illustrative purposes only. Each odd-numbered row of display 600 has alternating pixels of pixel design 540 and pixel design 530. For example in row 1, pixel P(0, 1) uses pixel design 540 and pixel P(1, 1) uses pixel design 530. Pixel P(2, 1) (not shown) would use pixel design 540. Each even-numbered row of display 600 has alternating pixels of pixels of pixel design 520 and 510. For example, in row 0, pixel P(0, 0) uses pixel design 520 and pixel P(1, 0) uses pixel design 510, and pixel P(2, 0) (not shown) uses pixel design 520. Within a row the associated dots of adjacent pixels are vertically aligned and horizontally separated by one horizontal dot spacing HDS (not labeled in FIG. 6(a)). The rows in display 600 are horizontally aligned and vertically interleaved so that some color dots from row 0 are vertically aligned with some of the color dots of row 1. Specifically, color dot CD_1_1 of pixel P(0,0) is vertically aligned with color dot CD_2_1 of pixel P(0, 1).

All the pixels on a row have the same polarity. However, alternating rows have different polarities. Thus for example, row 0 is shown with positive dot polarity while row 1 is show with negative dot polarity. In the next frame row 0 would have negative dot polarity while row 1 would have positive dot polarity. In general, even numbered rows have a first dot polarity pattern and odd number rows have a second dot polarity pattern. This arrangement of row polarity is an example of switching element row inversion driving scheme. In general a pixel P(X,Y) in display 600 uses pixel design 510 where X is odd and Y is even; pixel design 520 when X is even and Y is even; pixel design 530 when X is odd and Y is odd; and pixel design 540 where X is even and Y is odd. Furthermore, pixel P(X,Y) has a first dot polarity pattern when Y is even and a second dot polarity pattern when Y is odd.

As illustrated in FIG. 6(a), using the pixel designs described above, display 600 has a checkerboard pattern of dot polarities. Thus, each color dot will have four liquid crystal domains. Because each row of switching elements have the same polarity, while alternating rows of switching elements of opposite polarity, display 600 achieves four liquid crystal domains while only requiring a switching element row inversion driving scheme.

Figure 6B:
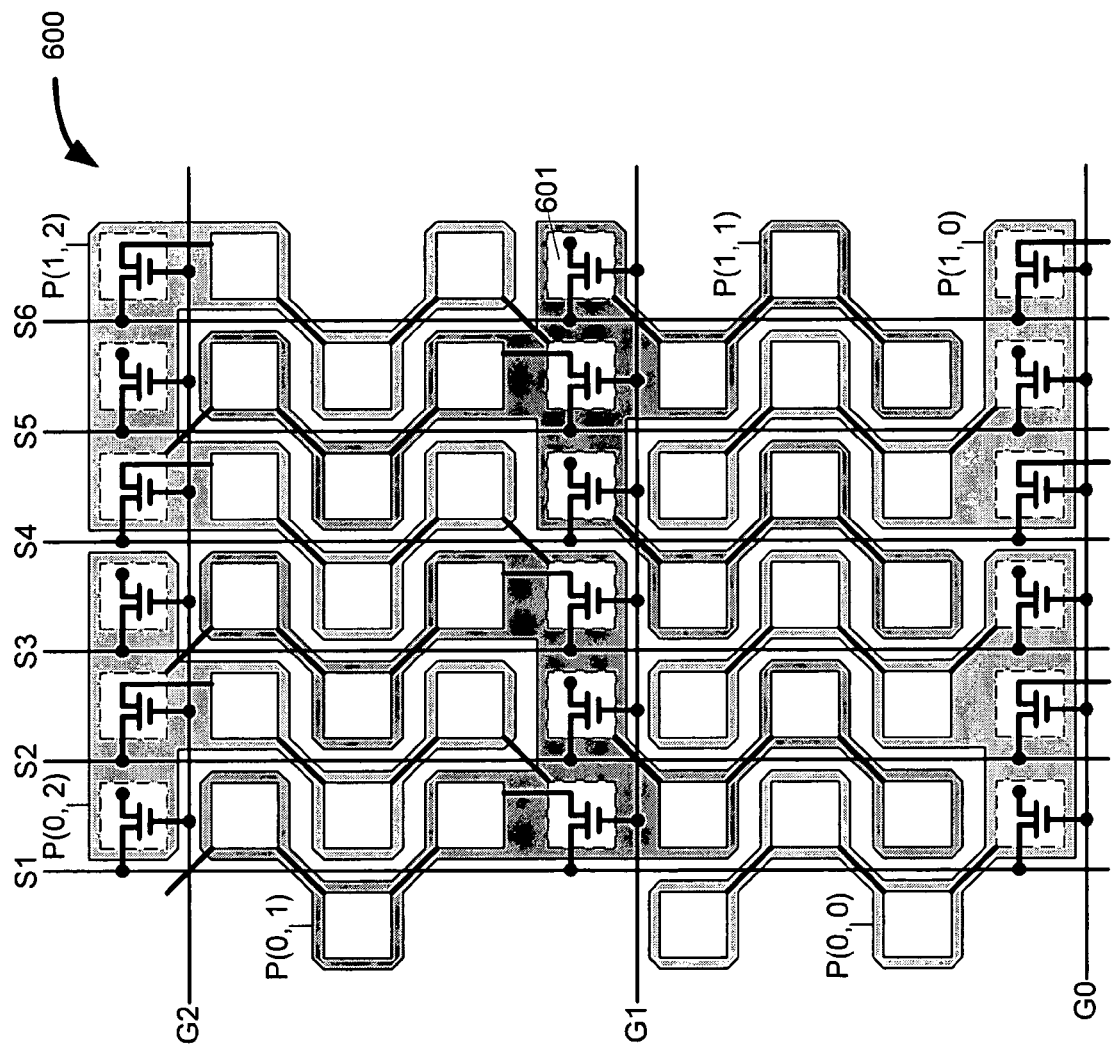

FIG. 6(b) illustrates a slightly different portion of display 600. FIG. 6 is drawn showing source lines (S1, S2, ... S6) and gate lines G0, G1 and G2. A transistor is coupled to a source line and a gate line. Specifically, gate lines are coupled to the control terminal of the transistors and source lines are coupled to a power terminal. For MOS transistors, gate lines are couple to the gate terminal and source lines are coupled to the source terminals of the transistors. For convenience, transistors are referenced as transistor T(X,Y) where X is the source line coupled to the transistor and Y is the gate line. Thus transistor 601 in FIG. 6 is referenced herein as transistor T(S6,G1). For clarity, associated dots are shown in dashed lines and color dots are shown with solid lines. Furthermore, the background area of each pixel is shaded to more clearly group the components of each pixel. This shading is for illustrative purposes only. Electrode connections are drawn in bold lines. A connection point (i.e. a dark circle) is used on the drain terminal of a transistor when the electrode of the associated dot is coupled to the transistor. For example Transistor T(S1, G2) has a connection point on the drain terminal to illustrate that the conductor of the associated dot is coupled to the transistor. Transistors T(S1, G2), T(S2, G2), and T(S3, G2) are the switching elements of pixel P(0, 2), which uses pixel design 520 (six color dots of pixel P(0, 2) are omitted in FIG. 6 due to space limitations). Transistors T(S4, G2), T(S5, G2), and T(S6, G2) are the switching elements of pixel P(1, 2), which uses pixel design 510 (three color dots of pixel P(1, 2) are omitted in FIG. 6). Transistors T(S1, G1), T(S2, G1), and T(S3, G1) are the switching elements of pixel P(0, 1), which uses pixel design 540. Transistors T(S4, G1), T(S5, G1), and T(S6, G1) are the switching elements of pixel P(1, 1), which uses pixel design 530. Transistors T(S1, G0), T(S2, G0), and T(S3, G0) are the switching elements of pixel P(0, 0) which uses pixel design 520 (three color dots of pixel P(0, 0) are omitted in FIG. 6). Transistors T(S4, G0), T(S5, G0), and T(S6, G0) are the switching elements of pixel P(1, 0), which uses pixel design 510 (six color dots of pixel P(1, 0) are omitted in FIG. 6).

As explained above, a first row type (even in FIGS. 6(*a*) and 6(*b*)) is formed using pixels alternating between pixel designs 510 and 520. A second row type (odd) is formed using pixels alternating between pixel design 530 and 540. For example in row 1 (using gate line G1), pixel P(0,1) (Transistors T(S1, G1), T(S2, G1), and T(S3, G1)) uses pixel design 540, pixel P(1,1) (Transistors T(S4, G1), T(S5, G1), and T(S6, G1)) uses pixel design 530, pixel P(2, 1) (not shown) uses pixel design 540. In row 0, pixels P(0,0) uses pixel design 520, pixel P(1,0) uses pixel design 510, pixel P(2,0) (not shown) uses pixel design 520, etc. Within a row the associated dots of adjacent pixels are vertically aligned and separated horizontally by horizontal dot spacing HDS. The rows are horizontally aligned and vertically interleaved so that the first and third color components of one row are vertically aligned with the second color component of an adjacent row. All the pixels on a row have the same polarity. However, alternating rows have different polarities. Thus for example, if row 1 has positive dot polarity, then row 0 and row 2 would have negative dot polarity. In the next frame row 1 would have negative dot polarity while row 0 and row 2 would have positive dot polarity.

Figure 7A:
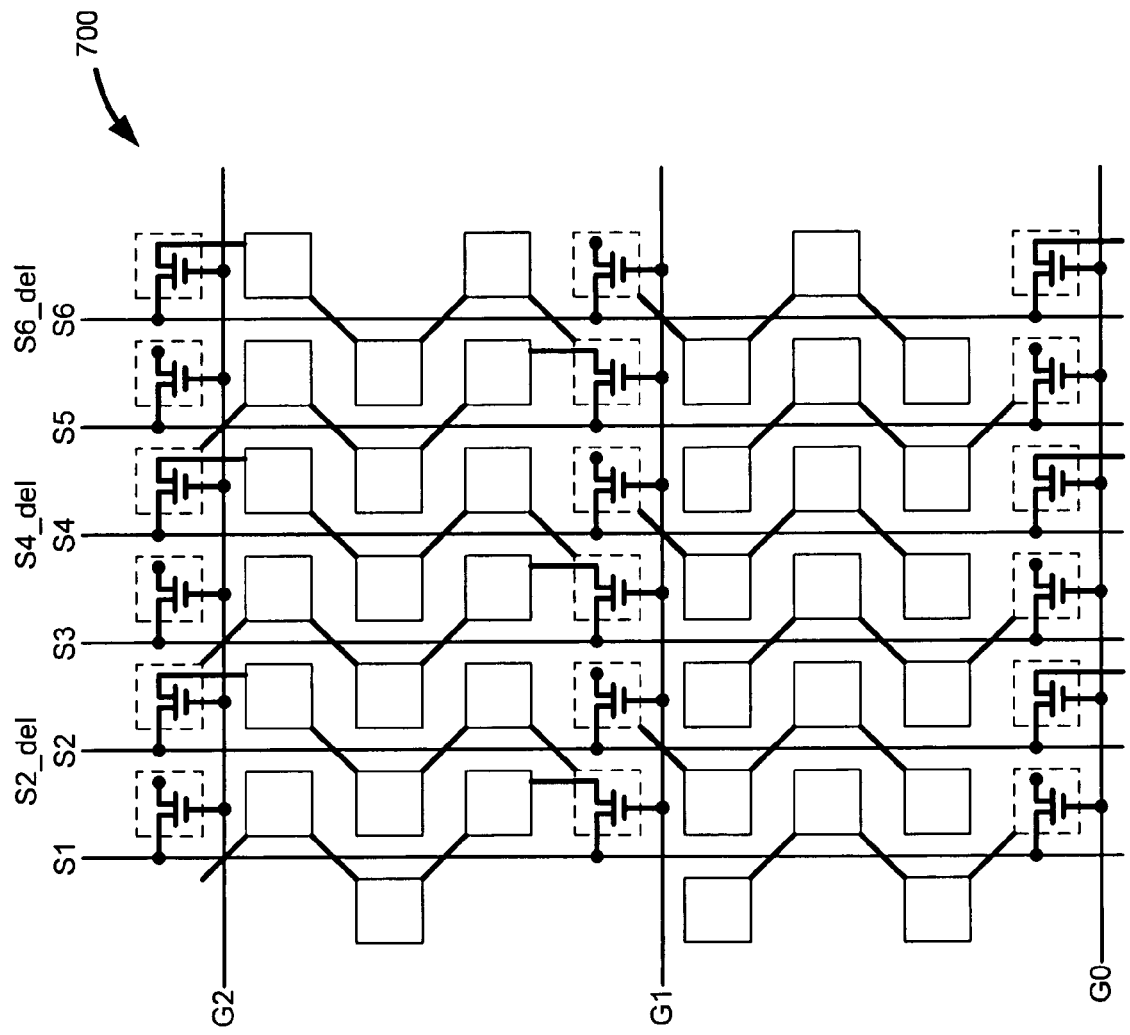
FIG. 7(*a*) illustrates a liquid crystal display in accordance with one embodiment of the present invention.

One potential issue with pixel designs 510, 520, 530, and 540 is color alignment due to the vertical offset between the second color component and the first and third color components of each pixel. Therefore, in some embodiments of the present invention a novel driving scheme is used to improve the color alignment. FIG. 7(*a*) illustrates a display 700 using the driving scheme in accordance with one embodiment of the present invention. FIG. 7(*a*) is similar to FIG. 6 except that signals applied to some of the source lines are delayed. Thus the description is not repeated. Specifically, delayed source signal S2_del, S4_del, and S6_del are applied to source lines S2, S4, and S6, respectively. The delayed source lines can be generated using a delay line or other conventional circuits from source signals S2, S4 and S6 (as used in FIG. 6(*b*)). The delay period is equal to one row refresh period. Because, the delayed source signals are generated from the normal source signals, the driving circuits and controllers do not need to be modified to be used with the novel driving scheme of the present invention.

As illustrated in FIG. 7(*b*), the color components of the pixels are realigned when using delayed source signals. In FIG. 7(*b*), the background areas of four pixels are shaded to highlight each pixel. This shading is for illustrative purposes only. A first pixel P1 includes transistors T(S1, G1), T(S2, G2), and T(S3, G1), the associated dots encompassing the transistors, as well as the color dots within the shaded area. The first color component of pixel P1 includes the three color dots that are coupled to transistor T(G1, S1). The second color component of pixel P1 includes the three color dots that are coupled to transistor T(S2, G2). The third color component of pixel P1 includes the three color dots that are coupled to transistor T(S3, G1). As illustrated in FIG. 7(*b*), the three color components of pixel P1 are vertically aligned, and thus eliminate the color alignment issue of FIGS. 6(*a*)-6(*b*). However, to achieve a checkerboard pattern, the polarity of the second color component needs to be opposite the polarity of the first and third color component. However, the transistor for the second component is on a different row than the transistor for the first and third component. Furthermore, all switching elements on a row of switching elements (i.e. sharing a common gate line) have the same polarity, while alternating rows of switching elements use opposite polarities. Thus, display 700 can use switching element row inversion driving scheme to achieve the checkerboard pattern of dot polarities which results in four domains per color dots.

A second pixel P2 includes transistors T(S4, G2), T(S5, G1), and T(S6, G2), the associated dots encompassing the transistors, as well as the color dots, which are coupled to these transistor. For clarity, the associated dots and color dots of pixel P2 are highlighted with a common background shading. A third pixel P3 includes transistors T(S1, G0), T(S2, G1), and T(S3, G0), the associated dots encompassing the transistors, as well as the color dots, which are coupled to these transistors. In pixel P3, the color dots are coupled to the transistors via the associated dot. For clarity, the associated dots and color dots of pixel P3 are highlighted with a common background shading. A fourth pixel P4 includes transistors T(S4, G1), T(S5, G0), and T(S6, G1), the associated dots encompassing the transistors, as well as the color dots, coupled to these transistors. In pixel P4, the color dots are coupled to the transistors via the associated dots. For clarity, the associated dots and color dots of pixel P4 are highlighted with a common background shading. Pixels P1, P2, P3, and P4 are described in greater detail below and illustrated in FIGS. 8(*a*)-8(*i*).

FIG. 8(*a*) shows the positive dot polarity pattern of a spread pixel design 810 (labeled 810+). Pixel P4 in FIG. 7(*b*) is an example of pixel design 810. In pixel design 810, the first color component has three color dots CD_1_1, CD_1_2, and CD_1_3 arranged in a left-right-left zigzag pattern. An associated dot AD_1 is positioned offset horizontally to the right of color dot CD_1_1 by horizontal dot offset HDO and offset vertically above color dot CD_1_1 by vertical dot offset VDO. A switching element SE_1 is positioned within associated dot AD_1. The electrode of associated dot AD_1 is coupled to switching element SE_1. The electrode in color dot CD_1_1 is coupled to switching element SE_1 via the electrode of associated dot AD_1; the electrode of color dot CD_1_2 is coupled to switching element SE_1 via the electrodes of color dot CD_1_1 and the electrode of associated dot AD_1; and the electrode of color dot CD_1_3 is coupled to switching element SE_1 via the electrodes of color dots CD_1_2 and CD_1_1 and the electrode associated dot AD_1. The second color component of spread pixel design 810 has three color dots CD_2_1, CD_2_2, and CD_2_3 arranged in a left-right-left zigzag pattern. The second color component is positioned so that the second color component is vertically aligned with the first color component and offset horizontally to the right of the first color component by horizontal dot offset HDO. An associated dot AD_2 is positioned offset horizontally to the right of color dot cd_2_3 by horizontal dot offset HDO and offset vertically below color dot CD_2_3 by vertical dot offset VDO. A switching element SE_2 is positioned within associated dot AD_2. The electrode of associated dot AD_2 is coupled to switching element SE_2. The electrode in color dot CD_2_3 is coupled to switching element SE_2 via the electrode of associated dot AD_2; the electrode of color dot CD_2_2 is coupled to switching element SE_2 via the electrodes of color dot CD_2_3 and the electrode of associated dot AD_2; and the electrode of color dot CD_2_1 is coupled to switching element SE_2 via the electrodes of color dots CD_2_2 and CD_2_3 and the electrode of associated dot AD_2. The third color component of spread pixel design 810 has three color dots CD_3_1, CD_3_2, and CD_3_3 arranged in a left-right-left zigzag pattern. The third color component is positioned vertically aligned with the second color component and horizontally offset to the right of the second color component by horizontal dot offset HDO. An associated dot AD_3 is positioned offset horizontally to the right of color dot CD_3_1 by horizontal dot offset HDO and offset vertically above color dot CD_3_1 by vertical dot spacing VDO. A switching element SE_3 is positioned within associated dot AD_3. The electrode of associated dot AD_3 is coupled to switching element SE_3. The electrode in color dot CD_3_1 is coupled to switching element SE_3 via the electrode of associated dot AD_3; the electrode of color dot CD_3_2 is coupled to switching element SE_3 via the electrodes of color dot CD_3_1 and the electrode of associated dot AD_3; and the electrode of color dot CD_3_3 is coupled to switching element SE_3 via the electrodes of color dots CD_3_2 and CD_3_1 and the electrode of associated dot AD_3.

Figures 8A, 8B:
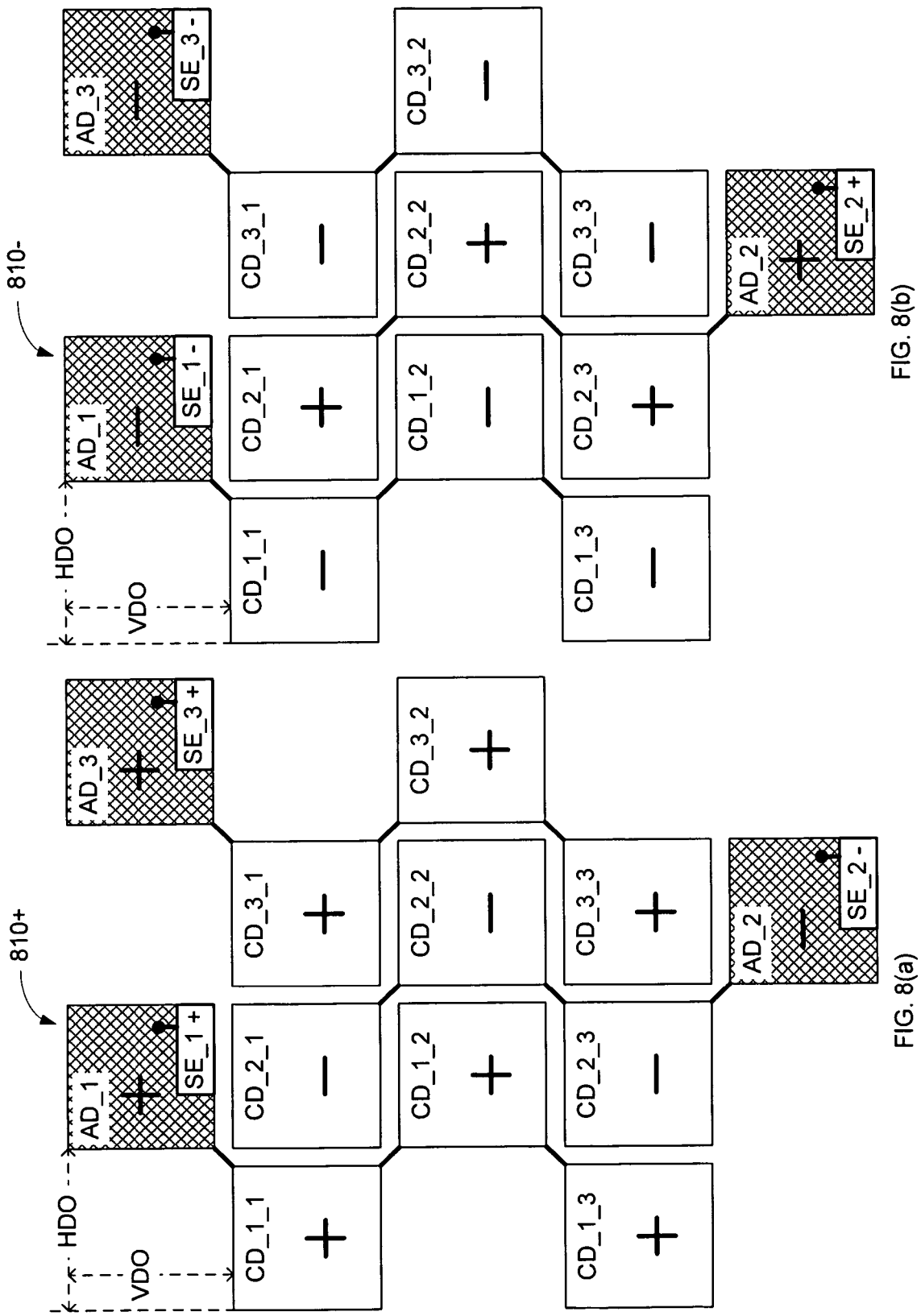
FIGS. 8(*a*)-8(*b*) illustrate a pixel design in accordance with one embodiment of the present invention.

As explained above, a checkerboard pattern of dot polarities is desirable to amplify the fringe fields in each color dot. In FIG. 8(a) pixel design 810 is in the positive dot polarity pattern. Accordingly, switching elements SE_1 and SE_3, associated dots AD_1 and AD_3, color dots CD_1_1, CD_1_2, CD_1_3, CD_3_1, CD_3_2, and CD_3_3 have positive polarity as denoted by "+". Switching element SE_2, associated dot AD_2, color dots CD_2_1, CD_2_2, and CD_2_3 have negative polarity, as denoted by "−".

FIG. 8(b) shows the negative dot polarity pattern of pixel design 810 (labeled 810−). Specifically, switching elements SE_1 and SE_3, associated dot AD_1 and AD_3, color dots CD_1_1, CD_1_2, CD_1_3, CD_3_1, CD_3_2, and CD_3_3 have negative polarity as denoted by "−"; and switching element SE_2, associated dot AD_2, color dots CD_2_1, CD_2_2, and CD_2_3 have positive polarity as denoted by "−".

Figure 7B:
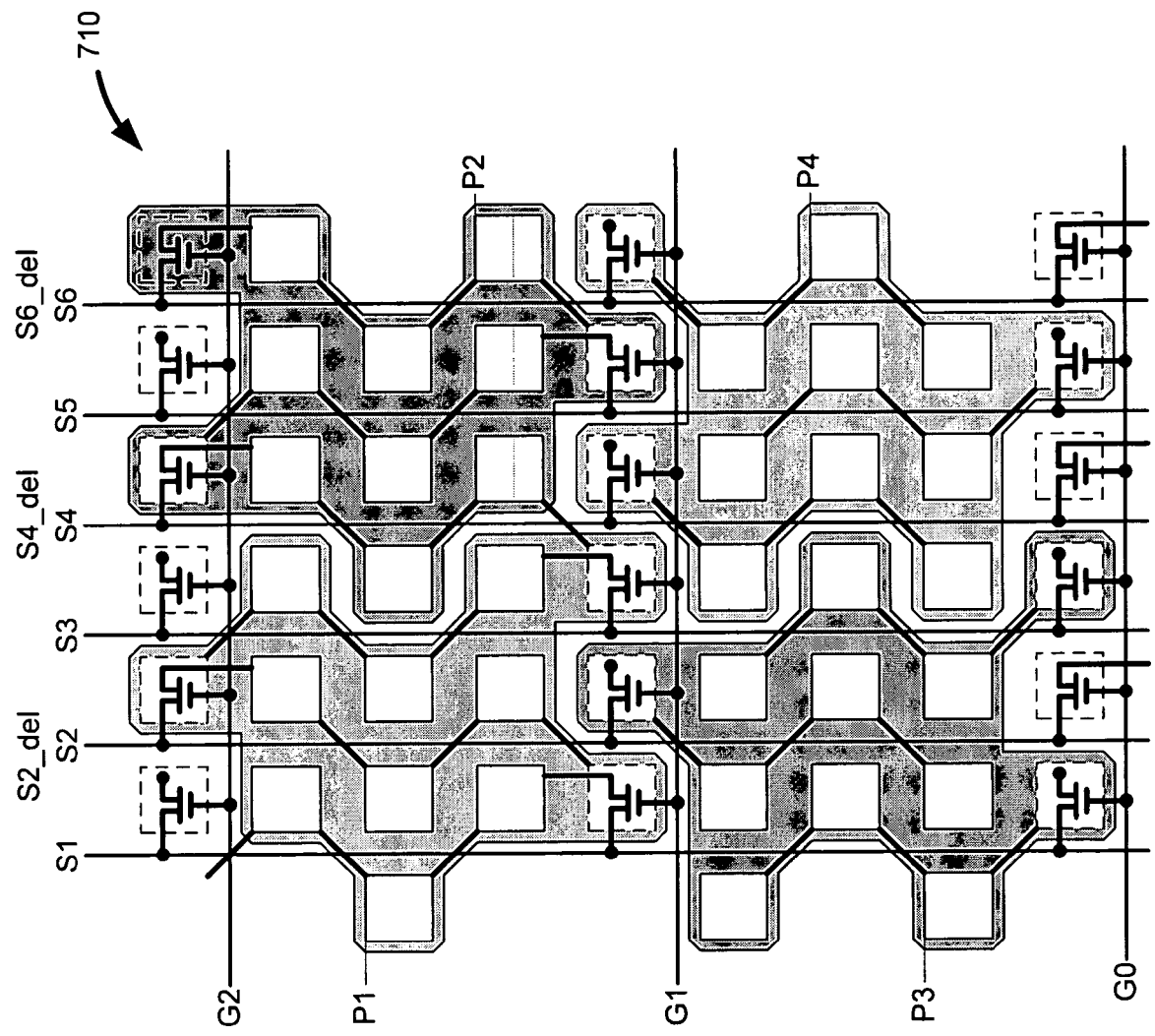
Figures 8C, 8D:
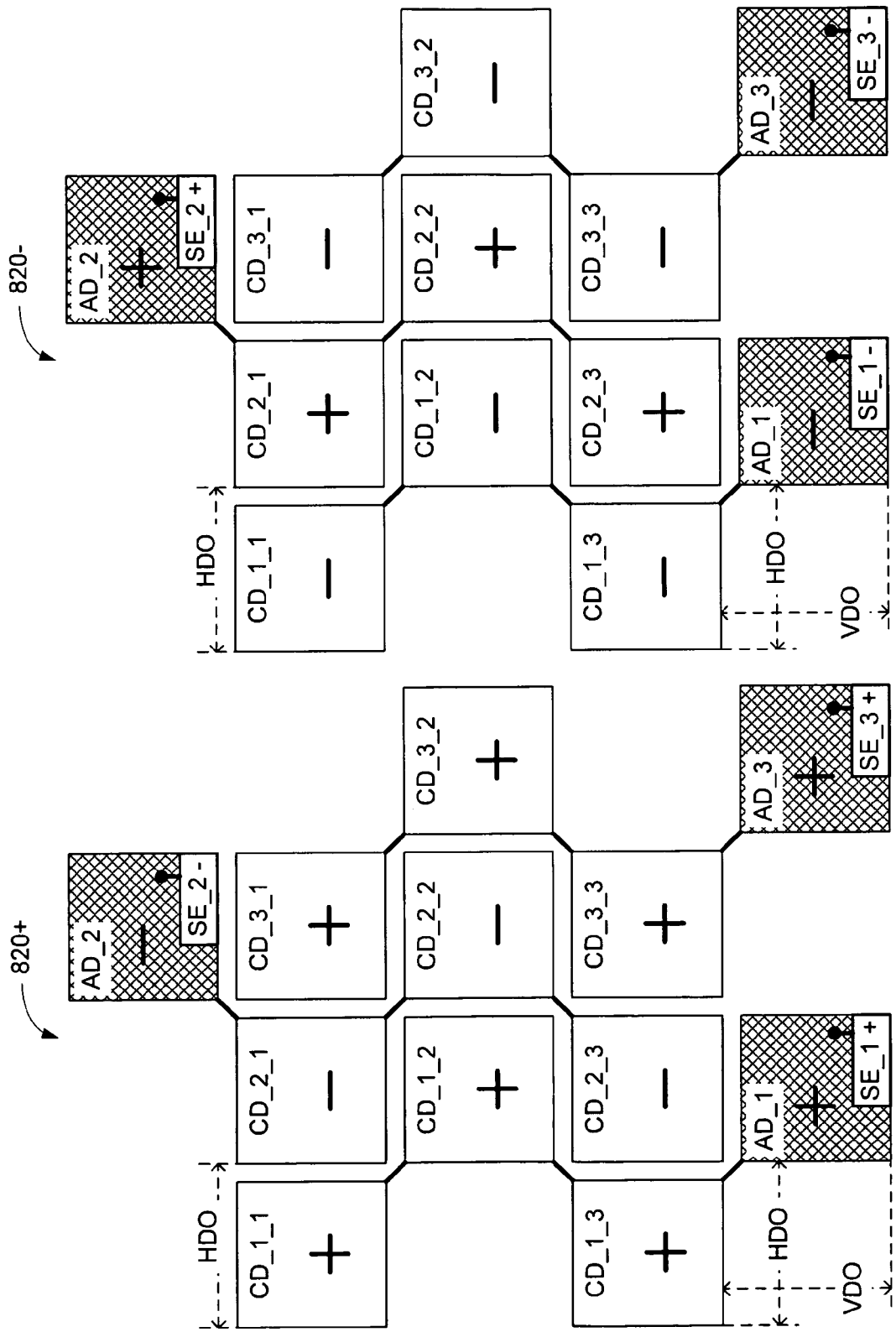

FIG. 8(c) shows the positive dot polarity pattern of a spread pixel design 820 (e.g. pixel P3 in FIG. 7(b)). In pixel design 820, the first color component has three color dots CD_1_1, CD_1_2, and CD_1_3 arranged in a left-right-left zigzag pattern. An associated dot AD_1 is positioned offset horizontally to the right of color dot CD_1_3 by horizontal dot offset HDO and offset vertically below color dot CD_1_3 by vertical dot offset VDO. A switching element SE_1 is positioned within associated dot AD_1. The electrode of associated dot AD_1 is coupled to switching element SE_1. The electrode in color dot CD_1_3 is coupled to switching element SE_1 via the electrode of associated dot AD_1; the electrode of color dot CD_1_2 is coupled to switching element SE_1 via the electrodes of color dot CD_1_3 and the electrode of associated dot AD_1; and the electrode of color dot CD_1_1 is coupled to switching element SE_1 via the electrodes of color dots CD_1_2 and CD_1_3 and the electrode associated dot AD_1. The second color component of spread pixel design 820 has three color dots CD_2_1, CD_2_2, and CD_2_3 arranged in a left-right-left zigzag pattern. The second color component is positioned so that the second color component is vertically aligned with the first color component and offset horizontally to the right of the first color component by horizontal dot offset HDO. An associated dot AD_2 is positioned offset horizontally to the right of color dot cd_2_1 by horizontal dot offset HDO and offset vertically above color dot CD_2_1 by vertical dot offset VDO. A switching element SE_2 is positioned within associated dot AD_2. The electrode of associated dot AD_2 is coupled to switching element SE_2. The electrode in color dot CD_2_1 is coupled to switching element SE_2 via the electrode of associated dot AD_2; the electrode of color dot CD_2_2 is coupled to switching element SE_2 via the electrodes of color dot CD_2_1 and the electrode of associated dot AD_2; and the electrode of color dot CD_2_3 is coupled to switching element SE_2 via the electrodes of color dots CD_2_2 and CD_2_1 and the electrode of associated dot AD_2. The third color component of spread pixel design 820 has three color dots CD_3_1, CD_3_2, and CD_3_3 arranged in a left-right-left zigzag pattern. The third color component is positioned vertically aligned with the second color component and horizontally offset to the right of the second color component by horizontal dot offset HDO. An associated dot AD_3 is positioned offset horizontally to the right of color dot CD_3_3 by horizontal dot offset HDO and offset vertically above color dot CD_3_3 by vertical dot offset VDO. A switching element SE_3 is positioned within associated dot AD_3. The electrode of associated dot AD_3 is coupled to switching element SE_3. The electrode in color dot CD_3_3 is coupled to switching element SE_3 via the electrode of associated dot AD_3; the electrode of color dot CD_3_2 is coupled to switching element SE_3 via the electrodes of color dot CD_3_3 and the electrode of associated dot AD_3; and the electrode of color dot CD_3_1 is coupled to switching element SE_3 via the electrodes of color dots CD_3_2 and CD_3_3 and the electrode of associated dot AD_3.

As explained above, a checkerboard pattern of dot polarities is desirable to amplify the fringe fields in each color dot. In FIG. 8(c) pixel design 820 is in the positive dot polarity pattern. Accordingly, switching elements SE_1 and SE_3, associated dot AD_1 and AD_3, color dots CD_1_1, CD_1_2, CD_1_3, CD_3_1, CD_3_2, and CD_3_3 have positive polarity as denoted by "+". Switching element SE_2, associated dot AD_2, color dots CD_2_1, CD_2_2, and CD_2_3 have negative polarity, as denoted by "−".

FIG. 8(d) illustrates the negative dot polarity patter of pixel design 820. Accordingly, switching elements SE_1 and SE_3, associated dot AD_1 and AD_3, color dots CD_1_1, CD_1_2, CD_1_3, CD_3_1, CD_3_2, and CD_3_3 have negative polarity as donated by "−"; and switching element SE_2, associated dot AD_2, color dots CD_2_1, CD_2_2, and CD_2_3 have positive polarity as denoted by "+".

FIG. 8(e) shows the positive dot polarity pattern of a spread pixel design 830 (e.g. pixel P2 in FIG. 7(b)). In pixel design 830, the first color component has three color dots CD_1_1, CD_1_2, and CD_1_3 arranged in a right-left-right zigzag pattern. An associated dot AD_1 is positioned aligned horizontally with CD_1_1 and offset vertically above color dot CD_1_1 by vertical dot offset VDO. A switching element SE_1 is positioned within associated dot AD_1. The electrode in color dot CD_1_1 is coupled to switching element SE_1; the electrode of color dot CD_1_2 is coupled to switching element SE_1 via the electrodes of color dot CD_1_1; and the electrode of color dot CD_1_3 is coupled to switching element SE_1 via the electrodes of color dots CD_1_2 and CD_1_1. The second color component of spread pixel design 830 has three color dots CD_2_1, CD_2_2, and CD_2_3 arranged in a right-left-right zigzag pattern. The second color component is positioned so that the second color component is vertically aligned with the first color component and offset horizontally to the right of the first color component by horizontal dot offset HDO. An associated dot AD_2 is positioned aligned horizontally with color dot CD_2_3 and offset vertically below color dot CD_2_3 by vertical dot offset VDO. A switching element SE_2 is positioned within associated dot AD_2. The electrode in color dot CD_2_3 is coupled to switching element SE_2; the electrode of color dot CD_2_2 is coupled to switching element SE_2 via the electrodes of color dot CD_2_3; and the electrode of color dot CD_2_1 is coupled to switching element SE_2 via the electrodes of color dots CD_2_2 and CD_2_3. The third color component of spread pixel design 830 has three color dots CD_3_1, CD_3_2, and CD_3_3 arranged in a right-left-right zigzag pattern. The third color component is positioned vertically aligned with the second color component and horizontally offset to the right of the second color component by horizontal dot offset HDO. An associated dot AD_3 is positioned aligned horizontally with color dot CD_3_1 and offset vertically above color dot CD_3_1 by vertical dot offset VDO. A switching element SE_3 is positioned within associated dot AD_3. The electrode in color dot CD_3_1 is coupled to switching element SE_3; the electrode of color dot CD_3_2 is coupled to switching element SE_3 via the electrodes of color dot CD_3_1; and the electrode of color dot CD_3_3 is coupled to switching element SE_3 via the electrodes of color dots CD_3_2 and CD_3_1.

As explained above, a checkerboard pattern of dot polarities is desirable to amplify the fringe fields in each color dot. In FIG. 8(e) pixel design 830 is in the positive dot polarity pattern. Accordingly, switching elements SE_1 and SE_3, color dots CD_1_1, CD_1_2, CD_1_3, CD_3_1, CD_3_2, and CD_3_3 have positive polarity as denoted by "+". Switching element SE_2, color dots CD_2_1, CD_2_2, and CD_2_3 have negative polarity, as denoted by "+". Associated dot AD_1 and AD_3 also have negative dot polarity, however because switching elements SE_1 and SE_3 have positive polarity, associated dot AD_1 and AD_3 receives the positive polarity from a diagonally adjacent color dot. In the embodiment of FIG. 8(e), associated dots AD_1 and AD_3 are configured to receive polarity from a color dot (not shown) to the right and above each associated dot as denoted by ITO connectors 832 and 834 respectively. The conductor of associated dot AD_2 is coupled to color dot CD_3_3 to receive negative polarity by ITO connector 836.

FIG. 8(f) shows the negative dot polarity pattern for pixel design 830 (labeled as 830−). When pixel design 830 is in the negative dot polarity pattern, switching elements SE_1 and SE_3, color dots CD_1_1, CD_1_2, CD_1_3, CD_3_1, CD_3_2, and CD_3_3 have negative polarity as denoted by "−"; and switching element SE_2, associated dot AD_1 and AD_3, and color dots CD_2_1, CD_2_2, and CD_2_3 have positive polarity as denoted by +

FIG. 8(g) shows the positive dot polarity pattern of a spread pixel design 840 (e.g. pixel P1 in FIG. 7(b)). In pixel design 840, the first color component has three color dots CD_1_1, CD_1_2, and CD_1_3 arranged in a right-left-right zigzag pattern. An associated dot AD_1 is positioned aligned horizontally with color dot CD_1_3 and offset vertically below color dot CD_1_3 by vertical dot offset VDO. A switching element SE_1 is positioned within associated dot AD_1. The electrode in color dot CD_1_3 is coupled to switching element SE_1; the electrode of color dot CD_1_2 is coupled to switching element SE_1 via the electrodes of color dot CD_1_3; and the electrode of color dot CD_1_1 is coupled to switching element SE_1 via the electrodes of color dots CD_1_2 and CD_1_3. The second color component of spread pixel design 840 has three color dots CD_2_1, CD_2_2, and CD_2_3 arranged in a right-left-right zigzag pattern. The second color component is positioned so that the second color component is vertically aligned with the first color component and offset horizontally to the right of the first color component by horizontal dot offset HDO. An associated dot AD_2 is positioned aligned horizontally with color dot cd_2_1 and offset vertically above color dot CD_2_1 by vertical dot offset VDO. A switching element SE_2 is positioned within associated dot AD_2. The electrode in color dot CD_2_1 is coupled to switching element SE_2; the electrode of color dot CD_2_2 is coupled to switching element SE_2 via the electrodes of color dot CD_2_1; and the electrode of color dot CD_2_3 is coupled to switching element SE_2 via the electrodes of color dots CD_2_2 and CD_2_1. The third color component of spread pixel design 840 has three color dots CD_3_1, CD_3_2, and CD_3_3 arranged in a right-left-right zigzag pattern. The third color component is positioned vertically aligned with the second color component and horizontally offset to the right of the second color component by horizontal dot offset HDO. An associated dot AD_3 is positioned aligned horizontally with color dot CD_3_3 and offset vertically below color dot CD_3_3 by vertical dot offset VDO. A switching element SE_3 is positioned within associated dot AD_3. The electrode in color dot CD_3_3 is coupled to switching element SE_3; the electrode of color dot CD_3_2 is coupled to switching element SE_3 via the electrodes of color dot CD_3_3; and the electrode of color dot CD_3_1 is coupled to switching element SE_3 via the electrodes of color dots CD_3_2 and CD_3_3.

As explained above, a checkerboard pattern of dot polarities is desirable to amplify the fringe fields in each color dot. In FIG. 8(g) pixel design 840 is in the positive dot polarity pattern. Accordingly, switching elements SE_1 and SE_3, color dots CD_1_1, CD_1_2, CD_1_3, CD_3_1, CD_3_2, and CD_3_3 have positive polarity as denoted by "+". Switching element SE_2, color dots CD_2_1, CD_2_2, and CD_2_3 have negative polarity, as denoted by "−". Associated dot AD_1 and AD_3 also have negative polarity, however because switching elements SE_1 and SE_3 have positive polarity, associated dot AD_1 and AD_3 receives the positive polarity from a diagonally adjacent color dot. In the embodiment of FIG. 8(g), associated dots AD_1 receives negative polarity from color dot CD_2_3 via ITO connector 842. Associated dot AD_3 is configured to receive polarity from a color dot (not shown) to the right and above associated dot AD_2 using ITO connector 846. Conversely, associated dot AD_2 is positive polarity but switching element SE_2 has negative polarity. Thus, associated dot AD_2 is configured to receive positive polarity from a color dot (not shown) to the right and above associated dot CD_2_3 using ITO connector 844.

FIG. 8(h) shows the negative dot polarity pattern of pixel design 840 (labeled as 840−). When pixel design 840 is in the negative dot polarity pattern, switching elements SE_1 and SE_3, color dots CD_1_1, CD_1_2, CD_1_3, CD_3_1, CD_3_2, and CD_3_3 have negative polarity as denoted by "−"; and switching element SE_2, associated dot AD_1 and AD_3, color dots CD_2_1, CD_2_2, and CD_2_3 have positive polarity as denoted by "+".

Figure 8I:
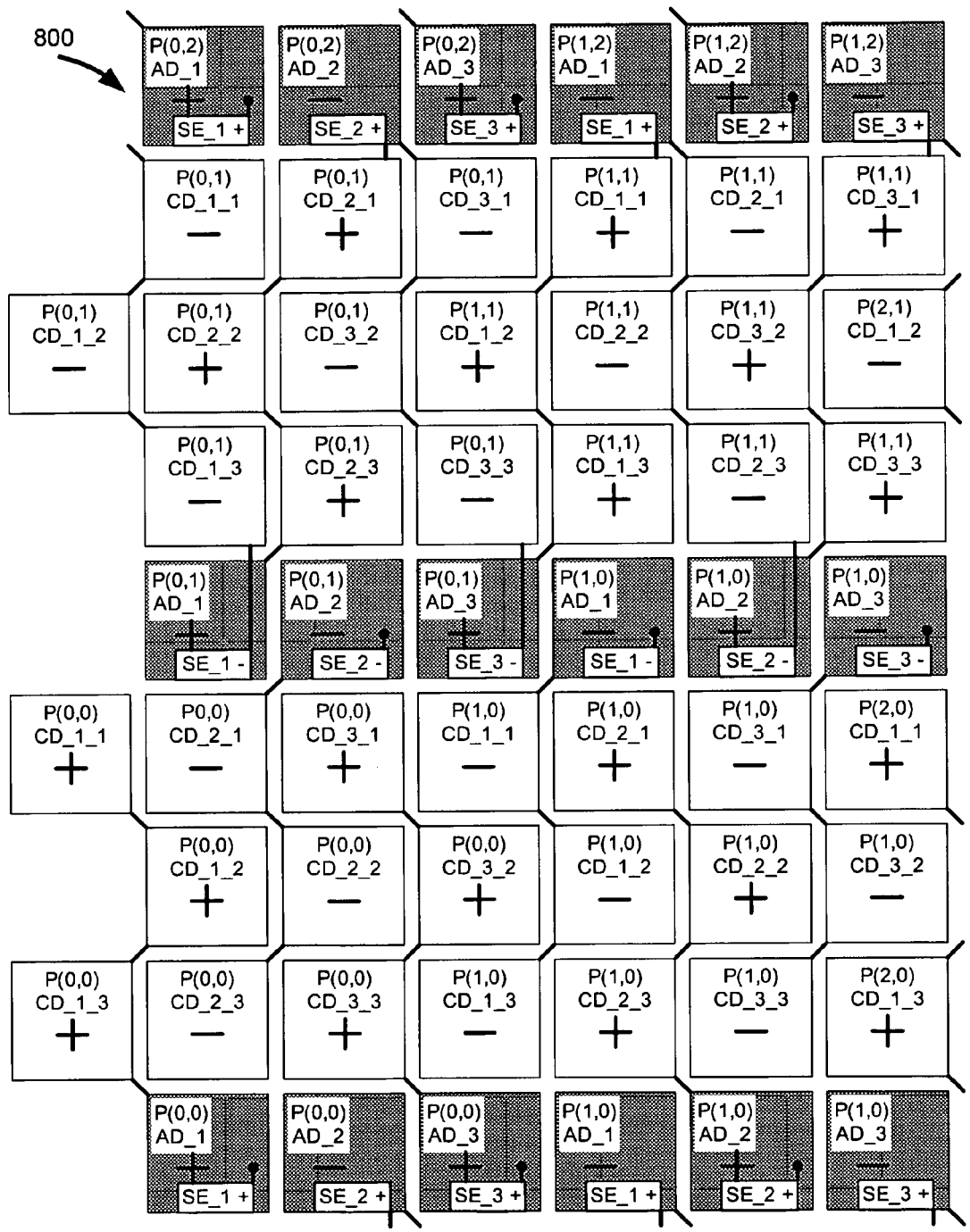

FIG. 8(i) which is similar to FIG. 7(b) described above, illustrates a portion of a display 800 using pixel designs 810, 820, 830 and 840. In general, a first row type is formed using pixels alternating between pixel designs 820 and 810. A second row type formed using pixels alternating between pixel design 840 and 830. Specifically in display 800, pixels on even rows alternate between pixel design 820 and 810. For example on row 0, pixel P(0, 0) uses pixel design 820, pixel P(0, 1) uses pixel design 810, and pixel P(0, 2) (not shown) uses pixel design 820. Pixels on odd rows alternate between pixel designs 840 and 830. For example on row 1, pixel P(0, 1) uses pixel design 840, pixel P(1, 1) uses pixel design 830, and pixel P(2, 1) (not shown) uses pixel design 840. Within a row the associated dots of adjacent pixels are vertically aligned and horizontally separated by one horizontal dot spacing HDS. The rows are horizontally aligned and vertically interleaved so that vertically the associated dots at the top of a first row of pixels form a row with the associated dots at the bottom of a second row of pixels. The pixels on each row have alternating dot polarity. Furthermore, pixels in each column also have alternating dot polarities. For example, pixels P(0, 0) and P(1, 1) have positive dot polarities and pixels P(0, 1) and P(1, 0) have negative dot polarities. Even though the dot polarity pattern of each pixel on a row of pixel alternates between the positive dot polarity pattern and the negative polarity pattern, display 800 can still use switching element row inversion driving schemes due to the placement of the switching elements of a pixel on multiple rows and using the delayed source lines described above with respect to FIGS. 7(*a*) and 7(*b*) and further described in detail in copending co-owned U.S. patent application Ser. No. 11/751,469, (entitled "Low Cost Switching Element Point Inversion Driving Scheme for Liquid Crystal Displays" by Hiap L. Ong) which is incorporated herein by reference.

One skilled in the art can adapt the principles of the invention presented in FIGS. 7(*a*), 7(*b*), and 8(*a*)-8(*i*) for use with a variety of pixel designs. For example FIGS. 9(*a*)-9(*d*) show 2 pixel designs with 2 color dots per color component that can be used with the delay source line driving scheme. Specifically, FIG. 9(*a*) shows the positive dot polarity pattern of a spread pixel design 910 (labeled 910+). In pixel design 910, the first color component has two color dots CD_1_1 and CD_1_2 arranged in a right-left zigzag pattern. An associated dot AD_1 is positioned offset horizontally to the left of CD_1_1 by horizontal dot offset HDO and offset vertically above color dot CD_1_1 by vertical dot offset VDO. A switching element SE_1 is positioned within associated dot AD_1. The electrode in associated dot AD_1 is coupled to switching element SE_1. The electrode in color dot CD_1_1 is coupled to switching element SE_1 via the electrode in associated dot AD_1; and the electrode of color dot CD_1_2 is coupled to switching element SE_1 via the electrodes of color dot CD_1_1 and the electrode in associated dot AD_1. The second color component of spread pixel design 910 has two color dots CD_2_1 and CD_2_2 arranged in a right-left zigzag pattern. The second color component is positioned so that the second color component is vertically aligned with the first color component and offset horizontally to the right of the first color component by horizontal dot offset HDO. An associated dot AD_2 is positioned aligned horizontally with color dot cd_2_2 and offset vertically below color dot CD_2_2 by vertical dot offset VDO. A switching element SE_2 is positioned within associated dot AD_2. The electrode in color dot CD_2_2 is coupled to switching element SE_2; and the electrode of color dot CD_2_1 is coupled to switching element SE_2 via the electrodes of color dot CD_2_2. The third color component of spread pixel design 910 has two color dots CD_3_1 and CD_3_2 arranged in a right-left zigzag pattern. The third color component is positioned vertically aligned with the second color component and horizontally offset to the right of the second color component by horizontal dot offset HDO. An associated dot AD_3 is positioned offset horizontally to the let of CD_3_1 by horizontal dot offset HDO and offset vertically above color dot CD_3_1 by vertical dot offset VDO. A switching element SE_3 is positioned within associated dot AD_3. The electrode in associated dot AD_3 is coupled to switching element SE_3. The electrode in color dot CD_3_1 is coupled to switching element SE_3 via associated dot AD_3; and the electrode of color dot CD_3_2 is coupled to switching element SE_3 via the electrodes of color dot CD_3_1 and the electrode in associated dot AD_3.

As explained above, a checkerboard pattern of dot polarities is desirable to amplify the fringe fields in each color dot. In FIG. 9(*a*) pixel design 910 is in the positive dot polarity pattern. Accordingly, switching elements SE_1 and SE_3, associated dots AD_1 and AD_3, and color dots CD_1_1, CD_1_2, CD_3_1, and CD_3_2 have positive polarity as denoted by "+". Switching element SE_2, color dots CD_2_1 and CD_2_2, and CD_2_3 have negative polarity, as denoted by "−". Associated dot AD_2, which is adjacent to color dot CD_2_2 should also have positive polarity. However, switching element SE_2 has positive polarity. Therefore, the conductor of associated dot AD_2 is coupled to the conductor of a diagonally adjacent color dot. In the embodiment of FIG. 9(*a*), the electrode of associated dot AD_2 is configured to be coupled to a color dot to the right and below associated dot AD_2 as shown by ITO connector 912.

FIG. 9(*b*) shows the negative dot polarity pattern of pixel design 910 (labeled 910−). When pixel design 910 is in the negative dot polarity pattern, switching elements SE_1 and SE_3, associated dots AD_1, AD_2, and AD_3, and color dots CD_1_1, CD_1_2, CD_3_1, and CD_3_2 have negative polarity as denoted by "−"; and switching element SE_2, color dots CD_2_1 and CD_2_2, and CD_2_3 have positive polarity as denoted by "+".

FIG. 9(*c*) shows the positive dot polarity pattern of a spread pixel design 920. In pixel design 920, the first color component has two color dots CD_1_1 and CD_1_2 arranged in a right-left zigzag pattern. An associated dot AD_1 is positioned aligned horizontally with color dot CD_1_2 and offset vertically below color dot CD_1_2 by vertical dot spacing VDO. A switching element SE_1 is positioned within associated dot AD_1. The electrode in color dot CD_1_1 is coupled to switching element SE_1; and the electrode of color dot CD_1_1 is coupled to switching element SE_1 via the electrodes of color dot CD_1_2. The second color component of spread pixel design 920 has two color dots CD_2_1 and CD_2_2 arranged in a right-left zigzag pattern. The second color component is positioned so that the second color component is vertically aligned with the first color component and offset horizontally to the right of the first color component by horizontal dot offset HDO. An associated dot AD_2 is positioned offset horizontally to the left of color dot cd_2_1 by horizontal dot offset HDO and offset vertically above color dot CD_2_1 by vertical dot offset VDO. A switching element SE_2 is positioned within associated dot AD_2. The electrode of associated dot AD_2 is coupled to switching element SE_2. The electrode in color dot CD_2_1 is coupled to switching element SE_2; and the electrode of color dot CD_2_2 is coupled to switching element SE_2 via the electrodes of color dot CD_2_1. Some embodiments of the present invention would couple the electrode of color dot CD_2_1 to switching element SE_2 via the conductor in associated dot AD_2. The third color component of spread pixel design 920 has three color dots CD_3_1 and CD_3_2 arranged in a right-left zigzag pattern. The third color component is positioned vertically aligned with the second color component and horizontally offset to the right of the second color component by horizontal dot offset HDO. An associated dot AD_3 is positioned aligned horizontally with color dot CD_3_2 and offset vertically below color dot CD_3_2 by vertical dot offset VDO. A switching element SE_3 is positioned within associated dot AD_3. The electrode in color dot CD_3_2 is coupled to switching element SE_3; and the electrode of color dot CD_3_1 is coupled to switching element SE_3 via the electrodes of color dot CD_3_2.

As explained above, a checkerboard pattern of dot polarities is desirable to amplify the fringe fields in each color dot. In FIG. 9(c) pixel design 920 is in the positive dot polarity pattern. Accordingly, switching elements SE_1 and SE_3, color dots CD_1_1, CD_1_2, CD_3_1, and CD_3_2 have positive polarity as denoted by "+". Switching element SE_2, color dots CD_2_1 and CD_2_2, have negative polarity, as denoted by "−". Associated dot AD_1, AD_2, and AD_3 also have negative polarity. Because switching element SE_2 has negative polarity, the electrode of associated dot AD_2 is coupled to switching element SE_2. However because switching elements SE_1 and SE_3 have positive polarity, associated dot AD_1 and AD_3 receives the positive polarity from a diagonally adjacent color dot. In FIG. 9(c), associated dots AD_1 is configured to receive negative polarity from a color dot that is below and to the right of associated dot AD_1 via ITO connector 922. Associated dot AD_3 is configured to receive negative polarity for a color dot that is below and to the right of associated dot AD_3 vial ITO connector 924.

Figure 9B:
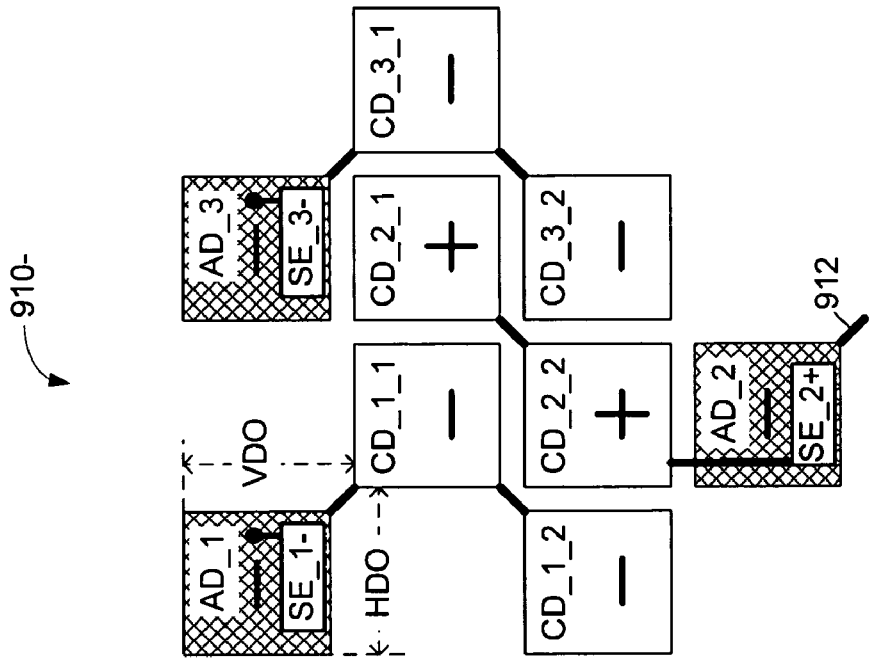
FIGS. 9(*a*)-9(*b*) illustrate a pixel design in accordance with one embodiment of the present invention.
FIGS. 9(c)-9(d) illustrate a pixel design in accordance with one embodiment of the present invention.
FIG. 9(e) illustrates a liquid crystal display in accordance with one embodiment of the present invention.
Figure 9A:
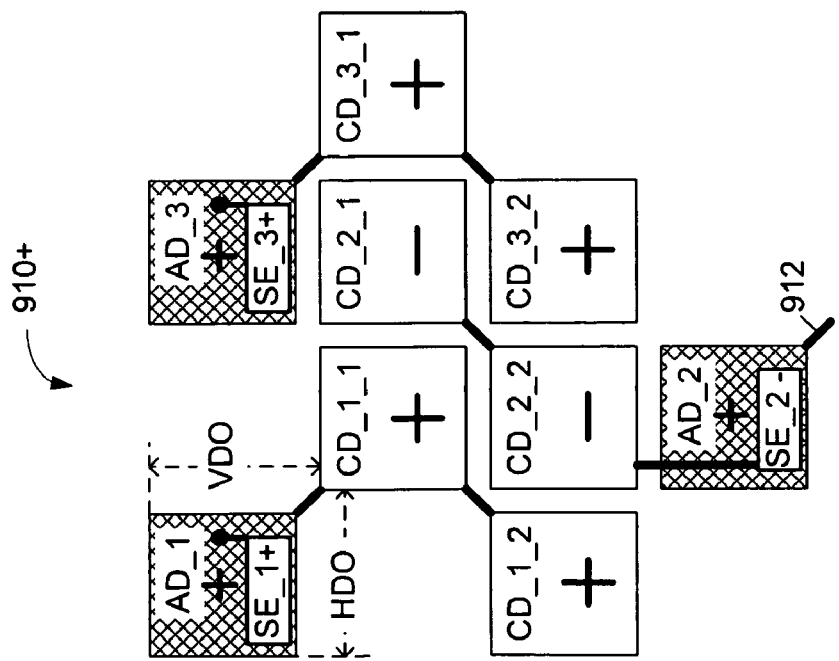
Figure 9D:
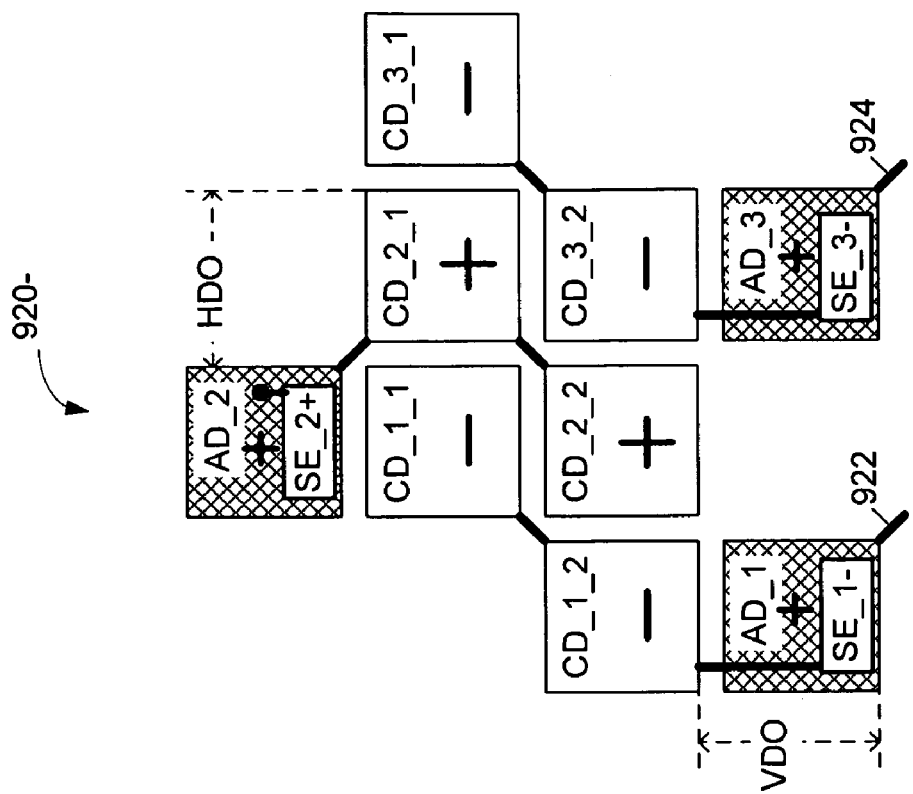
Figure 9C:
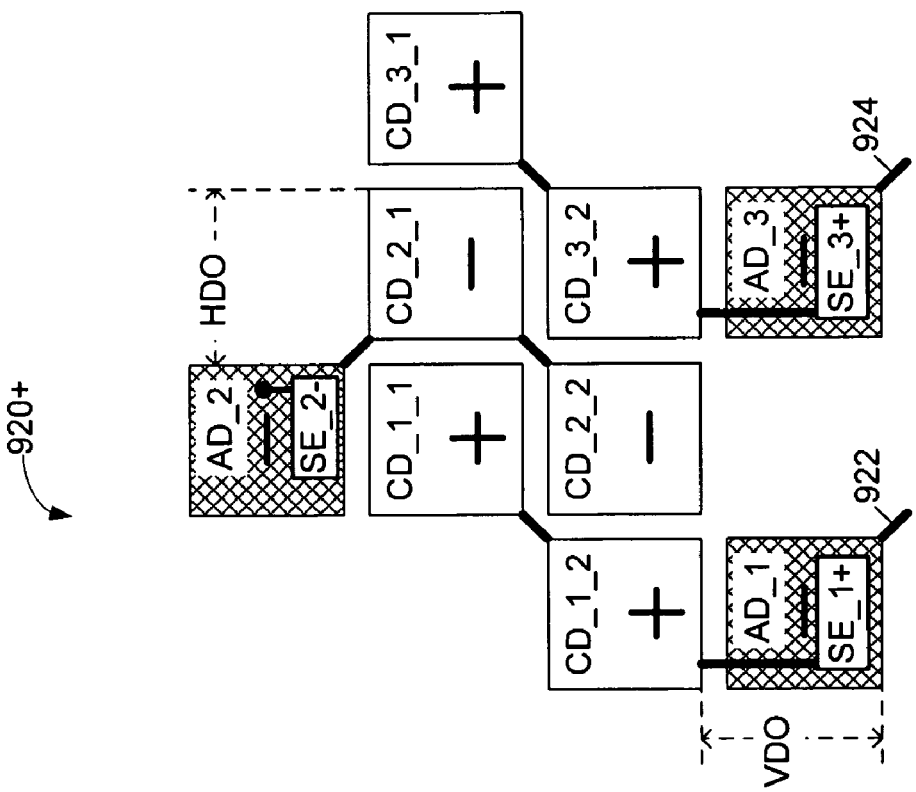

FIG. 9(d) shows the negative dot polarity pattern of pixel design 920 (labeled as 920−) When pixel design 920 is in the negative dot polarity pattern, switching elements SE_1 and SE_3, color dots CD_1_1, CD_1_2, CD_3_1, and CD_3_2 have negative polarity as denoted by "−1_; and switching element SE_2, associated dots AD_1, AD_2, and AD_3, and color dots CD_2_1 and CD_2_2, have positive polarity as denoted by "+".

Figure 9E:
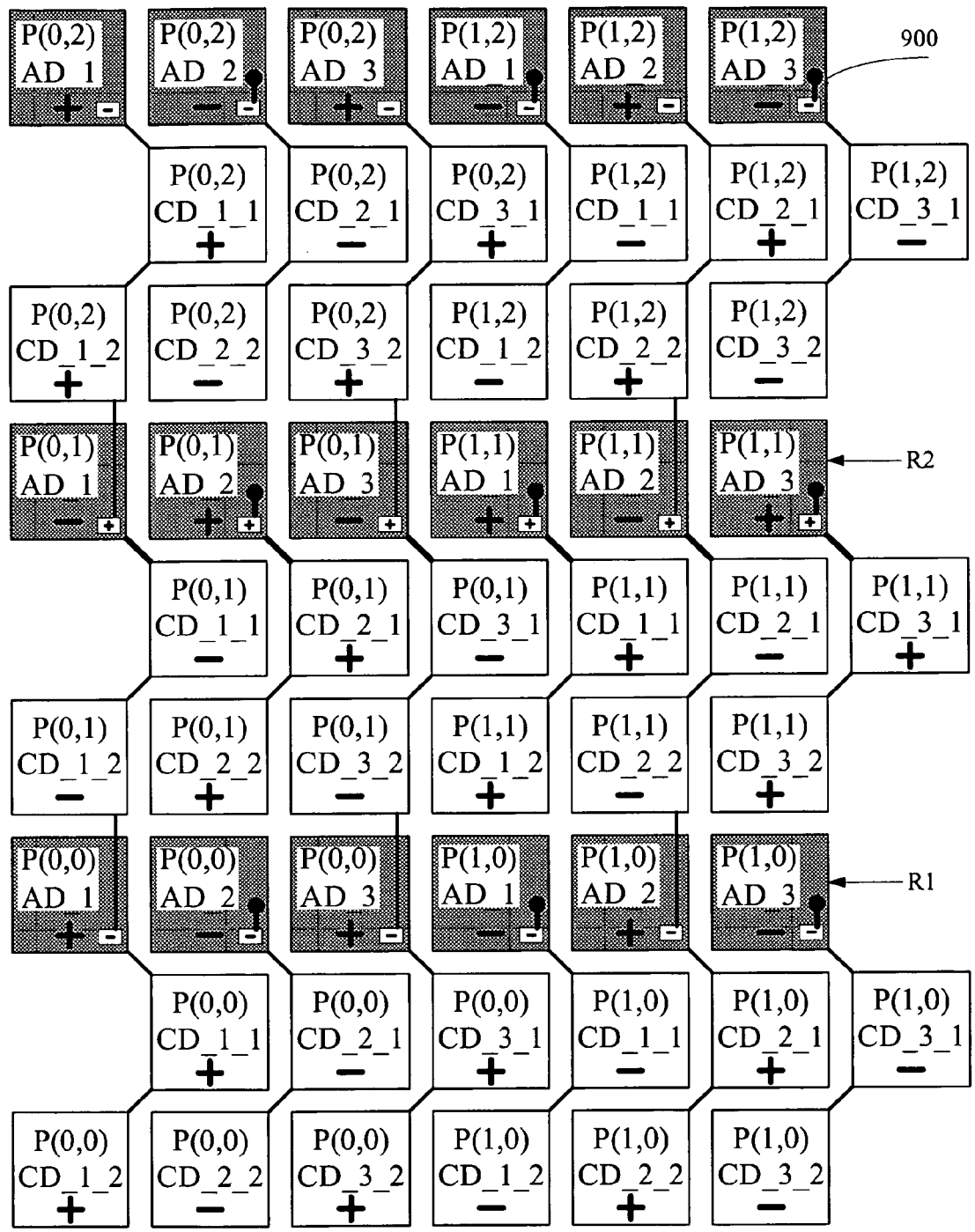

FIG. 9(e) illustrates a portion of a display 900 using pixel designs 910 and 920. Each row of display 900 is formed by alternating pixel design 910 and 920. Pixels in a row have alternating dot polarities. Thus in row R1, pixel P(0,1) uses pixel design 920 and has negative dot polarity; and pixel P(1,1) uses pixel design 910 and has a negative dot polarity. Alternating rows use the same pixel designs in the same row location but have opposite dot polarities. Thus, in row 2, pixel P(0,2) uses pixel design 920 and has positive dot polarity; and pixel P(1,2) uses pixel design 910 and has negative dot polarity. However, due to the novel pixel designs and delayed driving scheme, display 900 uses a switching element row inversion driving scheme because each the switching elements on each row of switching elements have the same polarity while alternating rows of switching elements have opposite polarity.

Figure 10B:
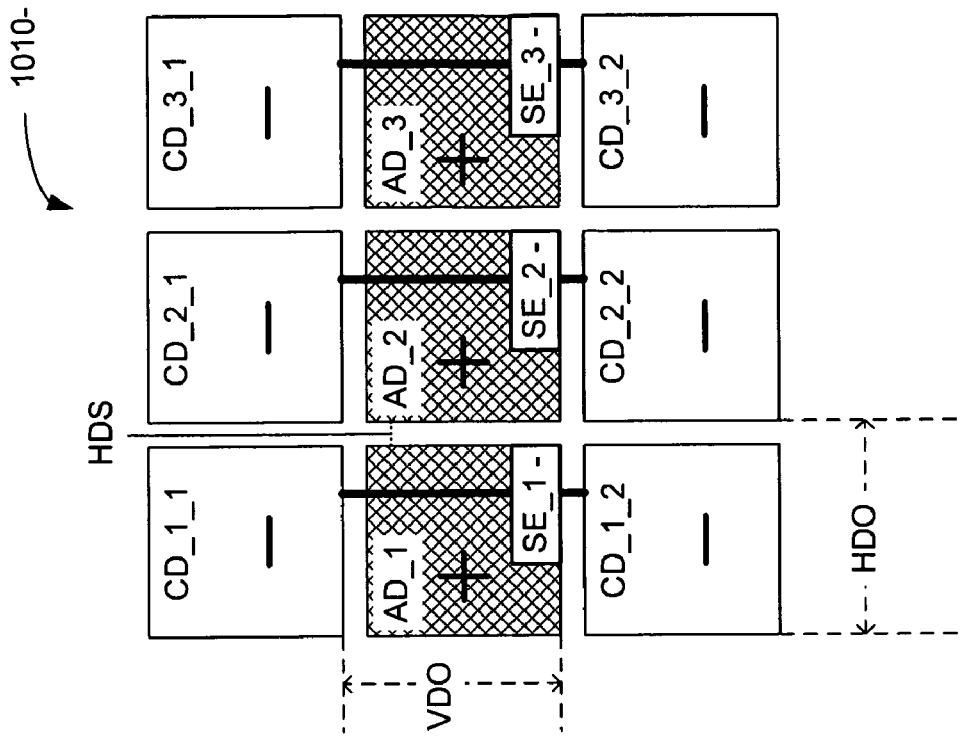
FIGS. 10(a)-10(b) illustrate a pixel design in accordance with one embodiment of the present invention.
Figure 10A:
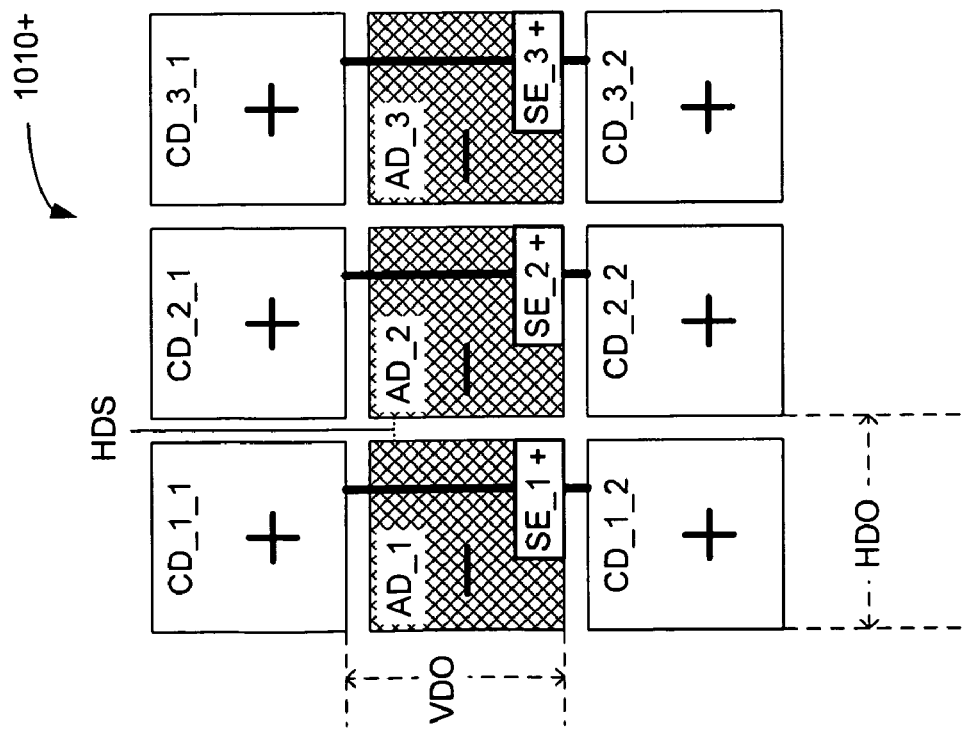
Figures 10C, 10D:
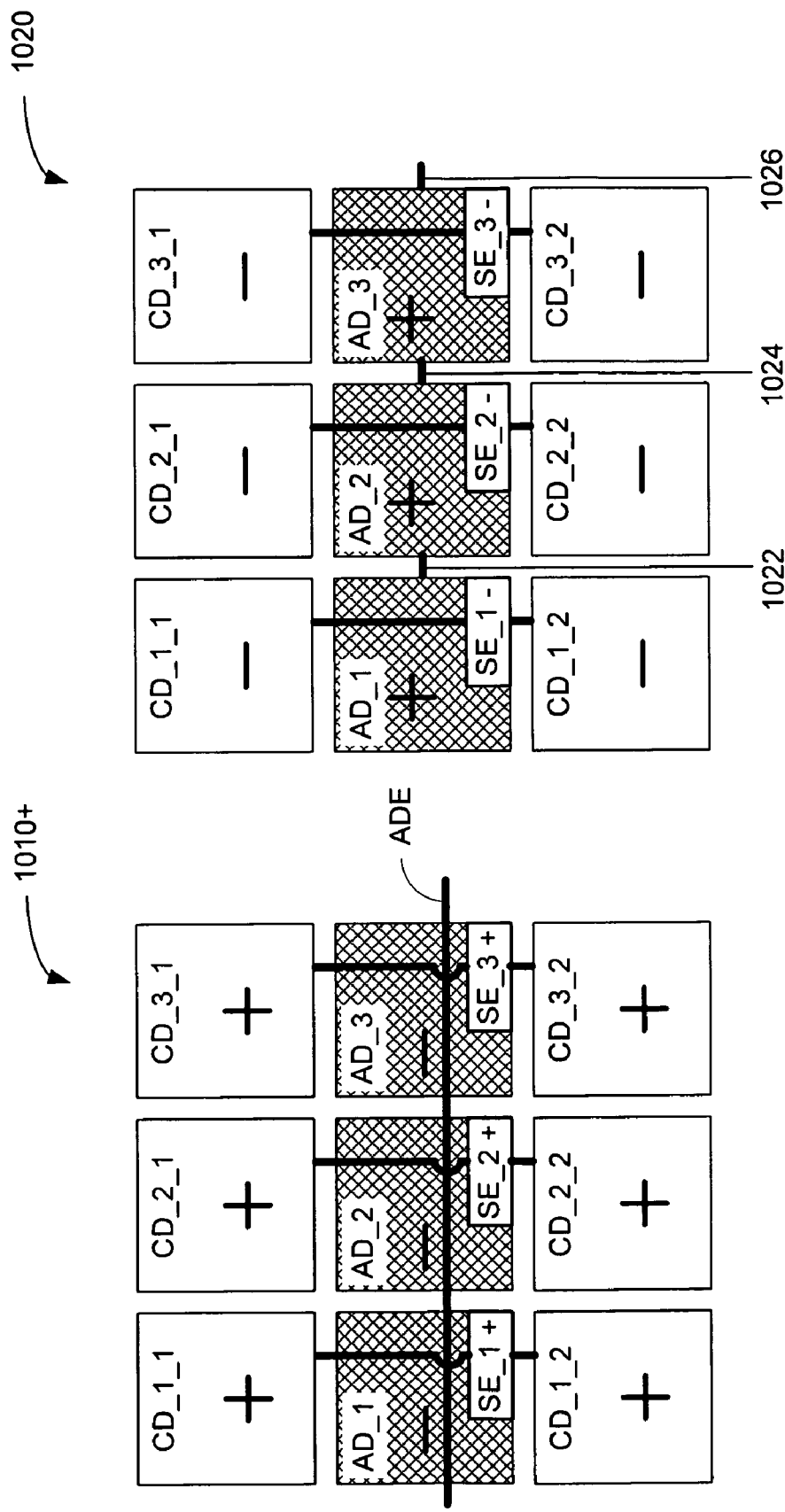
FIG. 10(c) illustrates a pixel design in accordance with one embodiment of the present invention.
FIG. 10(d) illustrates a pixel design in accordance with one embodiment of the present invention.

For some applications, such as mobile phones, LCD displays do not need four liquid crystal domains. FIGS. 10(a) and 10(b) show the positive and negative dot polarity pattern of a pixel design 1010, which can be used to create a display having two liquid crystal domains per color dot. A display using pixel design 1010 can use a switching element row inversion driving scheme. In Pixel design 1010, associated dots AD_1, AD_2, and AD_3 are arranged sequentially on a row. Associated dots AD_1 is separated from associated dot AD_2 by horizontal dot spacing HDS (not labeled). Similarly, associated dot AD_2 is separated from associated dot AD_3 by horizontal dot spacing HDS. The electrodes of associated dots AD_1, AD_2, and AD_3 are connected electrically by an associated dot electrode ADE as illustrated in FIG. 10(c), which is drawn using the positive dot polarity pattern. For clarity associated dot electrode ADE is omitted from FIGS. 10(a) and 10(b).

In some embodiments of the present invention, instead of an associated dot electrode, each electrode within the associated dots is electrically coupled to the electrodes of adjacent associate dots. For example, FIG. 10(d) shows a pixel design 1020 (shown with the negative dot polarity) that includes ITO connection 1022 coupling the electrode of associated dot AD_1 to the electrode of associated dot AD_2 and ITO connection 1024 coupling the electrode of associated dot AD_2 to the electrode of associated dot AD_3. The associated dots in pixel design 1020 are configured to be coupled to additional associated dots in other pixels as illustrated by ITO connector 1026.

The first color component of pixel design 1010 (FIG. 10(a)) has two color dots CD_1_1 and CD_1_2. Color dot CD_1_1 is horizontally aligned with and offset vertically above associated dot AD_1 by vertical dot VDO. Color dot CD_1_2 is horizontally aligned with and offset vertically below associated dot AD_1 by vertical dot offset VDO. The electrodes in both color dots CD_1_1 and CD_1_2 are coupled to switching element SE_1. The second color component of pixel design 1010 has two color dots CD_2_1 and CD_2_2. Color dot CD_2_1 is horizontally aligned with and offset vertically above associated dot AD_2 by vertical dot offset VDO. Color dot CD_2_2 is horizontally aligned with and offset vertically below associated dot AD_2 by vertical dot offset VDO. The electrodes in both color dots CD_2_1 and CD_2_2 are coupled to switching element SE_2. The third color component of pixel design 1010 has two color dots CD_3_1 and CD_3_2. Color dot CD_3_1 is horizontally aligned with and offset vertically above associated dot AD_3 by vertical dot offset VDO. Color dot CD_3_2 is horizontally aligned with and offset vertically below associated dot AD_3 by vertical dot offset VDO. The electrodes in both color dots CD_3_1 and CD_3_2 are coupled to switching element SE_3.

As explained above, the fringe fields in the color dots are amplified if adjacent dots have opposite polarities. For pixel design 1010, the polarities of the color dots and associated dots are assigned so that each row of color dot or associated dot alternate in polarities. FIG. 10(a) shows the positive dot polarity for pixel design 1010. Therefore, switching elements SE_1, SE_2, SE_3, and all of the color dots have positive polarity as denoted by "+". However associated dots AD_1, AD_2, and AD_3 have negative polarity as denoted by "−". FIG. 10(b) shows pixel design 1010 with the negative dot polarity pattern. For the negative dot polarity pattern, switching elements SE_1, SE_2, and SE_3, and all of the color dots have negative polarity. Associated dots AD_1, AD_2 and AD_3 have positive polarity as denoted by "+". Because associated dots AD_1, AD_2, and AD_3 have a polarity that is the opposite of switching elements SE_1, SE_2, and SE_3, the electrode of associated dots AD_1, AD_2, and AD_3 are coupled to another switching element as explained below and shown in FIG. 10(e).

Figure 10E:
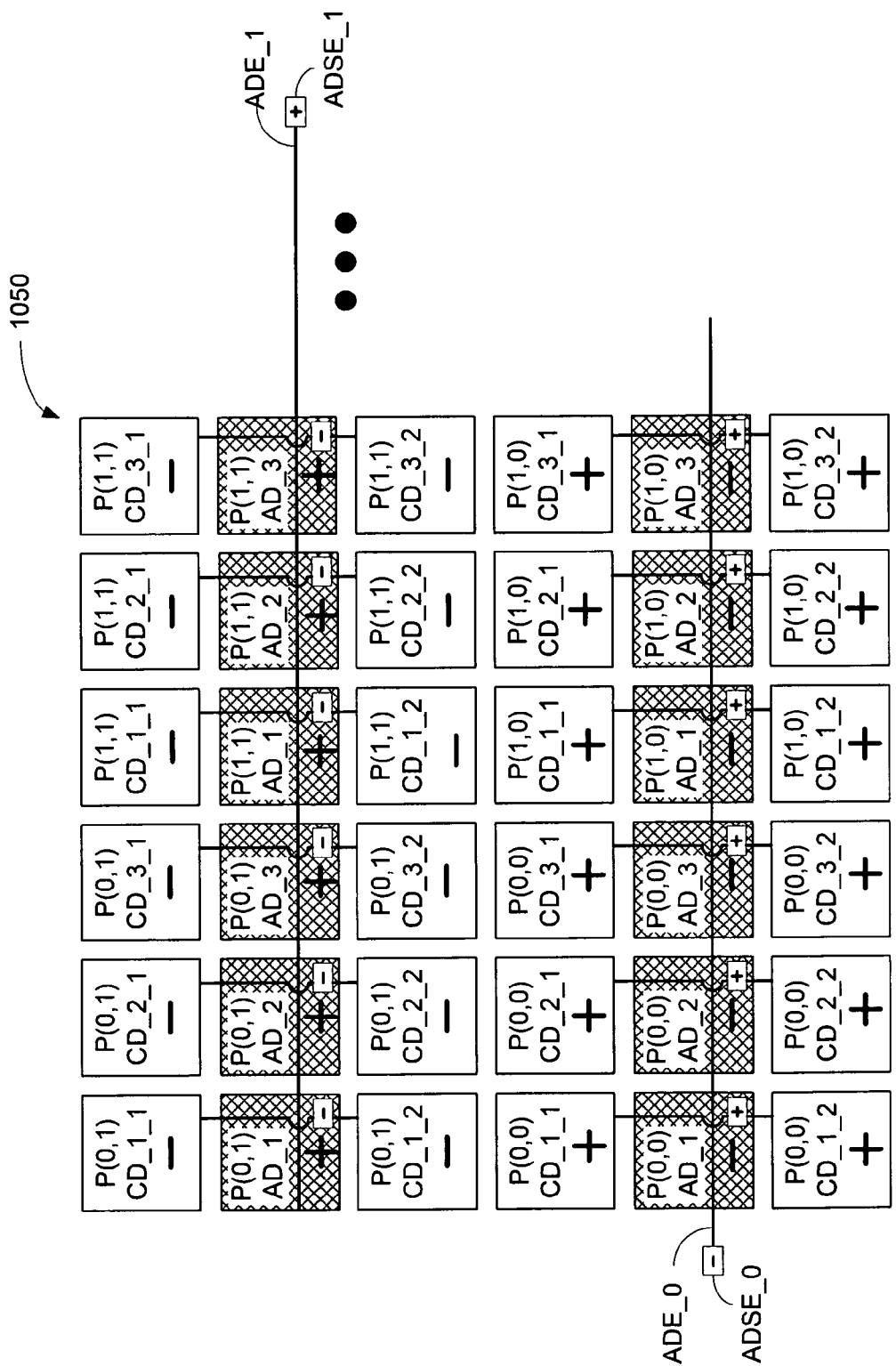
FIG. 10(e) illustrates a liquid crystal display in accordance with one embodiment of the present invention.

FIG. 10(e) shows a portion of a display 1050 formed from pixels using pixel design 1010 to create rows of alternating polarity for the color dots and associated dots. Each row of display 1050 has pixels of pixel design 1010 arranged sequentially and having the same polarity. Within a row the associated dots of adjacent pixels are vertically aligned and horizontally separated by one horizontal dot spacing HDS (not labeled in FIG. 10(e)). For example in row 0, pixels P(0,0) and P(1,0) uses pixel design 1010 and have positive dot polarity. Conversely, in row 1, pixels P(0,1) and P(1,1) have negative dot polarity. In the next frame, row 0 would have negative dot polarity while row 1 would have positive dot polarity. In general, even numbered rows have a first dot polarity pattern and odd number rows have a second dot polarity pattern. This arrangement of row polarity is often referred to as switching element row inversion driving scheme.

As explained above, the associated dots of each pixel have an opposite polarity compared to the color dots and switching elements. Thus, the embodiment of FIG. 10(*e*) includes an associated dot electrode for each row of pixels to provide the polarity for each row of associated dots. Specifically, FIG. 10(*e*) shows associated dot electrode ADE_0, which is used for row 0 (i.e. pixels P(0,0) and P(1,0), and associated dot electrode ADE_1, which is used for row 1 (i.e., pixels P(1,0) and P(1,1)). Each associated dot electrode ADE_X is coupled to an associated dot switching element ADSE_X. For example, associated dot electrode ADE_0 is coupled to associated dot switching element ADSE_0, which has negative polarity. Conversely, associated dot electrode ADE_1 is couple to associated dot switching element ADSE_1, which has positive polarity. For better electrical distribution, most embodiments of the present invention place associated dot switching elements of one polarity on one side of the display and the associated dot switching elements of the second polarity on the other side of the display. Thus for example in FIG. 10(*e*), associated dot switching element ADSE_0 is on the left side of the display and associated dot switching element ADSE_1 is on the right side of the display (as illustrated using the ellipsis and greater separation of associated dot switching element ADSE_1 from the pixels in FIG. 10(*e*)). In some embodiments of the present invention, multiple associated dot electrodes may be coupled to a single associated dot switching element to reduce the number of switching elements. As illustrated in FIG. 10(*e*), using the pixel designs described above, display 1050 has an alternating row pattern of dot polarities. Thus, each color dot will have two liquid crystal domains. In a particular embodiment of the present invention, each color dot has a width of 43 micrometers and a height of 47 micrometers. Each associated dot has a width of 43 micrometers and a height of 39 micrometers. The horizontal and vertical dot spacing is 4 micrometers.

FIGS. 11(*a*) and 11(*b*) show the positive and negative dot polarity pattern of a pixel design 1110, which is a three color dot variant of pixel design 1010. In Pixel design 1110, each color component includes three color dots. Furthermore two associated dots are used with each color component. For clarity the associated dots associated with the first color components are labeled AD_1_1 and AD_1_2. Associated dots AD_1_1, AD_2_1, and AD_3_1 are arranged sequentially on a row. Associated dots AD_1_1 is separated from associated dot AD_2_1 by horizontal dot spacing HDS (not labeled). Similarly, associated dot AD_2_1 is separated from associated dot AD_3_1 by horizontal dot spacing HDS. Associated dots AD_1_1, AD_2_1, and AD_3_1 are connected electrically by an associated dot electrode ADE as illustrated in FIG. 11(*e*). For Clarity associated dot electrode ADE is omitted from FIGS. 11(*a*) and 11(*b*). In some embodiments of the present invention, instead of an associated dot electrode, each electrode within the associated dots is electrically coupled to the electrodes of adjacent associate dots (i.e. in the same manner as in FIG. 10(*d*)).

Associated dots AD_1_2, AD_2_2, and AD_3_2 are arranged sequentially on a row. Associated dots AD_1_1, AD_2_1, and AD_3_1 are horizontally aligned with associated dots AD_1_2, AD_2_2, and AD_3_2, respectively. Associated dots AD_1_1, AD_2_1, and AD_3_1 are located vertically above associated dots AD_1_2, AD_2_2, and AD_3_2, respectively, and separated by the color dot height CDH and two time the vertical dot spacing VDS. Associated dots AD_1_2, AD_2_2, and AD_3_2 are connected electrically by an associated dot electrode ADE as illustrated in FIG. 10(*e*). Switching elements SE_1, SE_2, and SE_3 are positioned within associated dots AD_1_2, AD_2_2, and AD_3_2, respectively. The first color component of pixel design 1110 has three color dots CD_1_1, CD_1_2, and CD_1_3. Color dot CD_1_1 is horizontally aligned with and offset vertically above associated dot AD_1_1 by vertical dot offset VDO. Color dot CD_1_2 is horizontally aligned with and offset vertically below associated dot AD_1_1 by vertical dot offset VDO, and color dot CD_1_3 is horizontally aligned with and offset vertically below associated dot AD_1_2 by vertical dot offset VDO. The electrodes in color dots CD_1_1, CD_1_2, and CD_1_3 are coupled to switching element SE_1. The second color component of pixel design 1110 has three color dots CD_2_1, CD_2_2, and CD_2_3. Color dot CD_2_1 is horizontally aligned with and offset vertically above associated dot AD_2_1 by vertical dot offset VDO. Color dot CD_2_2 is horizontally aligned with and offset vertically below associated dot AD_2_1 by vertical dot offset VDO, and color dot CD_2_3 is horizontally aligned with and offset vertically below associated dot AD_2_2 by vertical dot offset VDO. The electrodes in color dots CD_2_1, CD_2_2, and CD_2_3 are coupled to switching element SE_2. The third color component of pixel design 1110 has three color dots CD_3_1, CD_3_2, and CD_3_3. Color dot CD_3_1 is horizontally aligned with and offset vertically above associated dot AD_3_1 by vertical dot offset VDO. Color dot CD_3_2 is horizontally aligned with and offset vertically below associated dot AD_3_1 by vertical dot offset VDO, and color dot CD_3_3 is horizontally aligned with and offset vertically below associated dot AD_3_2 by vertical dot offset VDO. The electrodes in color dots CD_3_1, CD_3_2, and CD_3_3 are coupled to switching element SE_3.

As explained above, the fringe fields in the color dots are amplified if adjacent dots have opposite polarities. For pixel design 1110, the polarities of the color dots and associated dots are assigned so that each row of color dot or associated dot alternate in polarities. FIG. 11(*a*) shows the positive dot polarity for pixel design 1110. Therefore, switching elements SE_1, SE_2, SE_3, and all of the color dots have positive polarity as denoted by "+". However associated dots AD_1_1, AD_1_2, AD_2_1, AD_2_2, AD_3_1, and AD_3_2, have negative polarity as denoted by "−". FIG. 11(*b*) shows pixel design 1110 with the negative dot polarity pattern. For the negative dot polarity pattern, switching elements SE_1, SE_2, and SE_3, and all of the color dots have negative polarity. Associated dots AD_1_1, AD_1_2, AD_2_1, AD_2_2, AD_3_1, and AD_3_2 have positive polarity. Because associated dots AD_1_1, AD_1_2, AD_2_1, AD_2_2, AD_3_1, and AD_3_2 have a polarity that is the opposite of switching elements SE_1, SE_2, and SE_3, the electrodes of associated dots AD_1_1, AD_1_2, AD_2_1, AD_2_2, AD_3_1, and AD_3_2 are coupled to another switching element as explained below and shown in FIG. 11(*c*).

Figure 11C:
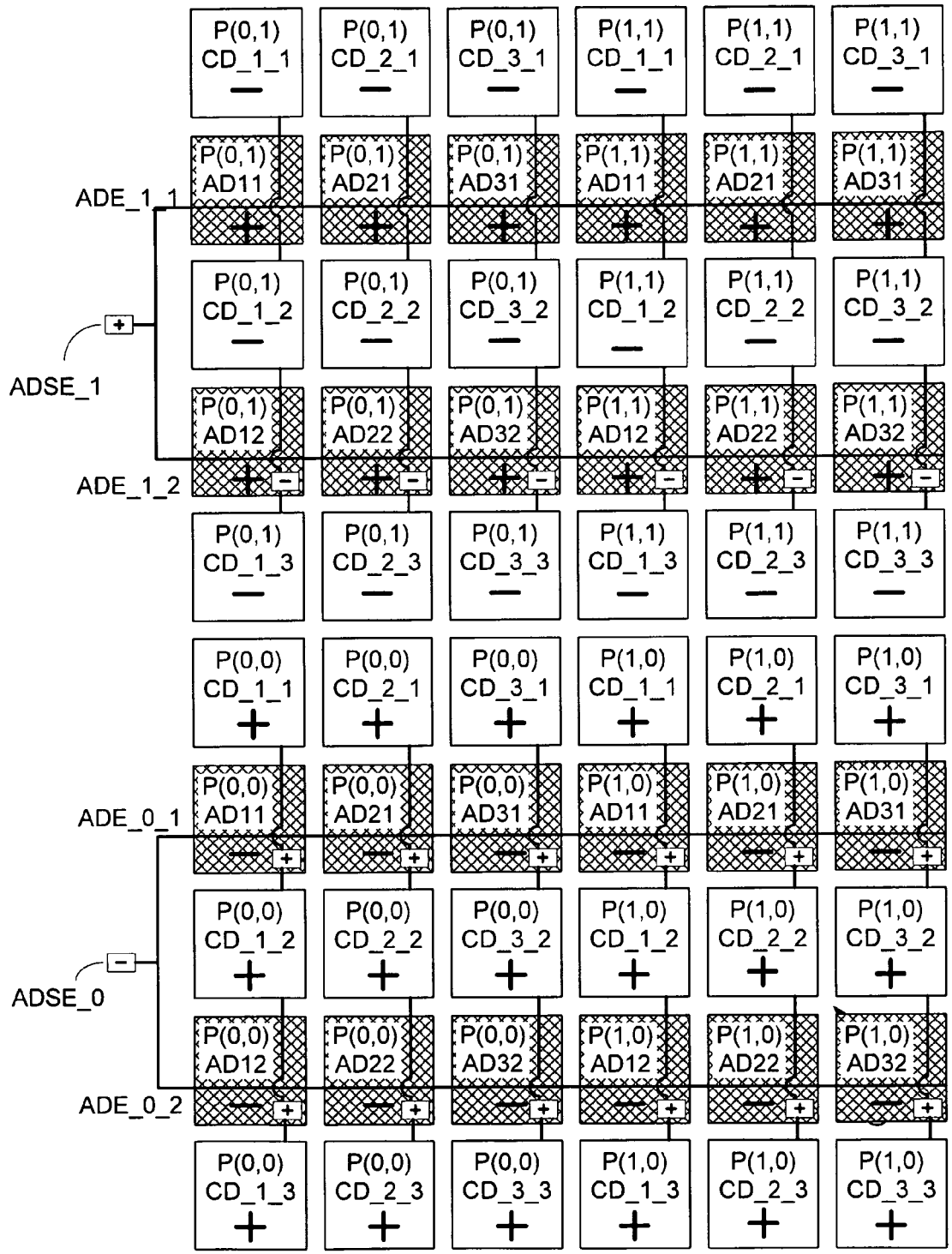
FIG. 11(c) illustrates a liquid crystal display in accordance with one embodiment of the present invention.

FIG. 11(*c*) shows a portion of a display 1150 formed from pixels using pixel design 1110 to create rows of alternating polarity for the color dots and associated dots. Each row of display 1150 has pixels of pixel design 1110 arranged sequentially and having the same polarity. Due to space limitations associated dots as labeled as ADXY instead of AD_X_Y as used in FIGS. 11(*a*) and 11(*b*). Within a row the associated dots of adjacent pixels are vertically aligned and horizontally separated by one horizontal dot spacing HDS (not labeled in FIG. 11(c)). For example in row 0, pixels P(0,0) and P(1, 0) uses pixel design 1110 and have positive dot polarity. Conversely, in row 1, pixels P(0,1) and P(1,1) have negative dot polarity. In the next frame, row 0 would have negative dot polarity while row 1 would have positive dot polarity. In general, even numbered rows have a first dot polarity pattern and odd number rows have a second dot polarity pattern. This arrangement of row polarity is often referred to as row inversion driving scheme.

As explained above, the associated dots of each pixel have an opposite polarity compared to the color dots and switching elements. Thus, the embodiment of FIG. 11(c) includes an associated dot electrode for each row of associated dots to provide the polarity for the associated dots. Specifically, FIG. 11(c) shows associated dot electrodes ADE_0_1 and ADE_0_2, which are used for row 0 (i.e. pixels P(0,0) and P(1,0), and associated dot electrode ADE_1_1 and ADE_1_2, which are used for row 1 (i.e., pixels P(1,0) and P(1,1)). Associated dot electrodes ADE_X_Y are coupled to an associated dot switching element ADSE_X. For example, associated dot electrodes ADE_0_1 and ADE_0_2 are coupled to associated dot switching element ADSE_0, which has negative polarity. Conversely, associated dot electrodes ADE_1_1 and ADE_1_2 are couple to associated dot switching element ADSE_1, which has positive polarity. For better electrical distribution, some embodiments of the present invention place associated dot switching elements of one polarity on one side of the display and the associated dot switching elements of the second polarity on the other side of the display. Thus for example in these embodiments associated dot switching element ADSE_0 is on the left side of the display and associated dot switching element ADSE_1 would be on the right side of the display. As illustrated in FIG. 11(c), using the pixel designs described above, display 1150 has an alternating row pattern of dot polarities. Thus, each color dot will have two liquid crystal domains. In a particular embodiment of the present invention, each color dot has a width of 43 micrometers and a height of 47 micrometers. Each associated dot has a width of 43 micrometers and a height of 39 micrometers. The horizontal and vertical dot spacing is 4 micrometers.

Pixel designs 1010 and 1110 allow for simpler color filters because the color dots of each color component are aligned horizontally. Furthermore in some application straight color components may provide advantages over color component using zigzag patterns of color components. However, pixel designs 1010 and 1110 only have two liquid crystal domains as compared to four liquid crystal domains of most of the other pixel designs presented herein. FIGS. 12(a) and 12(b) illustrate a pixel design 1210 that provides four liquid crystal domains while maintaining straight color components. However, pixel design 1210 uses switching element point inversion, which is generally more difficult to implement than switching element row inversion. FIGS. 12(a) and 12(b) show the positive and negative dot polarity pattern of a pixel design 1210 (labeled as 1210+ and 1210–, respectively). Pixel design 1210 can be used to create a display having four liquid crystal domains per color dot. In Pixel design 1210, associated dots AD_1, AD_2, and AD_3 are arranged sequentially on a row. Associated dots AD_1 is separated from associated dot AD_2 by horizontal dot spacing HDS. Similarly, associated dot AD_2 is separated from associated dot AD_3 by horizontal dot spacing HDS. Switching elements SE_1, SE_2, and SE_3 are positioned within associated dots AD_1, AD_2, and AD_3, respectively.

The first color component of pixel design 1210 has two color dots CD_1_1 and CD_1_2. Color dot CD_1_1 is horizontally aligned with and offset vertically above associated dot AD_1 by vertical dot offset VDO. Color dot CD_1_2 is horizontally aligned with and offset vertically below associated dot AD_1 by vertical dot offset VDO. The electrodes in both color dots CD_1_1 and CD_1_2 are electrically coupled to switching element SE_1. In the specific embodiment of FIG. 12(a) the electrode of color dot CD_1_2 is coupled to switching element SE_1 via the electrode of associated dot AD_2 and the electrode of color dot CD_1_1. The second color component of pixel design 1010 has two color dots CD_2_1 and CD_2_2. Color dot CD_2_1 is horizontally aligned with and offset vertically above associated dot AD_2 by vertical dot offset VDO. Color dot CD_2_2 is horizontally aligned with and offset vertically below associated dot AD_2 by vertical dot offset VDO. The electrodes in both color dots CD_2_1 and CD_2_2 are coupled to switching element SE_2. In the specific embodiment of FIG. 12(a), the electrode of color dot CD_2_2 is coupled to switching element SE_2 via the electrode of associated dot AD_3 and the electrode of color dot CD_2_1. The third color component of pixel design 1210 has two color dots CD_3_1 and CD_3_2. Color dot CD_3_1 is horizontally aligned with and offset vertically above associated dot AD_3 by vertical dot offset VDO. Color dot CD_3_2 is horizontally aligned with and offset vertically below associated dot AD_3 by vertical dot offset VDO. The electrodes in both color dots CD_3_1 and CD_3_2 are coupled to switching element SE_3. In the specific embodiment of FIG. 12(a) the electrode of color dot CD_3_2 is coupled to switching element SE_3 via the electrode of an associated dot of an adjacent pixel and the electrode of color dot CD_1_1. Specifically, ITO connectors 1212 and 1214 from an adjacent pixel would connect color dot CD_3_1 and CD_3_2. However, many embodiments may couple the electrode of color dot CD_3_2 to switching element SE_3 directly.

As explained above, the fringe fields in the color dots are amplified if adjacent dots have opposite polarities. For pixel design 1210, the polarities of the color dots and associated dots are assigned to form a checkerboard pattern of polarities. FIG. 12(a) shows the positive dot polarity for pixel design 1210. Therefore, switching elements SE_1 and SE_3, and color dots CD_1_1, CD_1_2, CD_3_1, and CD_3_2, and associated dot AD_2 have positive polarity as denoted by "+". However, switching element SE_2, color dots CD_2_1 and CD_2_2, and associated dots AD_1 and AD_3 have negative polarity as denoted by "–". As explained above, associated dot AD_2 receives polarity from switching element SE_1; associated dot AD_3 receives polarity from switching element SE_2; and associate dot AD_1 receives polarity from an adjacent pixel. However some embodiments of the present invention may couple the electrode of associated dot AD_1 to switching element SE_2. FIG. 12(b) shows the negative dot polarity for pixel design 1210. Therefore, switching elements SE_1 and SE_3, and color dots CD_1_1, CD_1_2, CD_3_1, and CD_3_2, and associated dot AD_2 have negative polarity as denoted by "–". However, switching element SE_2, color dots CD_2_1 and CD_2_2, and associated dots AD_1 and AD_3 have positive polarity as denoted by "+".

Figure 12C:
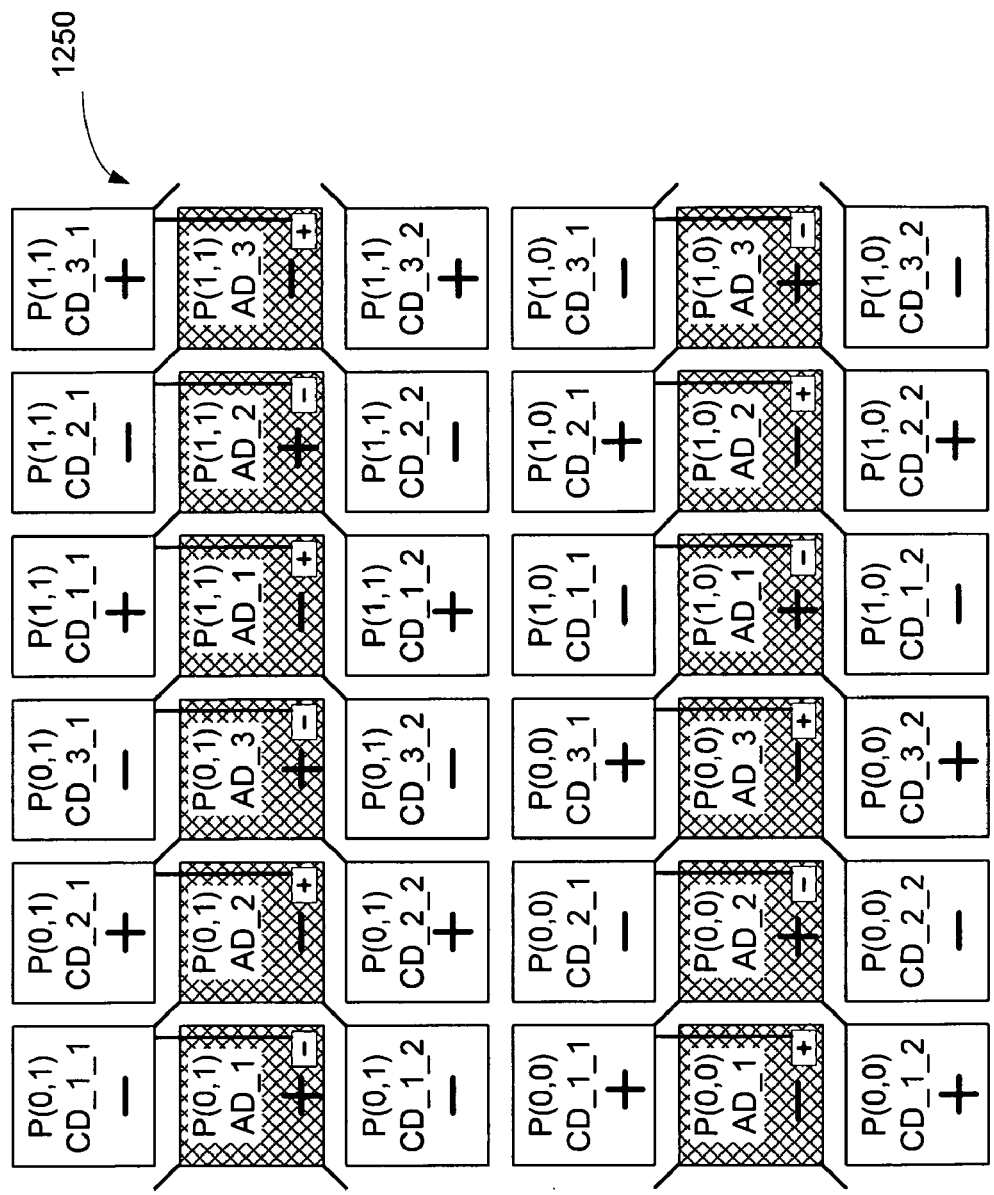
FIG. 12(c) illustrates a liquid crystal display in accordance with one embodiment of the present invention.

FIG. 12(c) shows a portion of a display 1250 formed from pixels using pixel design 1210 to create a checkerboard pattern of polarities for the color dots and associated dots. Each row of display 1250 has pixels of pixel design 1210 arranged sequentially and has alternating polarity. Within a row the associated dots of adjacent pixels are vertically aligned and horizontally separated by one horizontal dot spacing HDS (not labeled in FIG. 12(c)). For example in row 0, pixel P(0,0) has positive dot polarity while pixel P(1, 0) has negative dot polarity. Furthermore, pixels in a column also have alternating dot polarities so that in adjacent rows, pixels in the same location on a row have opposite polarities. For example, in row 1, pixel P(0,1) has negative dot polarity while pixel P(1,1) has positive dot polarity. In the next frame, all pixels would switch dot polarities. In general, a pixel P(X, Y) has a first dot polarity if X+Y is odd and has a second dot polarity if X+Y is even. A close examination of the switching elements in display 1250 shows that the polarities of the switching elements are also in a checkerboard pattern. This arrangement of switching element is an example of the switching element point inversion driving scheme.

FIG. 13(*a*) illustrates the positive dot polarity of pixel design 1310 that is a variant of pixel design 1210 suited for displays using switching element column inversion driving scheme. Pixel design 1310 adds three additional associated dots to pixel design 1210. For brevity the description of the elements that are the same in pixel design 1210 and 1310 is not repeated. (However, ITO connectors 1212 and 1214 are relabeled as 1312 and 1314). Pixel design 1310 adds associated dots AD_4, AD_5, and AD_6. Specifically, associated dot AD_4 is aligned horizontally with color dot CD_1_2 and offset vertically below color dot CD_1_2 by vertical dot offset VDO. Associated dot AD_5 is aligned horizontally with color dot CD_2_2 and offset vertically below color dot CD_2_2 by vertical dot offset VDO. Associated dot AD_6 is aligned horizontally with color dot CD_3_2 and offset vertically below color dot CD_3_2 by vertical dot offset VDO. To achieve a checkerboard pattern associated dots AD_4 and AD_6 should have negative polarity while associated dot AD_5 has positive polarity for the positive dot polarity of pixel design 1310. Thus, the polarity of associated dots AD_4, AD_5, and AD_6 match the polarity of associated dots AD_1, AD_2, and AD_3, respectively. Most embodiments of the pixel design 1310 electrically couple the electrodes of associated dots AD_4, AD_5, and AD_6 to the electrodes of associated dots AD_1, AD_2, and AD_3, respectively. Often, the coupling is via other dots. For example, as illustrated in FIG. 13(*a*), the electrode of associated dot AD_5 is coupled to the electrode of associated dot AD_2 via the electrode of color dot CD_1_2. Similarly, the electrode of associated dot AD_6 is coupled to the electrode of associated dot AD_3 via the electrode of color dot CD_2_2. Pixel design 1310 is configured to couple associated dot AD_4 to associated dot AD_1 via a color dot of an adjacent pixel. These connections are illustrated by ITO connectors 1314 and 1316. Thus, in the positive dot polarity pattern of pixel design 1310, switching element SE_1 and SE_3, color dots CD_1_1, CD_1_2, CD_3_1, and CD_3_2, and associated dots AD_2 and AD_5 have positive polarity as denoted by "+"; and switching element SE_2, color dots CD_2_1 and CD_2_2, associated dots AD_1, AD_4, AD_3 and AD_6 have negative polarity as denoted by "−".

FIG. 13(*b*) illustrates the negative dot polarity of pixel design 1310 (labeled 1310−). In the negative dot polarity pattern of pixel design 1310, switching element SE_1 and SE_3, color dots CD_1_1, CD_1_2, CD_3_1, and CD_3_1, and associated dots AD_2 and AD_5 have negative polarity as denoted by "−"; and switching element SE_2, color dots CD_2_1 and CD_2_2, associated dots AD_1, AD_4, AD_3 and AD_6 have positive polarity as denoted by "+".

FIG. 13(*c*) shows a portion of a display 1320 formed from pixels using pixel design 1310 to create a checkerboard pattern of polarities for the color dots and associated dots. Each row of display 1320 has pixels of pixel design 1310 arranged sequentially and having alternating polarity. Within a row the associated dots of adjacent pixels are vertically aligned and horizontally separated by one horizontal dot spacing HDS (not labeled in FIG. 13(*c*)). Each row begins with the same polarity, i.e. the pixels in each column of pixels have the same dot polarity, but each column has a different dot polarity from its adjacent columns. For example, pixels P(0, 0) and P(1, 0) have positive dot polarity and Pixels P(0, 1) and P(1, 1) have negative dot polarity. Thus, in general a pixel P(X, Y) in such a display would have a first dot polarity if X is even, and a second dot polarity if X is odd. The switching elements of display 1320 have a similar pattern, i.e., the switching elements in each column have the same polarity but switching elements in adjacent columns have opposite polarity. Thus, display 1320 uses the switching element column inversion driving scheme.

FIG. 13(*d*) illustrates the positive dot polarity of pixel design 1330 that is a variant of pixel design 1310 suited for displays using switching element point inversion driving scheme. In pixel design 1330, each color component has three color dots. Thus, pixel design 1330 adds three additional color dots to pixel design 1310. For brevity the description of the elements that are the same in pixel design 1310 and 1330 is not repeated. Pixel design 1320 adds color dots CD_1_3, CD_2_3, and CD_3_3. Specifically, color dot CD_1_3 is aligned horizontally with associated dot AD_4 and offset vertically below associated dot AD_4 by vertical dot offset VDO. Color dot CD_2_3 is aligned horizontally with associated dot AD_5 and offset vertically below associated dot AD_5 by vertical dot offset VDO. Color dot CD_3_3 is aligned horizontally with associated dot AD_6 and offset vertically below associated dot AD_6 by vertical dot offset VDO. To achieve a checkerboard pattern color dots CD_2_3 should have negative polarity while color dots CD_1_3 and CD_3_3 should have positive polarity for the positive dot polarity of pixel design 1320. Thus, the polarity of color dots CD_1_3, CD_2_3, and CD_3_3 match the polarity of color dots CD_1_2, CD_2_2, and CD_3_2, respectively. Most embodiments of the pixel design 1320 electrically couple the electrodes of color dots CD_1_3, CD_2_3, and CD_3_3 to the electrodes of color dots CD_1_2, CD_2_2, and CD_3_2, respectively. Often, the coupling is via other dots. For example, as illustrated in FIG. 13(*d*), the electrode of color dot CD_2_3 is coupled to the electrode of color dot CD_2_2 via the electrode of associated dot AD_6. Similarly, the electrode of color dot CD_1_3 is coupled to the electrode of color dot CD_1_2 via the electrode of associated dot AD_5. Pixel design 1320 is configured to couple color dot CD_3_3 to color dot CD_3_2 via an associated dot of an adjacent pixel. These connections are illustrated by ITO connectors 1316 and 1338. Thus, in the positive dot polarity pattern of pixel design 1330, switching element SE_1 and SE_3, color dots CD_1_1, CD_1_2, CD_1_3, CD_3_1, CD_3_2, and CD_3_3, and associated dots AD_2 and AD_5 have positive polarity as denoted by "+"; and switching element SE_2, color dots CD_2_1, CD_2_2, and CD_2_3, associated dots AD_1, AD_4, AD_3 and AD_6 have negative polarity as denoted by "−".

FIG. 13(*e*) illustrates the negative dot polarity of pixel design 1330 (labeled 1330−). In the negative dot polarity pattern of pixel design 1330, switching element SE_1 and SE_3, color dots CD_1_1, CD_1_2, CD_1_3, CD_3_1, CD_3_2, and CD_3_3, and associated dots AD_2 and AD_5 have negative polarity as denoted by "−"; and switching element SE_2, color dots CD_2_1, CD_2_2, and CD_2_3, associated dots AD_1, AD_4, AD_3 and AD_6 have positive polarity as denoted by "+".

FIG. 13(*f*) shows a portion of a display 1340 formed from pixels using pixel design 1330 to create a checkerboard pattern of polarities for the color dots and associated dots. Each row of display 1350 has pixels of pixel design 1330 arranged sequentially and having alternating polarity. Within a row the associated dots of adjacent pixels are vertically aligned and horizontally separated by one horizontal dot spacing HDS (not labeled in FIG. 13(f)). For example in row 0, pixels P(0,0) has negative dot polarity while pixel P(1, 0) has positive dot polarity. Furthermore, pixels in a column also have alternating dot polarities so that in adjacent rows, pixels in the same location on a row have opposite polarities. For example, in row 1, pixel P(0,1) has positive dot polarity while pixel P(1,1) has negative dot polarity. In the next frame, all pixels would switch dot polarities. In general, a pixel P(X,Y) has a first dot polarity if X+Y is odd and has a second dot polarity if X+Y is even. A close examination of the switching elements in display 1340 shows that the polarities of the switching elements are also in a checkerboard pattern. Thus, display 1350 uses the switching element point inversion driving scheme.

Figures 13A, 13B:
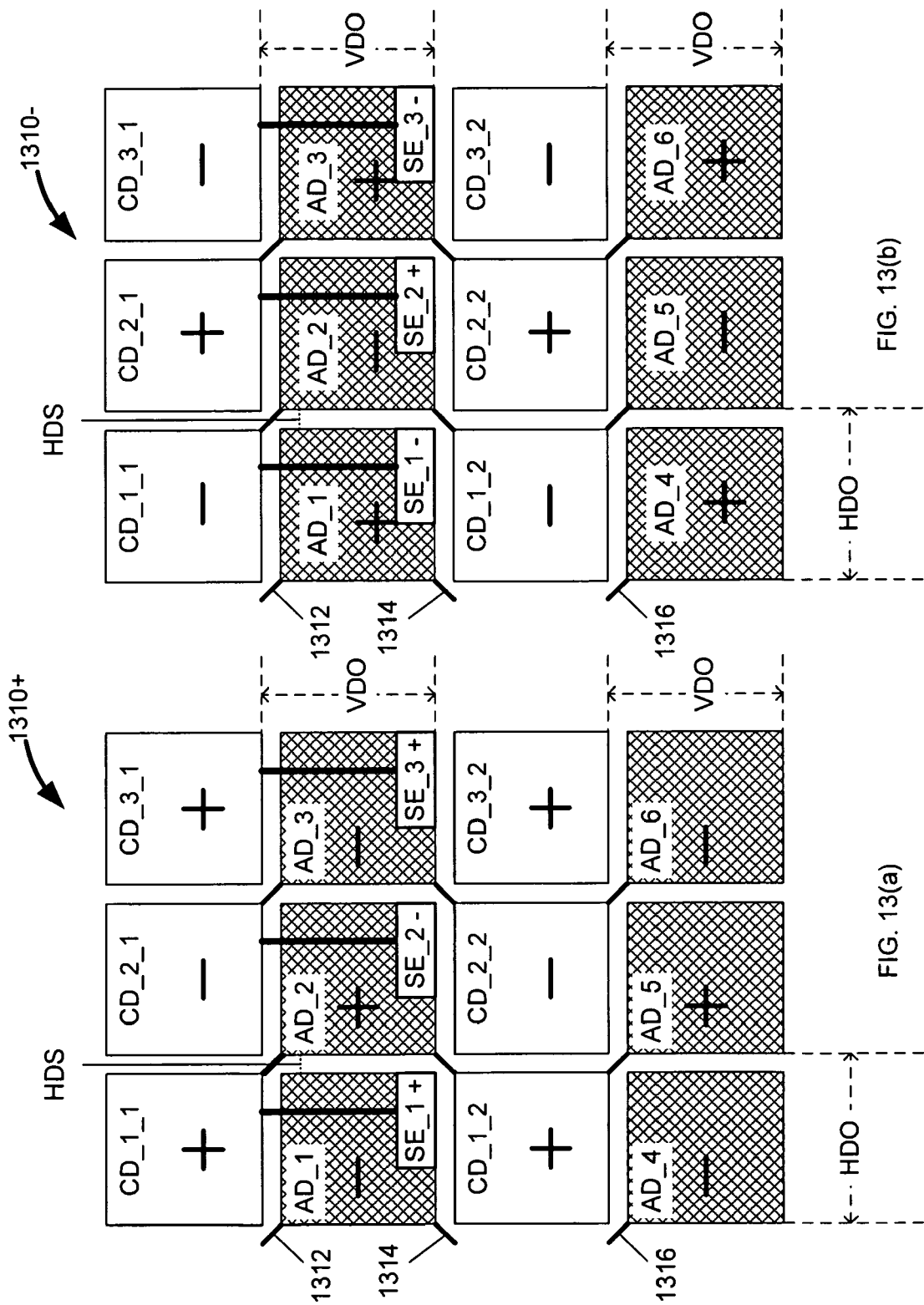
FIGS. 13(a)-13(b) illustrate a pixel design in accordance with one embodiment of the present invention.
Figure 13C:
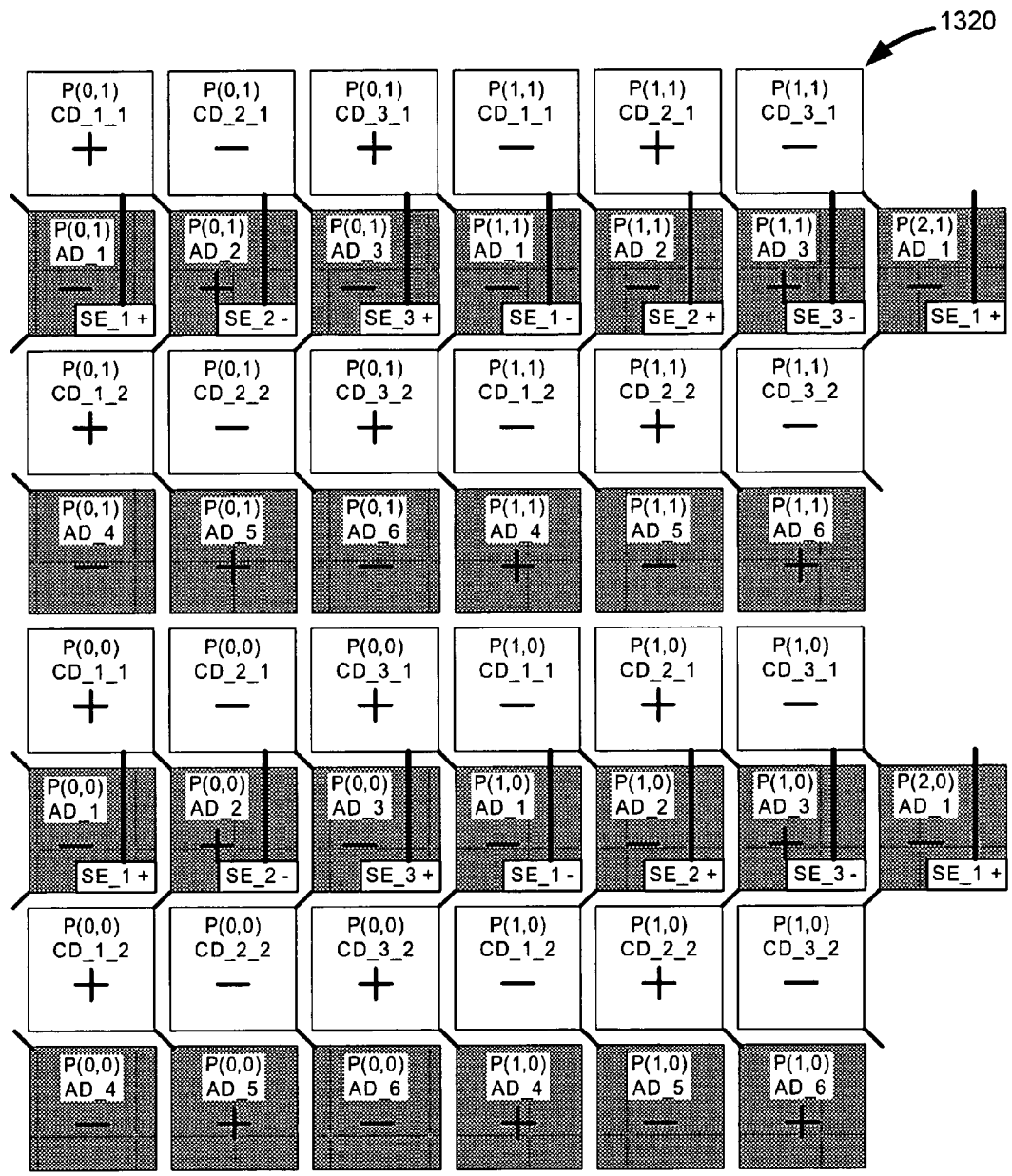
FIG. 13(c) illustrates a liquid crystal display in accordance with one embodiment of the present invention.
Figure 13F:
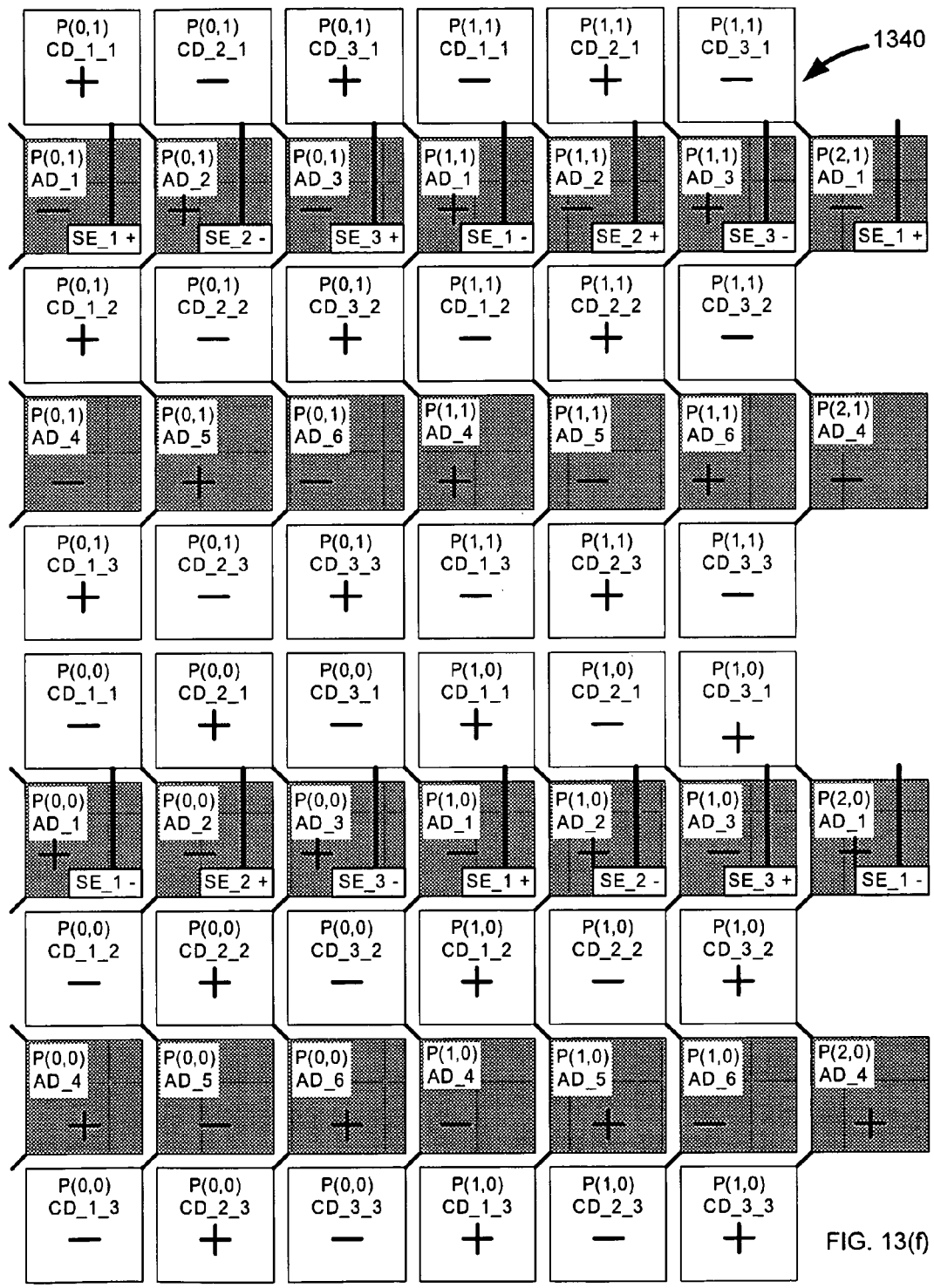
FIG. 13(f) illustrates a liquid crystal display in accordance with one embodiment of the present invention.

FIG. 13(g) illustrates the positive dot polarity of pixel design 1350 that is a variant of pixel design 1330 suited for displays using switching element column inversion driving scheme. Pixel design 1350 adds three additional associated dots to pixel design 1330. For brevity the description of the elements that are the same in pixel design 1350 and 1330 is not repeated. Pixel design 1350 adds associated dots AD_7, AD_8, and AD_9. Specifically, associated dot AD_7 is aligned horizontally with color dot CD_1_3 and offset vertically below color dot CD_1_3 by vertical dot offset VDO. Associated dot AD_8 is aligned horizontally with color dot CD_2_3 and offset vertically below color dot CD_2_3 by vertical dot offset VDO. Associated dot AD_9 is aligned horizontally with color dot CD_3_3 and offset vertically below color dot CD_3_3 by vertical dot offset VDO. To achieve a checkerboard pattern associated dots AD_7 and AD_9 should have negative polarity while associated dot AD_8 has positive polarity for the positive dot polarity of pixel design 1350. Thus, the polarity of associated dots AD_7, AD_7, and AD_9 match the polarity of associated dots AD_4, AD_5, and AD_6, respectively. Most embodiments of the pixel design 1350 electrically couple the electrodes of associated dots AD_7, AD_8, and AD_9 to the electrodes of associated dots AD_4, AD_5, and AD_6, respectively. Often, the coupling is via other dots. For example, as illustrated in FIG. 13(g), the electrode of associated dot AD_8 is coupled to the electrode of associated dot AD_5 via the electrode of color dot CD_1_3. Similarly, the electrode of associated dot AD_9 is coupled to the electrode of associated dot AD_6 via the electrode of color dot CD_2_3. Pixel design 1350 is configured to couple associated dot AD_7 to associated dot AD_4 via a color dot of an adjacent pixel. These connections are illustrated by ITO connectors 1338 and 1358. Thus, in the positive dot polarity pattern of pixel design 1350, switching elements SE_1 and SE_3, color dots CD_1_1, CD_1_2, CD_1_3, CD_3_1, CD_3_2, and CD_3_3, and associated dots AD_2, AD_5, and AD_8 have positive polarity as denoted by "+"; and switching element SE_2, color dots CD_2_1, CD_2_2 and CD_2_3, associated dots AD_1, AD_4, AD_7, AD_3, AD_6, and AD_7 have negative polarity as denoted by "−".

FIG. 13(h) illustrates the negative dot polarity of pixel design 1350 (labeled 1350-). In the negative dot polarity pattern of pixel design 1350, switching elements SE_1 and SE_3, color dots CD_1_1, CD_1_2, CD_1_3, CD_3_1, CD_3_2 and CD_3_3, and associated dots AD_2, AD_5, and AD_8 have negative polarity as denoted by "−"; and switching element SE_2, color dots CD_2_1, CD_2_2 and CD_2_3, associated dots AD_1, AD_4, AD_7, AD_3, AD_6, and AD_9 have positive polarity as denoted by "+".

Figure 13I:
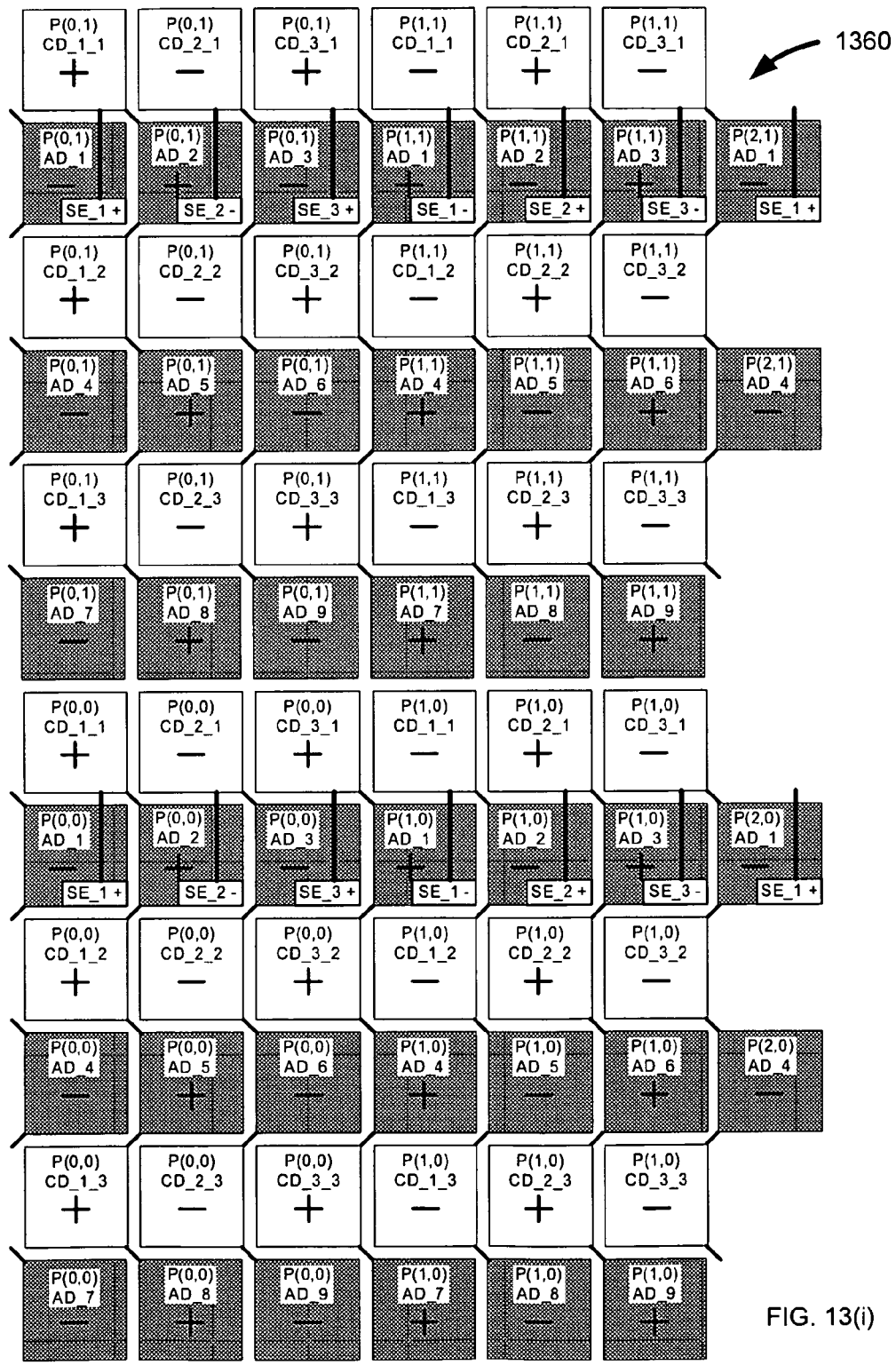
FIG. 13(i) illustrates a liquid crystal display in accordance with one embodiment of the present invention.

FIG. 13(i) shows a portion of a display 1360 formed from pixels using pixel design 1350 to create a checkerboard pattern of polarities for the color dots and associated dots. Each row of display 1360 has pixels of pixel design 1350 arranged sequentially and having alternating polarity. Within each row associated dots of adjacent pixels are vertically aligned and horizontally separated by one horizontal dot spacing HDS (not labeled in FIG. 13(i)). Each row begins with the same polarity, i.e. the pixels in each column of pixels have the same dot polarity, but each column has a different dot polarity from its adjacent columns. For example, pixels P(0, 0) and P(1, 0) have positive dot polarity and Pixels P(0, 1) and P(1, 1) have negative dot polarity. Thus, in general a pixel P(X,Y) in such a display would have a first dot polarity if X is even, and a second dot polarity if X is odd. The switching elements of display 1360 have a similar pattern, i.e., the switching elements in each column have the same polarity but switching elements in adjacent columns have opposite polarity. Thus, display 1360 uses the switching element column inversion driving scheme.

FIGS. 14(a) and 14(b) show the positive and negative dot polarity pattern of a pixel design 1410 (labeled 1410+ and 1410−, respectively), which can be used to create a display having four liquid crystal domains per color dot. In pixel design 1410, associated dots AD_1, AD_2, and AD_3 are arranged sequentially on a row. Associated dots AD_1 is separated from associated dot AD_2 by horizontal dot spacing HDS. Similarly, associated dot AD_2 is separated from associated dot AD_3 by horizontal dot spacing HDS. Switching elements SE_1, SE_2, and SE_3 are positioned within associated dots AD_1, AD_2, and AD_3, respectively.

The first color component of pixel design 1410 has two color dots CD_1_1 and CD_1_2 in a right-left zigzag pattern. The first color component is positioned so that color dot CD_1_2 is horizontally aligned with associated dot AD_1 and offset vertically above associated dot AD_1 by vertical dot offset VDO (labeled in FIG. 14(b)). The electrode of color dot CD_1_2 is coupled to switching element SE_1 and to the electrode of color dot CD_1_1, thus electrically coupling the electrode of CD_1_1 to switching element SE_1. The second color component of pixel design 1410 has two color dots CD_2_1 and CD_2_2 in a right-left zigzag pattern. The second color component is positioned so that color dot CD_2_2 is horizontally aligned with associated dot AD_2 and offset vertically above associated dot AD_2 by vertical dot offset VDO. The electrode of color dot CD_2_2 is coupled to switching element SE_2 and to the electrode of color dot CD_2_1, thus electrically coupling the electrode of CD_2_1 to switching element SE_2. The third color component of pixel design 1410 has two color dots CD_3_1 and CD_3_2 in a right-left zigzag pattern. The third color component is positioned so that color dot CD_3_2 is horizontally aligned with associated dot AD_3 and offset vertically above associated dot AD_3 by vertical dot offset VDO. The electrode of color dot CD_3_2 is coupled to switching element SE_3 and to the electrode of color dot CD_3_1, thus electrically coupling the electrode of CD_3_1 to switching element SE_3.

As explained above, the fringe fields in the color dots are amplified if adjacent dots have opposite polarities. For pixel design 1410, the polarities of the color dots and associated dots are assigned to form a checkerboard pattern of polarities. FIG. 14(a) shows the positive dot polarity for pixel design 1410. Therefore, switching elements SE_1 and SE_3, color dots CD_1_1, CD_1_2, CD_3_1, CD_3_2, and associated dot AD_2 have positive polarity as denoted by "+".

However, switching element SE_2, color dots CD_2_1 and CD_2_2, and associated dots AD_1 and AD_3 have negative polarity as denoted by "−". Because, associated dot AD_1 and color dot CD_2_2 should have the same polarity, the electrode of associated dot AD_1 is coupled the electrode of color dot CD_2_2. Similarly, because associated dot AD_2 and color dot CD_3_2 should have the same polarity, therefore, the electrode of associated dot AD_2 is coupled, electrode of color dot CD_3_2. Even though associated dot AD_3 and color dot CD_2_2 have the same polarity, the electrode of associated dot AD_3 is configured to receive proper polarity from the adjacent pixel to avoid crossing connections with the connection between associated dot AD_2 and color dot CD_3_2. This connection is illustrated by ITO connector 1412. FIG. 14(b) shows the negative dot polarity for pixel design 1410. Therefore, switching elements SE_1 and SE_3, and color dots CD_1_1, CD_1_2, CD_3_1, and CD_3_2, and associated dot AD_2 have negative polarity as denoted by "−". However, switching element SE_2, color dots CD_2_1 and CD_2_2, and associated dots AD_1 and AD_3 have positive polarity as denoted by "+".

Figure 14C:
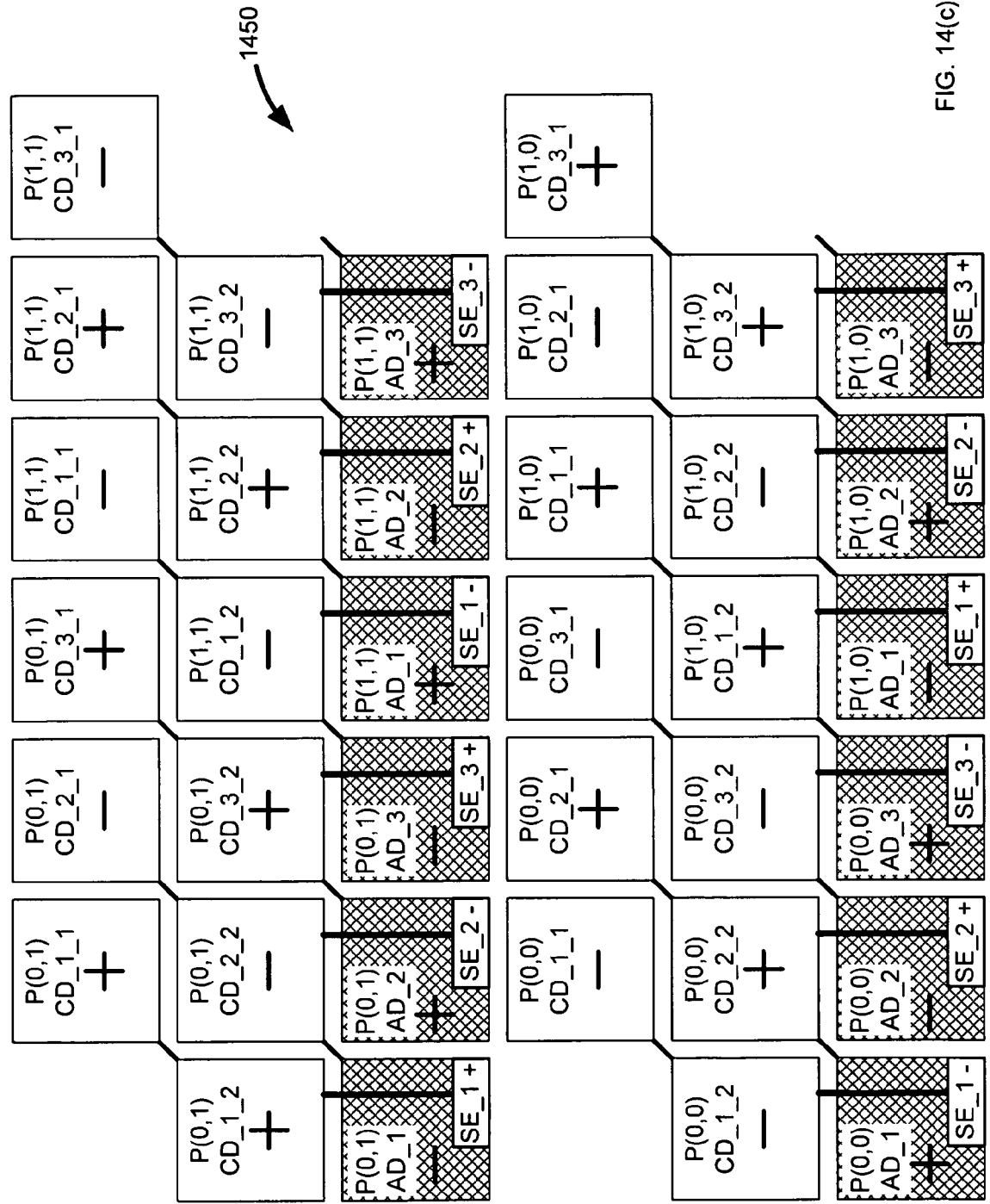
FIG. 14(c) illustrates a liquid crystal display in accordance with one embodiment of the present invention.

FIG. 14(c) shows a portion of a display 1450 formed from pixels using pixel design 1410 to create a checkerboard pattern of polarities for the color dots and associated dots. Each row of display 1450 has pixels of pixel design 1410 arranged sequentially and having alternating polarity. Within a row the associated dots of adjacent pixels are vertically aligned and horizontally separated by one horizontal dot spacing HDS (not labeled in FIG. 14(c)). For example in row 0, pixel P(0,0) has positive dot polarity while pixel P(1, 0) has negative dot polarity. Furthermore, pixels in a column also have alternating dot polarities so that in adjacent rows, pixels in the same location on a row have opposite polarities. For example, in row 1, pixel P(0,1) has negative dot polarity while pixel P(1,1) has positive dot polarity. In the next frame, all pixels would switch dot polarities. In general, a pixel P(X, Y) has a first dot polarity if X+Y is odd and has a second dot polarity if X+Y is even. A close examination of the switching elements in display 1450 shows that the polarities of the switching elements are also in a checkerboard pattern. This arrangement of switching element is an example of the switching element inversion driving scheme.

FIGS. 15(a) and 15(b) shows the positive and negative dot polarity pattern of a pixel design 1510 (labeled 1510+ and 1510−, respectively. Pixel design 1510 is a variant of pixel design 1410 having three color dots per color component. In Pixel design 1510, associated dots AD_1, AD_2, and AD_3 are arranged sequentially on a row. Associated dots AD_1 is separated from associated dot AD_2 by horizontal dot spacing HDS (not labeled). Similarly, associated dot AD_2 is separated from associated dot AD_3 by horizontal dot spacing HDS. Switching elements SE_1, SE_2, and SE_3 are positioned within associated dots AD_1, AD_2, and AD_3, respectively.

The first color component of pixel design 1510 has three color dots CD_1_1, CD_1_2, and CD_1_3 in a left-right-left zigzag pattern. The first color component is positioned so that color dot CD_1_3 is horizontally aligned with associated dot AD_1 and offset vertically above associated dot AD_1 by vertical dot offset VDO. The electrode of color dot CD_1_3 is coupled to switching element SE_1 and to the electrode of color dot CD_1_2, which is also coupled to the electrode of color dot CD_1_1, thus electrically coupling the electrodes of color dot CD_1_1, CD_1_2 and CD_1_3 to switching element SE_1. The second color component of pixel design 1510 has three color dots CD_2_1, CD_2_2, and CD_2_3 in a left-right-left zigzag pattern. The second color component is positioned so that color dot CD_2_3 is horizontally aligned with associated dot AD_2 and offset vertically above associated dot AD_2 by vertical dot offset VDO. The electrode of color dot CD_2_3 is coupled to switching element SE_2 and to the electrode of color dot CD_2_2, which is also coupled to the electrode of color dot CD_2_1, thus electrically coupling the electrodes of color dot CD_2_1, CD_2_2, and CD_2_3 to switching element SE_2. The third color component of pixel design 1510 has three color dots CD_3_1, CD_3_2, and CD_3_3 in a left-right-left zigzag pattern. The third color component is positioned so that color dot CD_3_3 is horizontally aligned with associated dot AD_3 and offset vertically above associated dot AD_3 by vertical dot offset VDO. The electrode of color dot CD_3_3 is coupled to switching element SE_3 and to the electrode of color dot CD_3_2, which is also coupled to the electrode of color dot CD_1_1, thus electrically coupling the electrodes of color dot CD_3_1, CD_3_2, and CD_3_3 to switching element SE_3.

As explained above, the fringe fields in the color dots are amplified if adjacent dots have opposite polarities. For pixel design 1510, the polarities of the color dots and associated dots are assigned to form a checkerboard pattern of polarities. FIG. 15(a) shows the positive dot polarity for pixel design 1510. Therefore in FIG. 15(a), switching elements SE_1 and SE_3, color dots CD_1_1, CD_1_2, CD_1_3, CD_3_1, CD_3_2, and CD_3_3, and associated dot AD_2 have positive polarity as denoted by "+". However, switching element SE_2, color dots CD_2_1, CD_2_2, and CD_2_3, and associated dots AD_1 and AD_3 have negative polarity as denoted by "−". Because, associated dot AD_1 and color dot CD_2_3 should have the same polarity, the electrode of associated dot AD_1 is coupled the electrode of color dot CD_2_3. Similarly, because associated dot AD_2 and color dot CD_3_3 should have the same polarity, therefore, the electrode of associated dot AD_2 is coupled, electrode of color dot CD_3_3. Even though associated dot AD_3 and color dot CD_2_3 have the same polarity, the electrode of associated dot AD_3 is configured to receive proper polarity from the adjacent pixel to avoid crossing connections with the connection between associated dot AD_2 and color dot CD_3_3. This connection is illustrated by ITO connection 1512.

FIG. 15(b) shows the negative dot polarity pattern of pixel design 1510. Therefore in FIG. 15(b), switching elements SE_1 and SE_3, color dots CD_1_1, CD_1_2, CD_1_3, CD_3_1, CD_3_2, and CD_3_3, and associated dot AD_2 have negative polarity as denoted by "−". However, switching element SE_2, color dots CD_2_1, CD_2_2, and CD_2_3, and associated dots AD_1 and AD_3 have positive polarity as denoted by "+".

Figure 15C:
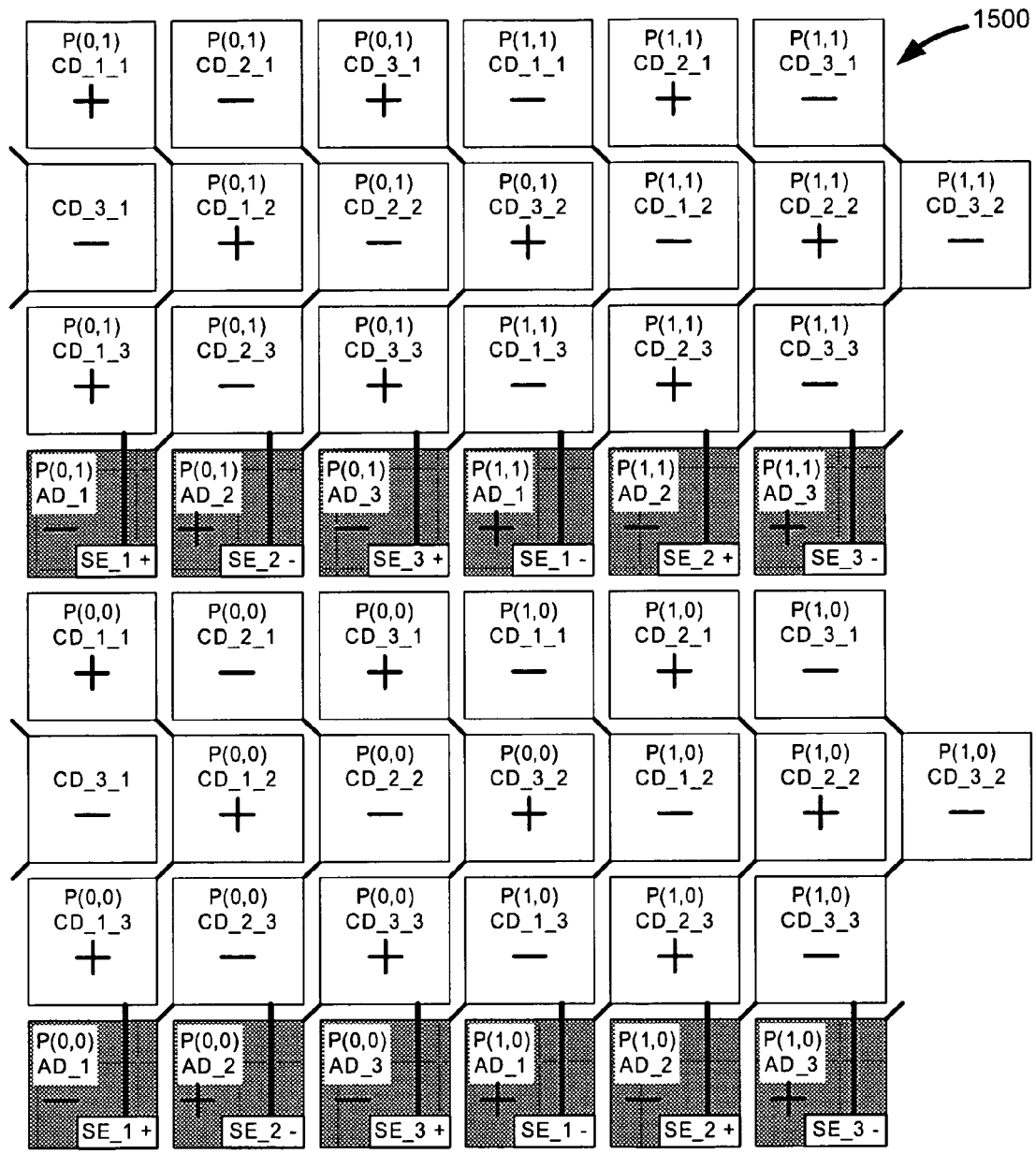
FIG. 15(c) illustrates a liquid crystal display in accordance with one embodiment of the present invention.

FIG. 15(c) shows a portion of a display 1500 formed from pixels using pixel design 1510 to create a checkerboard pattern of polarities for the color dots and associated dots. Each row of display 1500 has pixels of pixel design 1510 arranged sequentially and having of alternating dot polarities. Within a row the associated dots of adjacent pixels are vertically aligned and horizontally separated by one horizontal dot spacing HDS (not labeled in FIG. 15(c)). For example in row 0, pixel P(0,0) has positive dot polarity while pixel P(1, 0) has negative dot polarity.

All rows begin with the same polarity, i.e. the pixels in each column of pixels have the same dot polarity, but each column has a different dot polarity from its adjacent columns. For example pixels P(0, 0) and P(0, 1) both have positive dot polarities while pixels P(1, 0) and P(1, 1) both have negative dot polarities. In the next frame, all pixels would switch dot polarities. Thus, in general a pixel P(X, Y) in a display using pixel design 1500 would have a first dot polarity if Y is even, and a second dot polarity if Y is odd. Similarly, the switching elements also display a similar pattern (i.e. switching elements in each column have the same polarity but switching elements in adjacent columns have different dot polarities). This arrangement of switching elements is the switching element column inversion driving scheme.

Figure 16C:
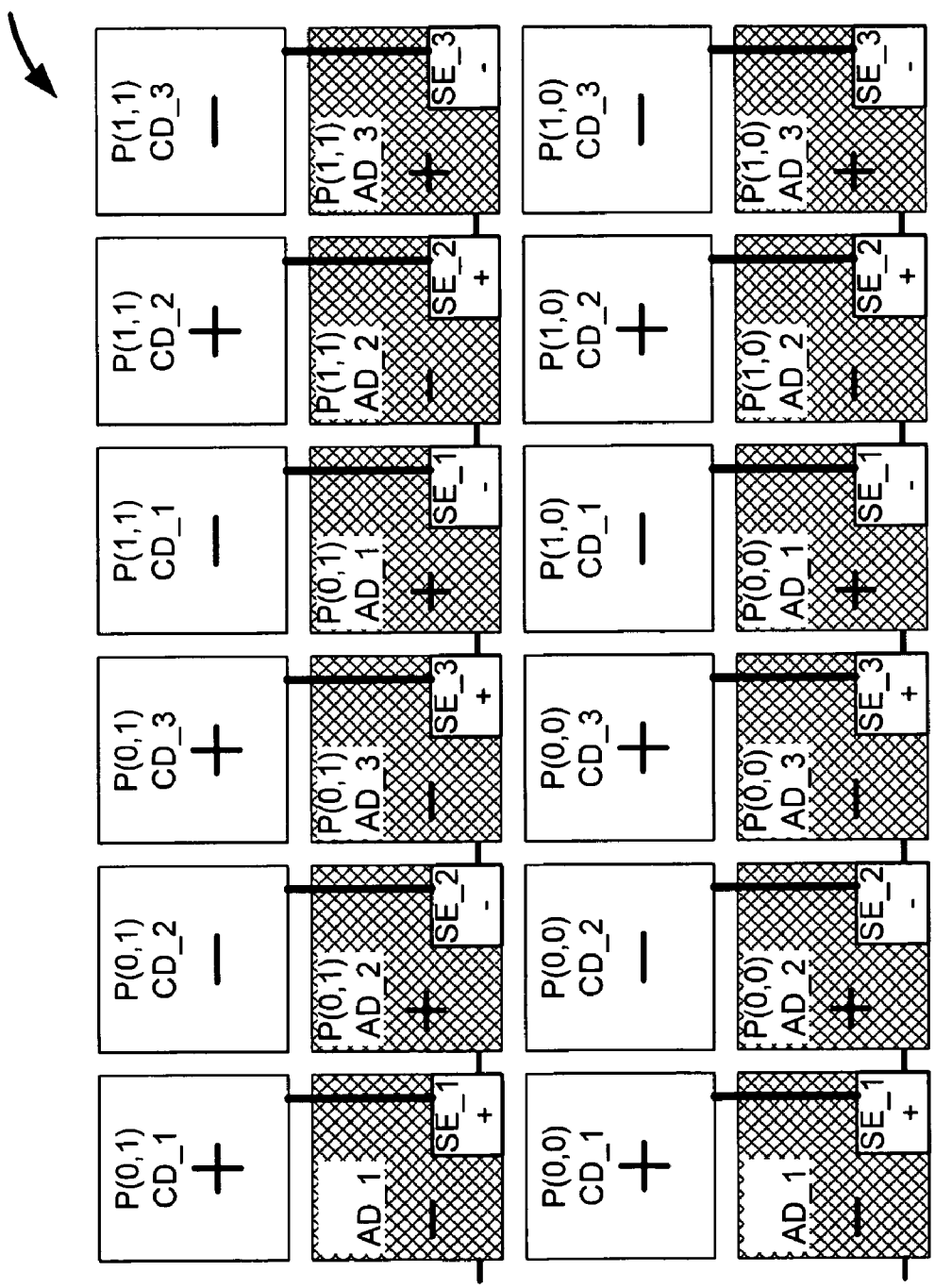
FIG. 16(c) illustrates a liquid crystal display in accordance with one embodiment of the present invention.

The preceding pixels include multiple color dots per color components. However, some embodiments of the present invention use associated dots with color components having a single color dot. For example, FIGS. 16(a) and 16(b) show the positive and negative dot polarity pattern for a pixel design 1610 (labeled 1610+ and 1610-, respectively) having a single color dot per color component. Using a novel arrangement of electrically biased associated dots and color dots, pixel design 1610 can be used to create displays having four liquid crystal domains using switching element column inversion driving scheme (as illustrated in FIG. 16(c)).

In pixel design 1610, associated dots AD_1, AD_2, and AD_3 are arranged sequentially on a row. Associated dots AD_1 is separated from associated dot AD_2 by horizontal dot spacing HDS. Similarly, associated dot AD_2 is separated from associated dot AD_3 by horizontal dot spacing HDS. Switching elements SE_1, SE_2, and SE_3 are positioned within associated dots AD_1, AD_2, and AD_3, respectively.

The first color component of pixel design 1610 has one color dot CD_1. The first color component is positioned so that color dot CD_1 is horizontally aligned with associated dot AD_1, and offset vertically above associated dot AD_1 by vertical dot offset VDO (labeled in FIGS. 16(a) and 16(b)). The electrode of color dot CD_1 is coupled to switching element SE_1. The second color component of pixel design 1610 has one color dot CD_2. The second color component is positioned so that color dot CD_2 is horizontally aligned with associated dot AD_2, and offset vertically above associated dot AD_2 by vertical dot offset VDO. The electrode of color dot CD_2 is coupled to switching element SE_2. The third color component of pixel design 1610 has one color dot CD_3. The third color component is positioned so that color dot CD_3 is horizontally aligned with associated dot AD_3, and offset vertically above associated dot AD_3 by vertical dot offset VDO. the electrode of color dot CD_3 is coupled to switching element SE_3

To achieve a checkerboard pattern of dot polarities, the polarity of associated dot AD_1, AD_2, and AD_3 are opposite from the polarities of switching element SE_1, SE_2, and SE_3, respectively. Thus, in the particular embodiment of pixel design 1610, the electrode of associate dot AD_2 is coupled to switching element SE_1. The electrode of associate dot AD_3 is coupled to switching element SE_2. The electrode of associate dot AD_1 is coupled to switching element SE_3 of the pixel to the left of the current pixel. Specifically as illustrated in FIG. 16(a) an ITO connector 1612, would connect associated dot AD_1 with SE_3 of the adjacent pixel on the left. Other embodiments of the present invention may couple the electrode of the associated dots to color dots that are diagonally adjacent. For example, the electrode of associate dot AD_1 could be coupled to the electrode of color dot CD_2 to receive the appropriate polarity.

As explained above, the fringe fields in the color dots are amplified if adjacent dots have opposite polarities. For pixel design 1610, the polarities of the color dots and associated dots are assigned to form a checkerboard pattern of polarities. FIG. 16(a) shows the positive dot polarity for pixel design 1610. Therefore, switching elements SE_1 and SE_3, color dots CD_1 and CD_3, and associated dot AD_2, have positive polarity as denoted by "+". However, switching element SE_2, color dot CD_2, and associated dots AD_1 and AD_3, have negative polarity as denoted by "−".

FIG. 16(b) shows the negative dot polarity for pixel design 1610. In the negative dot polarity of pixel design 1610, switching elements SE_1 and SE_3, and color dots CD_1 and CD_3, and associated dot AD_2, have negative polarity as denoted by "−". However, switching element SE_2, color dot CD_2, and associated dots AD_1 and AD_3, have positive polarity as denoted by "+".

FIG. 16(c) shows a portion of a display 1600 formed from pixels using pixel design 1610 to create a checkerboard pattern of polarities for the color dots and associated dots. Each row of display 1600 has pixels of pixel design 1610 arranged sequentially and having alternating dot polarity patterns. Within a row the associated dots of adjacent pixels are vertically aligned and horizontally separated by one horizontal dot spacing HDS (not labeled in FIG. 16(c)). For example in row 0, pixel P(0,0) has positive dot polarity while pixel P(1, 0) has negative dot polarity. Furthermore, pixels in a column have the same dot polarity patterns so that in adjacent rows, pixels in the same location on a row have the same dot polarity patterns. For example, in row 0, pixel P(1,0) has negative dot polarity and in row 1 pixel P(1,1) has negative dot polarity. In the next frame, all pixels would switch dot polarities. In general, a pixel P(X,Y) has a first dot polarity if X is odd and has a second dot polarity if X is even. A close examination of the switching elements in display 1600 shows that the polarities of the switching elements are the same within each column but alternate from column to column. This arrangement of switching element is an example of the switching element column inversion driving scheme.

Figure 17C:
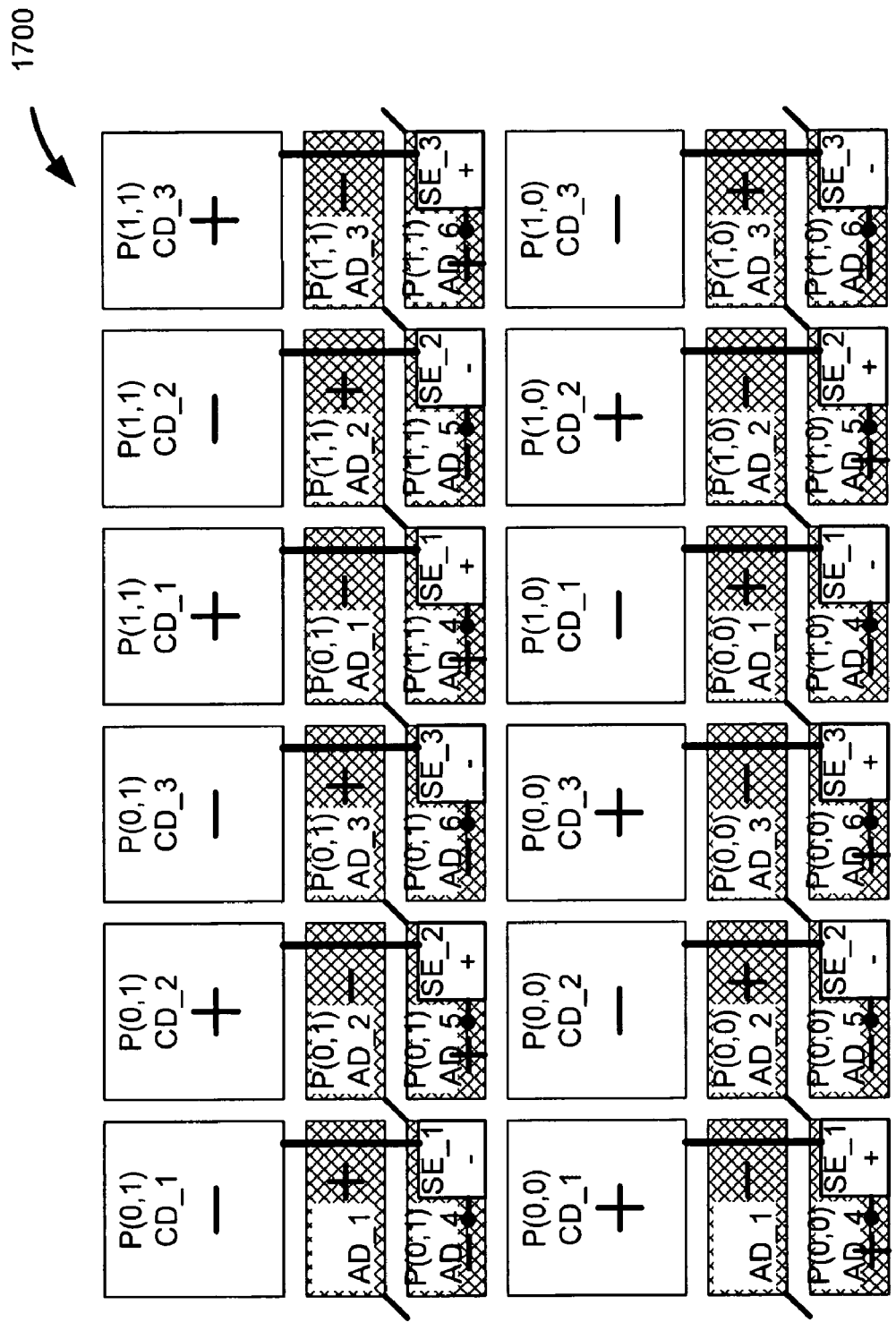
FIG. 17(c) illustrates a liquid crystal display in accordance with one embodiment of the present invention.

FIGS. 17(a) and 17(b) show the positive and negative dot polarity pattern for a pixel design 1710 (labeled 1710+ and 1710-, respectively), which uses multiple adjacent associated dots with each color component. For clarity, the color components in FIGS. 17(a) and 17(b) use one color dot per color component. However one skilled in the art can readily adapt the multiple adjacent associated dots for pixel designs using multiple color dots per color components.

In pixel design 1710, associated dots AD_1, AD_2, and AD_3 are arranged sequentially on a first associated dot row. Associated dot AD_1 is separated from associated dot AD_2 by horizontal dot spacing HDS. Similarly, associated dot AD_2 is separated from associated dot AD_3 by horizontal dot spacing HDS. Associated dots AD_4, AD_5, and AD_6 are arranged sequentially on a second associated dot row, below associated dots AD_1, AD_2, and AD_3. Associated dot AD_4 is separated from associated dot AD_5 by horizontal dot spacing HDS. Similarly, associated dot AD_5 is separated from associated dot AD_6 by horizontal dot spacing HDS. Switching elements SE_1, SE_2, and SE_3 are positioned within associated dots AD_4, AD_5, and AD_6, respectively. Associated dots AD_4, AD_5, and AD_6 are horizontally aligned with associated dots AD_1, AD_2, and AD_3, respectively. Associated dots AD_4, AD_5, and AD_6 are vertically offset above associated dots AD_1, AD_2, and AD_3, respectively, by vertical dot offset VDO_2.

The first color component of pixel design 1710 has one color dot CD_1. The first color component is positioned so that color dot CD_1 is horizontally aligned with associated dots AD_1 and AD_4, and offset vertically above associated dot AD_1 by vertical dot offset VDO_1. The electrode of color dot CD_1 is coupled to switching element SE_1. The second color component of pixel design 1710 has one color dot CD_2. The second color component is positioned so that color dot CD_2 is horizontally aligned with associated dots AD_2 and AD_5, and offset vertically above associated dot AD_2 by vertical dot offset VDO_1. The electrode of color dot CD_2 is coupled to switching element SE_2. The third color component of pixel design 1710 has one color dot CD_3. The third color component is positioned so that color dot CD_3 is horizontally aligned with associated dots AD_3 and AD_6, and offset vertically above associated dot AD_3 by vertical dot offset VDO_1. The electrode of color dot CD_3 is coupled to switching element SE_3.

As explained above the polarities of the color dots and the associated dots should form a checkerboard pattern. Thus as illustrated in FIG. 17(*a*) in the positive dot polarity pattern of pixel design 1710, switching elements SE_1 and SE_3, color dots CD_1 and CD_3, and associated dots AD_1, AD_2, and AD_6 have positive dot polarity as denoted by "+". However, switching element SE_2, color dot CD_2, and associated dots AD_1, AD_5 and AD_6 have negative polarity as denoted by "–". To achieve this dot polarity pattern, the electrode of associate dot AD_4 is coupled to switching element SE_1 and the electrode of associate dot AD_2. The electrode of associate dot AD_5 is coupled to switching element SE_2 and the electrode of associate dot AD_3. The electrode of associate dot AD_6 is coupled to switching element SE_3. To achieve a more uniform electrical distribution and to avoid crossover ITO connections, associated dot AD_1 receives its polarity from a neighboring pixel using ITO connector 1712. While FIG. 17(*a*) shows a specific ITO connection pattern, those skilled in the art can use the principles of the presented invention to design other connection patterns. For example, the electrodes of associated dot AD_2 and AD_3 could be coupled to the electrodes of color dots CD_1 and CD_3, respectively, and the electrode of associated dot AD_1 could be coupled to the electrode of associated dot AD_5.

FIG. 17(*b*) shows the negative dot polarity for pixel design 1710. Therefore, switching elements SE_1 and SE_3, and color dots CD_1 and CD_3, and associated dots AD_2, AD_4 and AD_6, have negative polarity as denoted by "–". However, switching element SE_2, color dot CD_2, and associated dots AD_1, AD_3, and AD_5, have positive polarity as denoted by "+".

FIG. 17(*c*) shows a portion of a display 1700 formed from pixels using pixel design 1710 to create a checkerboard pattern of polarities for the color dots and associated dots. Each row of display 1700 has pixels of pixel design 1710 arranged sequentially and having alternating polarity. Within a row the associated dots of adjacent pixels are vertically aligned and horizontally separated by one horizontal dot spacing HDS (not labeled in FIG. 17(*c*)). For example in row 0, pixel P(0,0) has positive dot polarity while pixel P(1, 0) has negative dot polarity. Furthermore, pixels in a column also have alternating dot polarities so that in adjacent rows, pixels in the same location on a row have opposite polarities. For example, in row 1, pixel P(0,1) has negative dot polarity while pixel P(1,1) has positive dot polarity. In the next frame, all pixels would switch dot polarities. In general, a pixel P(X, Y) has a first dot polarity if X+Y is odd and has a second dot polarity if X+Y is even. A close examination of the switching elements in display 1700 shows that the polarities of the switching elements are also in a checkerboard pattern. This arrangement of switching element is an example of the switching element point inversion driving scheme.

Figure 18E:
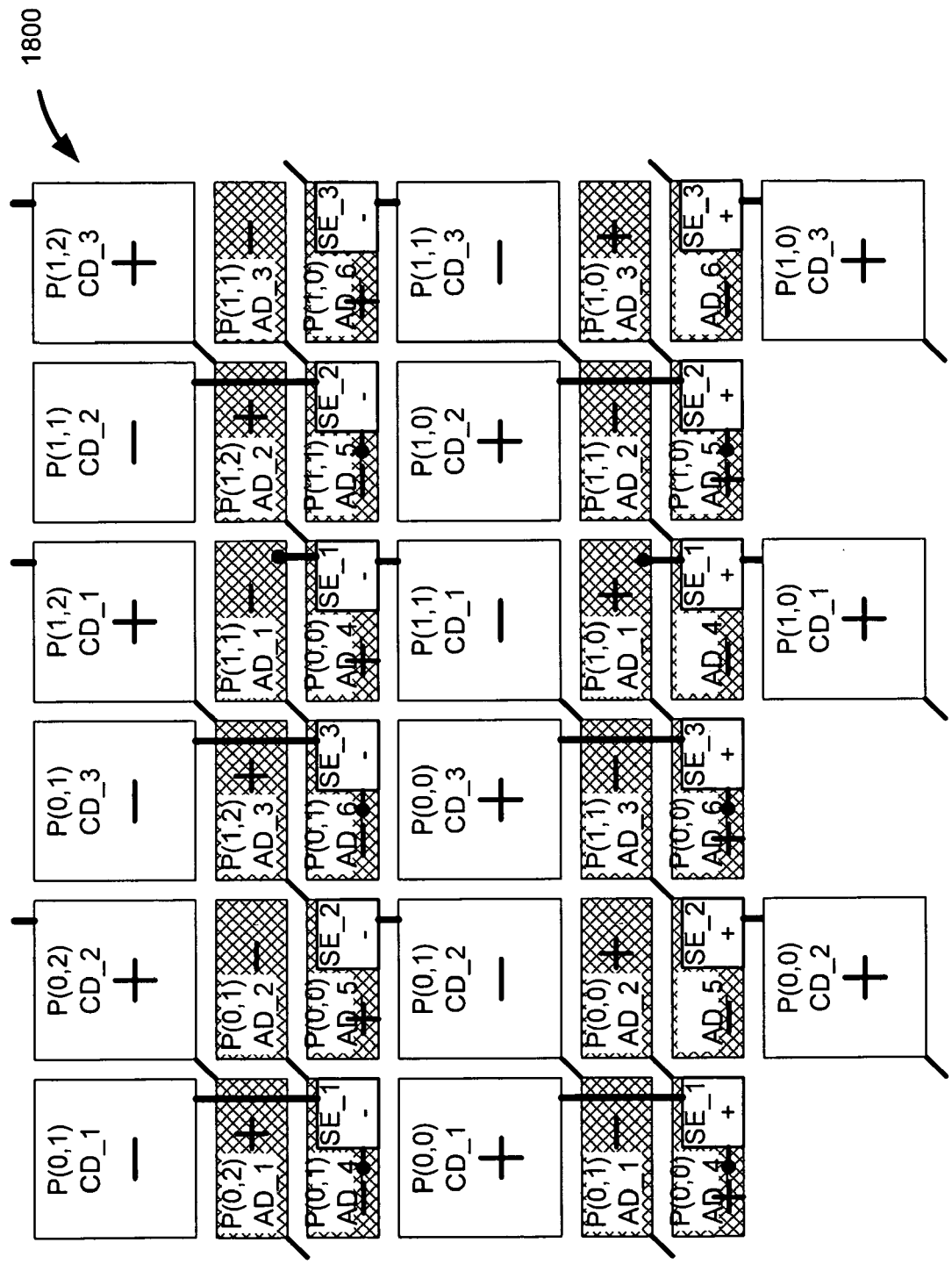
FIG. 18(e) illustrates a liquid crystal display in accordance with one embodiment of the present invention.

FIGS. 18(*a*)-18(*d*) show two additional spread pixel designs (1810 and 1820), each having one color dot per color component. Both pixel designs have three color components and each color component has one color dot. In addition, spread pixel designs 1810 and 1820 include two associated dots (AD_1, AD_2, AD_3, AD_4, AD_5, and AD_6) for each color component. A switching element (SE_1, SE_2, and SE_3), for each color component, is located within the associated dot.

For pixel design 1810, associated dots AD_1, AD_2, and AD_3 are arranged sequentially on a first row associated dot row. Associated dot AD_1 is separated from associated dot AD_2 by horizontal dot spacing HDS. Similarly, associated dot AD_2 is separated from associated dot AD_3 by horizontal dot spacing HDS. Associated dots AD_4, AD_5, and AD_6 are arranged sequentially on a second associated dot row. Associated dot AD_4 is separated from associated dot AD_5 by horizontal dot spacing HDS. Similarly, associated dot AD_5 is separated from associated dot AD_6 by horizontal dot spacing HDS. Switching elements SE_1, SE_2, and SE_3 are positioned within associated dots AD_4, AD_5, and AD_6, respectively. Associated dots AD_4, AD_5, and AD_6 are horizontally aligned with associated dots AD_1, AD_2, and AD_3, respectively. Associated dots AD_4, AD_5, and AD_6 are vertically offset below AD_1, AD_2, and AD_3, respectively, by vertical dot offset VDO_2.

Specifically, FIGS. 18(*a*) and (*b*) show the positive and negative dot polarity pattern for one color dot of a pixel design 1810 (labeled 1810+ and 1810–, respectively). The first color component of pixel design 1810 has one color dot CD_1. The first color component is positioned so that color dot CD_1 is horizontally aligned with associated dots AD_1 and AD_4, and offset vertically above associated dot AD_1 by vertical dot offset VDO_1. The electrode of color dot CD_1 is coupled to switching element SE_1. The second color component of pixel design 1810 has one color dot CD_2. The second color component is positioned so that color dot CD_2 is horizontally aligned with associated dots AD_2 and AD_5, and offset vertically below associated dot AD_5 by vertical dot offset VDO_2. The electrode of color dot CD_2 is coupled to switching element SE_2. The third color component of pixel design 1810 has one color dot CD_3. The third color component is positioned so that color dot CD_3 is horizontally aligned with associated dots AD_3 and AD_6, and offset vertically above associated dot AD_3 by vertical dot offset VDO_1. The electrode of color dot CD_3 is coupled to switching element SE_3.

As explained above the polarities of the color dots and the associated dots should form a checkerboard pattern. Thus as illustrated in FIG. 18(*a*) in the positive dot polarity pattern of pixel design 1810, switching elements SE_1, SE_2, and SE_3, color dots CD_1, CD_2, and CD_3, and associated dots AD_2, AD_4, and AD_6 have positive dot polarity as denoted by "+". However, associated dots AD_1, AD_3 and AD_5 have negative polarity as denoted by "–". Because all the switching elements in pixel design 1810 have the same polarity, the associated dots having different polarity than the switching elements (i.e., associated dots AD_1, AD_3, and AD_5 must receive polarity from outside the pixel. Thus, FIGS. 18(*a*) and 18(*b*) shows ITO connectors (1812, 1813, 1814, 1816) which are coupled various parts of adjacent pixels. These ITO connectors are shown again in FIGS. 18(*c*) and 18(*d*) for clarity. Specifically, the electrode of associated dot AD_1 is coupled to color dot CD_2 of the pixel above the current pixel using ITO connector 1812 to receive proper polarity. (See FIG. 18(*e*)). An ITO connector 1812' is shown coupled to color dot CD_2, which would be equivalent to ITO connector 1812 of a pixel below the current pixel. The electrode of associated dot AD_2 is coupled to the electrode of associated dot AD_4, which is coupled to switching element SE_1. The electrode of associated dot AD_3 is coupled to the electrode of associated dot AD_5. In addition, the electrode of associated dot AD_3 is coupled to receive polarity from color dot CD_1 of a pixel to the right of and above the current pixel via ITO connector 1813. The pixel to the right of and above the current pixel uses pixel design 1820 described below (see also FIG. 18(*e*)). Finally, the electrode of associated dot AD_6 is coupled to switching element SE_3. In addition the electrode of associated dot AD_6 provides polarity to associated dot AD_1 of the pixel to the right of the current pixel.

As illustrated in FIG. 18(*b*) in the negative dot polarity pattern of pixel design 1810, switching elements SE_1, SE_2, and SE_3, color dots CD_1, CD_2, and CD_3, and associated dots AD_2, AD_4, and AD_6 have negative dot polarity as denoted by "−". However, associated dots AD_1, AD_3 and AD_5 have positive polarity as denoted by "+".

For pixel design 1820 (FIGS. 18(*c*) and 18(*d*)), associated dots AD_1, AD_2, and AD_3 are arranged sequentially on a first row associated dot row. Associated dot AD_1 is separated from associated dot AD_2 by horizontal dot spacing HDS. Similarly, associated dot AD_2 is separated from associated dot AD_3 by horizontal dot spacing HDS. Associated dots AD_4, AD_5, and AD_6 are arranged sequentially on a second associated dot row. Associated dot AD_4 is separated from associated dot AD_5 by horizontal dot spacing HDS. Similarly, associated dot AD_5 is separated from associated dot AD_6 by horizontal dot spacing HDS. Switching elements SE_1, SE_2, and SE_3 are positioned within associated dots AD_4, AD_5, and AD_6, respectively. Associated dots AD_4, AD_5, and AD_6 are horizontally aligned with associated dots AD_1, AD_2, and AD_3, respectively. Associated dots AD_4, AD_5, and AD_6 are vertically offset below AD_1, AD_2, and AD_3, respectively, by vertical dot offset VDO_2.

Specifically, FIGS. 18(*c*) and (*d*) show the positive and negative dot polarity pattern for one color dot of a pixel design 1820 (labeled 1820+ and 1820−, respectively). The first color component of pixel design 1820 has one color dot CD_1. The first color component is positioned so that color dot CD_1 is horizontally aligned with associated dots AD_1 and AD_4, and offset vertically below associated dot AD_4 by vertical dot offset VDO_2. The electrode of color dot CD_1 is coupled to switching element SE_1. The second color component of pixel design 1820 has one color dot CD_2. The second color component is positioned so that color dot CD_2 is horizontally aligned with associated dots AD_2 and AD_5, and offset vertically above associated dot AD_2 by vertical dot offset VDO_1. The electrode of color dot CD_2 is coupled to switching element SE_2. The third color component of pixel design 1820 has one color dot CD_3. The third color component is positioned so that color dot CD_3 is horizontally aligned with associated dots AD_3 and AD_6, and offset vertically below associated dot AD_6 by vertical dot offset VDO_2. The electrode of color dot CD_3 is coupled to switching element SE_3.

As explained above the polarities of the color dots and the associated dots should form a checkerboard pattern. Thus as illustrated in FIG. 18(*c*), in the positive dot polarity pattern of pixel design 1820, switching elements SE_1, SE_2, and SE_3, color dots CD_1, CD_2, and CD_3, and associated dots AD_1, AD_3, and AD_5 have positive dot polarity as denoted by "+". However, associated dots AD_2, AD_4 and AD_6 have negative polarity as denoted by "−". Because all the switching elements in pixel design 1820 have the same polarity, the associated dots having different polarity than the switching elements (i.e., associated dots AD_2, AD_4, and AD_6 must receive polarity from outside the pixel. Thus, FIGS. 18(*c*) and 18(*d*) shows ITO connectors (1822, 1813, 1814, 1816) which are coupled various parts of adjacent pixels. These ITO connectors were also shown previously in FIGS. 18(*c*) and 18(*d*) for clarity. Specifically, the electrode of associated dot AD_1 is coupled to switching element SE_1. In addition the electrode of associated dot AD_1 is coupled to associated dot AD_6 of the pixel to the left of the current pixel via ITO connector 1816. The electrode of associated dot AD_2 is coupled to the electrode of associated dot AD_4. In addition the electrode of associated dot CD_2 is coupled to the electrode of color dot CD_3 of the pixel above the current pixel using ITO connector 1822 to receive proper polarity. (See FIG. 18(*e*)). An ITO connector 1822' is shown coupled to color dot CD_3, which would be equivalent to ITO connector 1822 of a pixel below the current pixel. The electrode of associated dot AD_3 is coupled to the electrode of associated dot AD_5, which is coupled to switching element SE_2. Finally, the electrode of associated dot AD_6 is coupled to associated dot AD_1 of the pixel to the right of the current pixel via ITO connector 1814. In addition, ITO connector 1813 is shown connected to color dot CD_1. As explained above, ITO connector connects color dot CD_1 of a pixel using pixel design 1820 associated dot AD_3 of a pixel (using pixel design 1810) to the left and below the current pixel.

As illustrated in FIG. 18(*d*) in the negative dot polarity pattern of pixel design 1810, switching elements SE_1, SE_2, and SE_3, color dots CD_1, CD_2, and CD_3, and associated dots AD_1, AD_3, and AD_5 have negative dot polarity as denoted by "−". However, associated dots AD_2, AD_4 and AD_6 have positive polarity as denoted by "+".

FIG. 18(*e*) shows a portion of a display 1800 that combines pixels using pixel designs 1810 and 1820 to create a checkerboard pattern of color dot polarities. Each row of display 1800 has alternating pixels of pixel design 1810 and pixel design 1820. For example in row 0, pixels P(0,0) use pixel design 1810 and pixel P(1,0) uses pixel design 1820. Pixel P(2,0) (not shown) would use pixel design 1810. Similarly, in row 1, pixel P(0,1) uses pixel design 1810 and pixel P(1,1) uses pixel design 1820, and pixel P(2, 1) (not shown) uses pixel design 1810. Within a row the associated dots of adjacent pixels are vertically aligned and horizontally separated by one horizontal dot spacing HDS (not labeled in FIG. 18(*e*)). The rows in display 1800 are horizontally aligned and vertically interleaved so that some color dots from row 0 are vertically aligned with some of the color dots of row 1. Specifically, color dot CD_1 of pixel P(0,0) is vertically aligned with color dot CD_2 of pixel P(0, 1).

All the pixels on a row have the same polarity. However, alternating rows have different polarities. Thus for example, row 0 is shown with positive dot polarity while row 1 is show with negative dot polarity. In the next frame row 0 would have negative dot polarity while row 1 would have positive dot polarity. In general, even numbered rows have a first dot polarity pattern and odd number rows have a second dot polarity pattern. In general a pixel P(X,Y) in display 1800 uses pixel design 1810 where X is even and uses pixel design 1820 where X is odd. Furthermore, pixel P(X,Y) has a first dot polarity pattern when Y is even and a second dot polarity pattern when Y is odd.

As illustrated in FIG. 18(*e*), using the pixel designs described above, display 1800 has a checkerboard pattern of dot polarities. Thus, each color dot will have four liquid crystal domains. Because each row of switching elements have the same polarity, while alternating rows of switching elements of opposite polarity, display 1800 can achieve four liquid crystal domains while only requiring a switching element row inversion driving scheme.

Figures 19A, 19B:
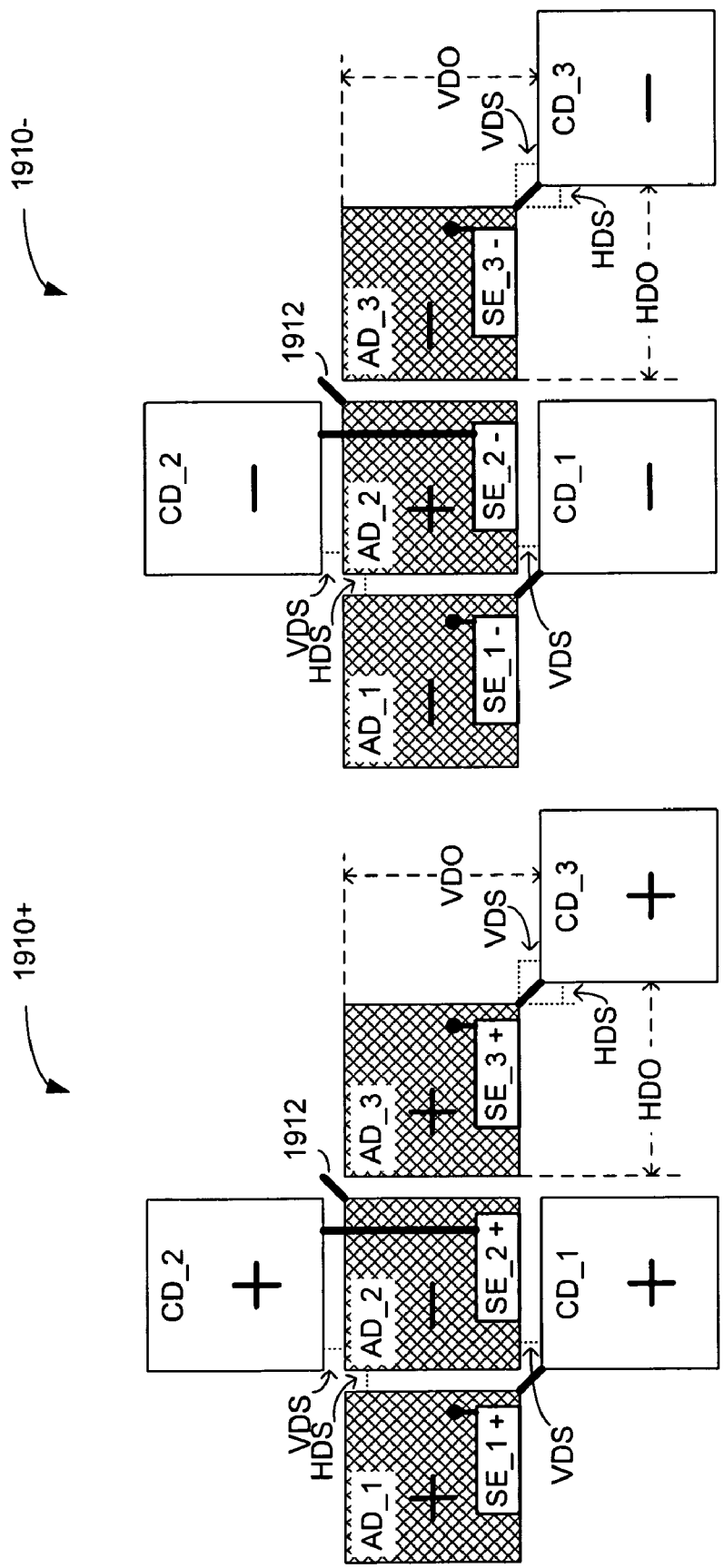
FIGS. 19(a)-19(b) illustrate a pixel design in accordance with one embodiment of the present invention.
Figure 19C:
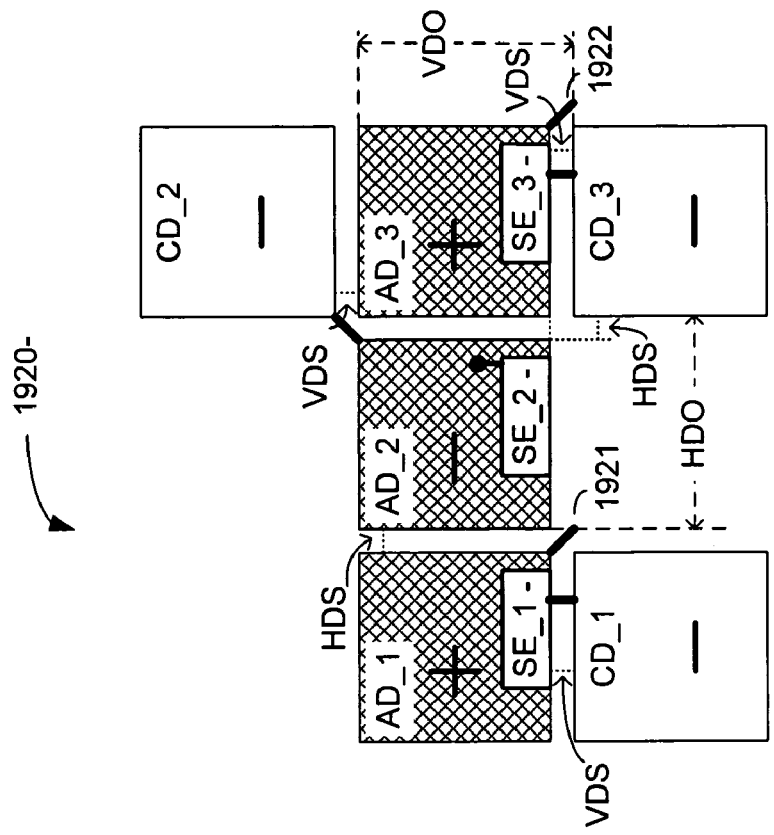
FIGS. 19(c)-19(d) illustrate a pixel design in accordance with one embodiment of the present invention.
Figure 19D:
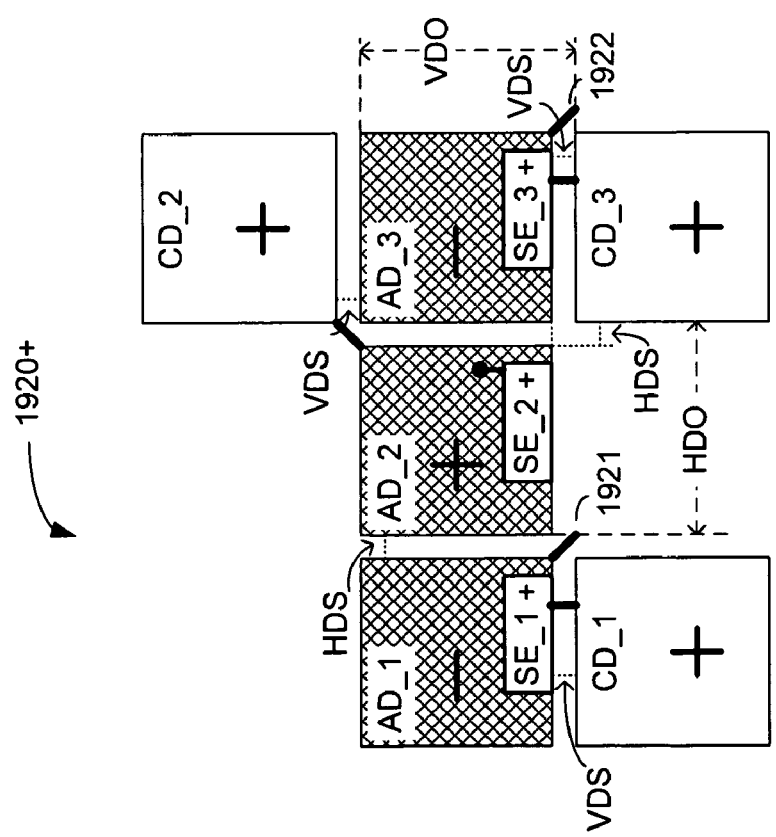

FIGS. 19(*a*)-19(*h*) show four additional spread pixel designs (1910, 1920, 1930 and 1940), each having one color dot per color component. Pixel designs 1910, 1920, 1930, and 1940 have three color components. FIG. 19(*i*) shows a portion of a display 1900 that combines pixels using pixel designs 1910, 1920, 1930 and 1940 to create a checkerboard pattern of color dot polarities. Because each row of switching elements have the same polarity, while alternating rows of switching elements of opposite polarity, display 1900 can achieve four liquid crystal domains while only requiring a switching element row inversion driving scheme.

Specifically, FIG. 19(*a*) shows the positive dot polarity pattern of a spread pixel design 1910 (labeled as 1910+). As explained above, a pixel will switch between a first dot polarity pattern and a second dot polarity pattern between each image frame. Pixel design 1910 has three associated AD_1, AD_2, and AD_3 arranged sequentially on an associated dot row. Associated dot AD_1 is separated from associated dot AD_2 by horizontal dot spacing HDS. Similarly, associated dot AD_2 is separated from associated dot AD_3 by horizontal dot spacing HDS. Switching elements SE_1, SE_2, and SE_3 are located within associated dots AD_1, AD_2, and AD_3, respectively. In pixel design 1910, the first color component of spread pixel design 1910 has one color dot CD_1. The first color component is positioned so that color dot CD_1 is horizontally aligned with associated dot AD_2 and offset vertically above associated dot AD_2 by vertical dot offset VDO. The electrode in color dot CD_1 is coupled to the electrode of associated dot AD_1, which is coupled to switching element SE_1. Alternatively, the electrode of color dot CD_1 could be coupled directly to switching element SE_1. The second color component of spread pixel design 1910 has one color dots CD_2. The second color component is positioned so that color dot CD_2 horizontally aligned with associated dot AD_2 and is offset vertically above associated dot AD_2 by vertical dot offset VDO. The electrode of color dot CD_2 is coupled to switching element SE_2. The third color component of spread pixel design 1910 has one color dots CD_3. The third color component is positioned so that color dot CD_3 is horizontally offset to the right of associated dot AD_3 by horizontal dot offset HDO and vertically offset below associated dot AD_3 by vertical dot offset VDO. The electrode of color dot CD_3 is coupled to the electrode of associated dot AD_3, which is coupled to switching element SE_3. In other embodiments of the present invention the electrode of color dot CD_3 is coupled directly to switching element SE_3.

As explained above, a checkerboard pattern of dot polarities is desirable to amplify the fringe fields in each color dot. In FIG. 19(*a*) pixel design 1910 is in the positive dot polarity pattern. Accordingly, switching elements SE_1, SE_2, and SE_3, and all of the color dots have positive polarity as denoted by "+". To achieve the checkerboard pattern, associated dots AD_1 and AD_3 also have positive polarity. Thus, the electrodes of associated dots AD_1 and AD_3 can be coupled to switching elements SE_1 and SE_3, respectively. However, associated dot AD_2 has negative polarity, as denoted by "−". In a checkerboard pattern of polarities, the color dots that are diagonally adjacent to associated dot AD_2 should have the appropriate polarity. Thus, in some embodiments of the present invention the electrode of associated dot AD_2 is coupled to the electrode of at least one diagonally adjacent color dot from another pixel. In the particular embodiment of pixel design 1910, the electrode of associated dot AD_2 is coupled to the electrode of the color dot that is to the right and above associated dot AD_2 as shown by ITO connector 1912. As illustrated in FIG. 19(*b*), when pixel design 1910 (labeled 1910−) is in the negative dot polarity pattern, switching elements SE_1, SE_2, and SE_3, and all of the color dots have negative polarity. Associated dots AD_1 and AD_3 also have negative polarity. However, associated dot AD_2 has positive polarity.

FIG. 19(*c*) shows the positive dot polarity pattern of a spread pixel design 1920 (labeled as 1920+). As explained above, a pixel will switch between a first dot polarity pattern and a second dot polarity pattern between each image frame. Pixel design 1920 has three associated AD_1, AD_2, and AD_3 arranged sequentially on an associated dot row. Associated dot AD_1 is separated from associated dot AD_2 by horizontal dot spacing HDS. Similarly, associated dot AD_2 is separated from associated dot AD_3 by horizontal dot spacing HDS. Switching elements SE_1, SE_2, and SE_3 are located within associated dots AD_1, AD_2, and AD_3, respectively. In pixel design 1920, the first color component of spread pixel design 1920 has one color dot CD_1. The first color component is positioned so that color dot CD_1 is horizontally aligned with associated dot AD_1 and offset vertically below associated dot AD_1 by vertical dot offset VDO. The electrode in color dot CD_1 is coupled to switching element SE_1. The second color component of spread pixel design 1920 has one color dots CD_2. The second color component is positioned so that color dot CD_2 horizontally aligned with associated dot AD_3 and is offset vertically above associated dot AD_3 by vertical dot offset VDO. The electrode of color dot CD_2 is coupled the electrode of associated dot AD_2, which is coupled to switching element SE_2. The third color component of spread pixel design 1920 has one color dots CD_3. The third color component is positioned so that color dot CD_3 is horizontally aligned with associated dot AD_3 and vertically offset below associated dot AD_3 by vertical dot offset VDO. The electrode of color dot CD_3 is coupled to switching element SE_3.

As explained above, a checkerboard pattern of dot polarities is desirable to amplify the fringe fields in each color dot. In FIG. 19(*c*) pixel design 1920 is in the positive dot polarity pattern. Accordingly, switching elements SE_1, SE_2, and SE_3, and all of the color dots have positive polarity as denoted by "+". To achieve the checkerboard pattern, associated dot AD_2 also has positive polarity. Thus, the electrode of associated dot AD_2 can be coupled to switching element SE_2. However, associated dots AD_1 and AD_3 have negative polarity, as denoted by "−". In a checkerboard pattern of polarities, the color dots that are diagonally adjacent to associated dots AD_1 and AD_3 should have the appropriate polarity. Thus, in some embodiments of the present invention the electrodes of associated dots AD_1 and AD_3 are coupled to the electrodes of at least one diagonally adjacent color dot from another pixel. In the particular embodiment of pixel design 1920, the electrodes of associated dots AD_1 and AD_3 are coupled to the electrode of the color dots that are to the right and below associated dot AD_1 and AD_3, respectively. These connections are illustrated by ITO connector 1921 and 1922. As illustrated in FIG. 19(*d*), when pixel design 1920 (labeled 1920−) is in the negative dot polarity pattern, switching elements SE_1, SE_2, and SE_3, and all of the color dots have negative polarity. Associated dot AD_2 also has negative polarity. However, associated dots AD_1 and AD_3 have positive polarity.

FIG. 19(*e*) shows the positive dot polarity pattern of a spread pixel design 1930 (labeled as 1930+). As explained above, a pixel will switch between a first dot polarity pattern and a second dot polarity pattern between each image frame. Pixel design 1930 has three associated dots AD_1, AD_2, and AD_3 arranged sequentially on an associated dot row. Associated dot AD_1 is separated from associated dot AD_2 by horizontal dot spacing HDS. Similarly, associated dot AD_2 is separated from associated dot AD_3 by horizontal dot spacing HDS. Switching elements SE_1, SE_2, and SE_3 are located within associated dots AD_1, AD_2, and AD_3, respectively. In pixel design 1930, the first color component of spread pixel design 1930 has one color dot CD_1. The first color component is positioned so that color dot CD_1 is horizontally aligned with associated dot AD_1 and offset vertically above associated dot AD_1 by vertical dot offset VDO. The electrode in color dot CD_1 is coupled to switching element SE_1. The second color component of spread pixel design 1930 has one color dots CD_2. The second color component is positioned so that color dot CD_2 horizontally aligned with associated dot AD_3 and is offset vertically below associated dot AD_3 by vertical dot offset VDO. The electrode of color dot CD_2 is coupled the electrode of associated dot AD_2, which is coupled to switching element SE_2. In some embodiments of the present invention, the electrode of color dot CD_2 is coupled directly to switching element SE_2. The third color component of spread pixel design 1930 has one color dot CD_3. The third color component is positioned so that color dot CD_3 is horizontally aligned with associated dot AD_3 and vertically offset above associated dot AD_3 by vertical dot offset VDO. The electrode of color dot CD_3 is coupled to switching element SE_3.

As explained above, a checkerboard pattern of dot polarities is desirable to amplify the fringe fields in each color dot. In FIG. 19(e) pixel design 1930 is in the positive dot polarity pattern. Accordingly, switching elements SE_1, SE_2, and SE_3, and all of the color dots have positive polarity as denoted by "+". To achieve the checkerboard pattern, associated dot AD_2 also has positive polarity. Thus, the electrode of associated dot AD_2 can be coupled to switching element SE_2. However, associated dots AD_1 and AD_3 have negative polarity, as denoted by "−". In a checkerboard pattern of polarities, the color dots that are diagonally adjacent to associated dots AD_1 and AD_3 should have the appropriate polarity. Thus, in some embodiments of the present invention the electrodes of associated dots AD_1 and AD_3 are coupled to the electrodes of at least one diagonally adjacent color dot from another pixel. In the particular embodiment of pixel design 1930, the electrodes of associated dots AD_1 and AD_3 are coupled to the electrode of the color dots that are to the right and above associated dot AD_1 and AD_3, respectively. These connections are illustrated by ITO connector 1931 and 1932. As illustrated in FIG. 19(f), when pixel design 1930 (labeled 1930−) is in the negative dot polarity pattern, switching elements SE_1, SE_2, and SE_3, and all of the color dots have negative polarity. Associated dot AD_2 also has negative polarity. However, associated dots AD_1 and AD_3 have positive polarity.

Specifically, FIG. 19(a) shows the positive dot polarity pattern of a spread pixel design 1910 (labeled as 1910+). As explained above, a pixel will switch between a first dot polarity pattern and a second dot polarity pattern between each image frame. Pixel design 1910 has three associated AD_1, AD_2, and AD_3 arranged sequentially on an associated dot row. Associated dot AD_1 is separated from associated dot AD_2 by horizontal dot spacing HDS. Similarly, associated dot AD_2 is separated from associated dot AD_3 by horizontal dot spacing HDS. Switching elements SE_1, SE_2, and SE_3 are located within associated dots AD_1, AD_2, and AD_3, respectively. In pixel design 1910, the first color component of spread pixel design 1910 has one color dot CD_1. The first color component is positioned so that color dot CD_1 is horizontally aligned with associated dot AD_2 and offset vertically above associated dot AD_2 by vertical dot offset VDO. The electrode in color dot CD_1 is coupled to the electrode of associated dot AD_1, which is coupled to switching element SE_1. Alternatively, the electrode of color dot CD_1 could be coupled directly to switching element SE_1. The second color component of spread pixel design 1910 has one color dots CD_2. The second color component is positioned so that color dot CD_2 horizontally aligned with associated dot AD_2 and is offset vertically above associated dot AD_2 by vertical dot offset VDO. The electrode of color dot CD_2 is coupled to switching element SE_2. The third color component of spread pixel design 1910 has one color dots CD_3. The third color component is positioned so that color dot CD_3 is horizontally offset to the right of associated dot AD_3 by horizontal dot offset HDO and vertically offset below associated dot AD_3 by vertical dot offset VDO. The electrode of color dot CD_3 is coupled to the electrode of associated dot AD_3, which is coupled to switching element SE_3. In other embodiments of the present invention the electrode of color dot CD_3 is coupled directly to switching element SE_3.

As explained above, a checkerboard pattern of dot polarities is desirable to amplify the fringe fields in each color dot. In FIG. 19(a) pixel design 1910 is in the positive dot polarity pattern. Accordingly, switching elements SE_1, SE_2, and SE_3, and all of the color dots have positive polarity as denoted by "+". To achieve the checkerboard pattern, associated dots AD_1 and AD_3 also have positive polarity. Thus, the electrodes of associated dots AD_1 and AD_3 can be coupled to switching elements SE_1 and SE_3, respectively. However, associated dot AD_2 has negative polarity, as denoted by "−". In a checkerboard pattern of polarities, the color dots that are diagonally adjacent to associated dot AD_2 should have the appropriate polarity. Thus, in some embodiments of the present invention the electrode of associated dot AD_2 is coupled to the electrode of at least one diagonally adjacent color dot from another pixel. In the particular embodiment of pixel design 1910, the electrode of associated dot AD_2 is coupled to the electrode of the color dot that is to the right and above associated dot AD_2 as shown by ITO connector 1912. As illustrated in FIG. 19(b), when pixel design 1910 (labeled 1910−) is in the negative dot polarity pattern, switching elements SE_1, SE_2, and SE_3, and all of the color dots have negative polarity. Associated dots AD_1 and AD_3 also have negative polarity. However, associated dot AD_2 has positive polarity.

FIG. 19(i) shows a portion of a display 1900 that combines pixels using pixel designs 1910, 1920, 1930 and 1940 to create a checkerboard pattern of color dot polarities. For clarity, the gate lines and source lines that power the switching elements are omitted in FIG. 19(i). Gate lines and source lines are illustrated and described in details in other figures. Furthermore, the background area of each pixel is shaded to more clearly show the components of each pixel. This shading is for illustrative purposes only. Each odd-numbered row of display 1900 has alternating pixels of pixel design 1940 and pixel design 1920. For example in row 1, pixel P(0, 1) uses pixel design 1940 and pixel P(1, 1) uses pixel design 1920. Pixel P(2, 1) (not shown) would use pixel design 1940. Each even-numbered row of display 1900 has alternating pixels of pixels of pixel design 1930 and 1910. For example in row 0, pixel P(0, 0) uses pixel design 1930 and pixel P(1, 0) uses pixel design 1910, and pixel P(2, 0) (not shown) uses pixel design 1930. Within a row the associated dots of adjacent pixels are vertically aligned and horizontally separated by one horizontal dot spacing HDS (not labeled in FIG. 19(i)). The rows in display 1900 are horizontally aligned and vertically interleaved so that some color dots from row 0 are vertically aligned with some of the color dots of row 1. Specifically, color dot CD_1 of pixel P(0,0) is vertically aligned with color dot CD_2 of pixel P(0, 1).

All the pixels on a row have the same polarity. However, alternating rows have different polarities. Thus for example, row 0 is shown with positive dot polarity while row 1 is show with negative dot polarity. In the next frame row 0 would have negative dot polarity while row 1 would have positive dot polarity. In general, even numbered rows have a first dot polarity pattern and odd number rows have a second dot polarity pattern. Furthermore, all the switching elements on a row have the same polarity. This arrangement of row polarity is an example of switching element row inversion driving scheme. In general a pixel P(X,Y) in display 1900 uses pixel design 1940 where X is odd and Y is even; pixel design 1930 when X is even and Y is even; pixel design 1920 when X is odd and Y is odd; and pixel design 1910 where X is even and Y is odd. Furthermore, pixel P(X,Y) has a first dot polarity pattern when Y is even and a second dot polarity pattern when Y is odd.

As illustrated in FIG. 19(*i*), using the pixel designs described above, display 1900 has a checkerboard pattern of dot polarities. Thus, each color dot will have four liquid crystal domains. Because each row of switching elements have the same polarity, while alternating rows of switching elements of opposite polarity, display 1900 achieves four liquid crystal domains while only requiring a switching element row inversion driving scheme.

Various embodiments of the present invention were fabricated in the form of a 7 inch color wide VGA (WVGA) resolution display using a switching element point inversion driving scheme. WVGA has a resolution is 800 pixels in the horizontal direction and 480 pixels in the vertical direction. Thus, the color pixel size is 190.5 um in width by 190.5 um in height. Each pixel includes three color components (red, green and blue colors) using color filter materials. Thus the resolution is 2400 (800×3) color components in the horizontal direction and 480 color components in the vertical direction, each color component has a theoretical maximum size of 63.5 um in width by 190.5 um in height. However, some of this area is required for the drive component area and/or associated dots. The display includes 2400 switching elements per row and 480 rows. The drive component area for the switching element (a thin film transistor) and the storage capacitor, has a theoretical maximum size of about 63.5 um in width by 38.0 um in height. However due to horizontal and vertical dot spacings, the device component area has an actual size of about 55.5 um in width by 35.0 um.

In the display panel fabrication process, Merck vertical alignment liquid crystal (LC) is used with a negative dielectric anisotropy, such as MLC-6884. The Japan Nissan Chemical Industrial Limited (Nissan) polyimide SE-5300 with a non-rubbing process is used to fabricate the standard vertical LC alignment without the pretilt angle. Other vertical alignment polyimides (PIs) can also be used to obtain the vertical LC alignment, such as Nissan LC vertical alignment PI SE-1211, SE-7511L, RN-1566, and RN-1681, and Japan Synthetic Rubber Corporation (JSR) LC vertical alignment PI AL1H659, AL60101, JALS688-R11, JALS-2096-R14. Other vertical alignment LCs from Merck can also be used as the LC material, such as LC MLC-6008, MLC-6609, MLC-6610, MLC-6882, MLC-6883, MLC-6885, and MLC-6886. The fabrication process is a non-rubbing process and does not require high precision top to bottom substrates alignment, which is required in the fabrication process for other MVA LCDs using the protrusion or ITO slit geometry. The width of the ITO connection lines between different color dots and different device component areas is 3 um. Top and bottom polarizers are attached to the panels. The typical LC cell gap is about 2.0 to 3.5 um.

In a particular embodiment of the present invention, the display was created using the pixel designs and dot polarity patterns and the pixel arrangement of FIGS. 13(*d*)-(*f*), where each color component is divided into 3 color dots with 2 associated dots. For first color component, we used the device component area, which consists of the switching element SE_1 and the storage capacitor, as the associated dot AD_1 by adding an electrode that can be electrically biased. Thus AD_1 has a theoretical maximum size of about 63.5 um in width by 38.0 um in height. However due to horizontal and vertical dot spacings, the device component area (associated dot) has an actual size of about 55.5 um in width by 35.0 um in height. Associated dot AD_4 is an ITO dot with theoretical maximum size of about 63.5 um in width by 8.0 um in height. However due to horizontal and vertical dot spacings, the device component area has an actual size of about 55.5 um in width by 5.0 um in height. Thus each color dot has a theoretical maximum size of about 63.5 um in width by 48.2 um in height. However due to horizontal and vertical dot spacings, each color dot has an actual size of about 55.5 um in width by 45.2 um in height. Thus in the actual size, each color dot (CD_1_1, CD_1_2, and CD_1_3) for first color component is about 55.5 um in width by 45.2 um in height, the associated dot AD_1 is 55.5 um in width by 35 um in height and the associated dot AD_4 is 55.5 um in width by 5 um in height. Similarly, for the second and third color components, we have, in actual size, each color dot (CD_2_1, CD_2_2, CD_2_3, CD_3_1, CD_3_2, and CD_3_3) is about 55.5 um in width by 44.2 um in height, the associated dots AD_2 and AD_3 are 55.5 um in width by 35 um in height, and the associated dots AD_5 and AD_6 are 55.5 um in width by 5 um in height. The associated dots could be covered by the black matrix material to make them optically opaque dots.

An actual display using the principle of the present invention, produced a contrast ratio greater than 700 at an applied voltage of 5 volt. Furthermore, the display exhibited a very wide viewing angle (viewing angle cone with a contrast ratio larger than 5). The viewing angles depend on the polarizers that are attached to the panels. Four types of polarizers: the regular linear polarizers (without the MVA wide viewing optical compensation film), MVA wide viewing angle polarizer (with the MVA wide viewing optical compensation film), regular circular polarizers (without the MVA wide viewing optical compensation film), and MVA wide viewing circular polarizer (circular polarizer attached with the MVA wide viewing angle compensation films) were used to create different embodiments of the present invention. The MVA compensation films include negative birefringence uniaxial and biaxial films, with a total retardation of −100 to −300 nm. Specifically, the viewing angle is larger than ±85° in the horizontal and vertical viewing zones, and larger than ±50° in the two major diagonal viewing zones, using the normal linear polarizer without the MVA wide viewing optical compensation film. The viewing angle is larger than ±85° in all viewing zones, using the MVA wide viewing angle polarizers with the MVA wide viewing optical compensation film. The circular polarizers doubled the optical transmission compared to the transmission using linear polarizers. Moreover, both the transmission and viewing angle are enlarged using the MVA circular polarizers. Displays using associated dots in accordance to the present invention show a more stable MVA operation and faster switching on and switching off response times than similarly designed MVA panels that do not use associated dots.

Various embodiments of the present invention were fabricated in the form of a 2.2 inch color display with a quarter VGA resolution (QVGA, 240×320 color pixels), using a switching element row inversion driving scheme. The color pixel size is 141 um in width by 141 um in height. Each pixel consists of three color components (red, green and blue colors) using color filter materials). Thus, the display includes 720 (240×3) color components in the horizontal direction and 320 color components in the vertical direction. Each color component has a theoretical maximum size of 47 um in width by 141 um in height. However, some of this area is required for the device component areas and associated dots. The display includes 720 switching elements horizontally and 320 vertically for a total of 720×320 switching elements. The device component area, which consists of the switching element (thin film transistors) and the storage capacitor, has a theoretical maximum size of about 47 um in width by 38.0 um in height. However due to horizontal and vertical dot spacings, the device component area has an actual size of about 41 um in width by 35.0 um.

In the display panel fabrication process, Merck vertical alignment liquid crystal (LC) is used with a negative dielectric anisotropy, such as MLC-6884. The Japan Nissan Chemical Industrial Limited (Nissan) polyimide SE-5300 with a non-rubbing process is used to fabricate the standard vertical LC alignment without the pretilt angle. The fabrication process is a non-rubbing process and does not require high precision top to bottom substrates alignment, which is required in the fabrication process for other MVA LCDs using the protrusion or ITO slit geometry. The width of the ITO connection lines between different color dots and different device component areas is 3 um. Top and bottom polarizers are attached to the panels. The typical LC cell gap is about 2.0 to 3.5 um.

In a particular embodiment of the present invention, the display was created using the pixel design, dot polarity patterns, and pixel arrangement in accordance with FIGS. 5(a)-5(h) and FIG. 6(a), where each color component is divided into 3 color dots with one associated dot. For the first color component, the device component area, which consists of the switching element SE_1 and the storage capacitor, was electrically biased with an electrode to create associated dot AD_1. Thus AD_1 has a theoretical maximum size of about 47.0 um in width by 38.0 um in height. However due to horizontal and vertical dot spacings, the device component area has an actual size of about 41.0 um in width by 35.0 um in height. Thus each color dot has a theoretical maximum size of about 47.0 um in width by 34.3 um in height. However due to horizontal and vertical dot spacings, each color dot has an actual size of about 41.0 um in width by 31.3 um in height. Thus in the actual size, each color dot (CD_1_1, CD_1_2, and CD_1_3) for first color component is about 41.0 um in width by 31.3 um in height, and the associated dot AD_1 is 41.0 um in width by 35 um in height. Similarly, for the second and third color components, we have, in actual size, each color dot (CD_2_1, CD_2_2, CD_2_3, CD_3_1, CD_3_2, and CD_3_3) is about 41.0 um in width by 31.3 um in height, and the associated dots AD_2 and AD_3 are 41.0 um in width by 35 um in height.

The display produced a contrast ratio greater than 600 at an applied voltage of 5 volt. Furthermore the display exhibited a very wide viewing angle of greater than ±85° in all viewing zones using the MVA wide viewing angle polarizer. Specifically, the viewing angle is greater than ±85° in the horizontal and vertical viewing zones, and greater than ±50° in the two major diagonal viewing zones, using the normal linear polarizer without the MVA wide viewing optical compensation film. The circular polarizers doubled the optical transmission compared to the transmission using linear polarizers. Moreover, both the transmission and viewing angle are enlarged using the MVA circular polarizers. Displays using associated dots in accordance to the present invention show a more stable MVA operation and faster switching on and switching off response times than similarly designed MVA panels that do not use associated dots.

Even though, MVA LCDs in accordance with the present invention provide wide viewing angle at a low cost, some embodiments of the present invention use optical compensation methods to further increase the viewing angle. For example, some embodiments of the present invention use negative birefringence optical compensation films with vertical oriented optical axis on the top or bottom substrate or both top and bottom substrates to increase viewing angle. Other embodiments may use uniaxial optical compensation films or biaxial optical compensation films with a negative birefringence. In some embodiments, positive compensation films with a parallel optical axis orientation can add to the negative birefringence film with a vertical optical axis orientation. Furthermore, multiple films that include all combinations could be used. Other embodiments may use a circular polarizer to improve the optical transmission and viewing angle. Other embodiments may use a circular polarizer with the optical compensation films to further improve the optical transmission and viewing angle.

In the various embodiments of the present invention, novel structures and methods have been described for creating a multi-domain vertical alignment liquid crystal display without the use of physical features on the substrate. The various embodiments of the structures and methods of this invention that are described above are illustrative only of the principles of this invention and are not intended to limit the scope of the invention to the particular embodiment described. For example, in view of this disclosure those skilled in the art can define other pixel definitions, dot polarity patterns, pixel designs, polarities, fringe fields, electrodes, substrates, films, and so forth, and use these alternative features to create a method, or system according to the principles of this invention. Thus, the invention is limited only by the following claims.

What is claimed is:

1. A pixel of a liquid crystal display comprising:
   a first color component having a first first-component color dot, wherein the first first-component color dot has an electrode;
   a first switching element coupled to the electrode of the first first-component color dot and configured to drive the electrode of the first first-component color dot to a first polarity;
   a first associated dot having an electrode, wherein the first switching element is located within the first associated dot; and
   an associated dot switching element coupled to the electrode of the first associated dot and configured to drive the electrode of the first associated dot to a second polarity.

2. The pixel of claim 1, wherein the first associated dot is horizontally aligned with the first first-component color dot and vertically separated from the first first-component color dot by at least a vertical dot spacing.

3. The pixel of claim 1, wherein the first associated dot is below the first first-component color dot.

4. The pixel of claim 1, further comprising a second associated dot vertically aligned with the first associated dot and separated from the first associated dot by at least a horizontal dot spacing, wherein the second associated dot includes an electrode coupled to the associated dot switching element.

5. The pixel of claim 4, further comprising
a second color component having a first second-component color dot, wherein the first second-component color dot includes an electrode;
a second switching element coupled to the electrode of the first second-component color dot.

6. The pixel of claim 5, wherein
the first second-component color dot is vertically aligned with the first first-component color dot;
the first second-component color dot is horizontally aligned with the second associated dot; and
the second switching element is configured to drive the electrode of the first second-component color dot to the first polarity.

7. The pixel of claim 6 wherein the first color component further comprises a second first-component color dot having an electrode coupled to the first switching element and wherein the first associated dot is located between the first first-component color dot and the second first-component color dot.

8. The pixel of claim 7 wherein the second color component further comprises a second second-component color dot having an electrode coupled to the second switching element and wherein the second associated dot is located between the first second-component color dot and the second second-component color dot.

9. The pixel of claim 8, further comprising
a third associated dot vertically aligned with the second associated dot and separated from the second associated dot by at least the horizontal dot spacing, wherein the third associated dot includes an electrode coupled to the associated dot switching element;
a third color component comprising a first third-component color dot having an electrode and a second third component color dot having an electrode, wherein the third associated dot is located between the first third-component color dot and the second third-component color dot; and
a third switching element located within the third associated dot, wherein the third switching element is coupled to the electrode of the first third-component color dot and the electrode of the second third-component color dot, and wherein the third switching element is configured to drive the electrode of the first third-component color dot and the electrode of the second third-component color dot to the first polarity.

10. The pixel of claim 8, further comprising a third associated dot having an electrode configured to have the second polarity, wherein the third associated dot is horizontally aligned with the first associated dot, and wherein the second first-component color dot is located between the first associated dot and the third associated dot.

11. The pixel of claim 10, wherein the electrode of the third associated dot is coupled to the associated dot switching element.

12. The pixel of claim 10, wherein the first color component further comprises a third first-component color dot having an electrode coupled to the first switching element, wherein the third associated dot is located between the third first-component color dot and the second first-component color dot.

13. The pixel of claim 12, wherein the electrode of the third first-component color dot is coupled to the first switching element via the electrode of the second first-component color dot.

14. The pixel of claim 12, further comprising:
a fourth associated dot having an electrode configured to have the second polarity, wherein the fourth associated dot is vertically aligned with the third associated dot and horizontally aligned with the second associated dot; and
wherein the second color component further comprises a third second-component color dot having an electrode coupled to the second switching element, and wherein the fourth associated dot is located between the second second-component color dot and the third second-component color dot.

15. The pixel of claim 14, further comprising:
a fifth associated dot having an electrode configured to have the second polarity, wherein the fifth associated dot is vertically aligned with the second associated dot;
a sixth associated dot having an electrode configured to have the second polarity, wherein the sixth associated dot is vertically aligned with the fourth associated dot and horizontally aligned with the fifth associated dot;
a third color component comprising a first third-component color dot, a second third-component color dot, and a third third-component color dot, wherein
the first third-component color dot is vertically aligned with the first second-component color dot and horizontally aligned with the fifth associated dot;
the second third-component color dot is vertically aligned with the second second-component color dot and horizontally aligned with the fifth associated dot; and
the third third-component color dot is vertically aligned with the third second-component color dot and horizontally aligned with the fifth associated dot; and
a third switching element coupled to an electrode of the first third-component color dot, an electrode of the second third-component color dot; and an electrode of the third third-component color dot; wherein the third switching element is configured to drive the first third-component color dot, the second third-component color dot and the third third-component color dot to the first polarity.

16. The pixel of claim 15, wherein the associated dot switching element is coupled to the electrode of the third associated dot, the electrode of the fourth associated dot, the electrode of the fifth associated dot, and the electrode of the sixth associated dot.

17. The pixel of claim 8, further comprising:
a third associated dot having an electrode configured to have the second polarity, wherein the third associated dot is horizontally aligned with the first associated dot, and wherein the second first-component color dot is located between the first associated dot and the third associated dot; and
a fourth associated dot having an electrode configured to have the second polarity, wherein the fourth associated dot is horizontally aligned with the second associated dot and vertically aligned with the third associated dot.

18. The pixel of claim 1, wherein the associated dot switching element is coupled to an electrode of an associated dot of a second pixel.

19. A display comprising:
a first pixel comprising:
a first first-pixel color component having a first first-pixel first-component color dot, wherein the first first-pixel first-component color dot has an electrode;
a first first-pixel switching element coupled to the electrode of the first first-pixel first-component color dot and configured to drive the electrode of the first first-pixel first-component color dot to a first polarity; and a first first-pixel associated dot having an electrode, wherein the first first-pixel switching element is located within the first first-pixel associated dot; and a second pixel comprising:
   a first second-pixel color component having a first second-pixel first-component color dot, wherein the first second-pixel first-component color dot has an electrode;
   a first second-pixel switching element coupled to the electrode of the first second-pixel first-component color dot and configured to drive the electrode of the first second-pixel first-component color dot to the first polarity; and
   a first second-pixel associated dot having an electrode, wherein the first second-pixel switching element is located within the first second-pixel associated dot and wherein the first second-pixel associated dot is vertically aligned with the first first-pixel associated dot; and
a first associated dot switching element coupled to the electrode of the first first-pixel associated dot and the electrode of the first second-pixel associated dot, wherein the first associated dot switching element is configured to drive the electrode of the first first-pixel associated dot and the electrode of the first second-pixel associated dot to a second polarity.

20. The display of claim 19,
wherein the first first-pixel color component further comprises a second first-pixel first-component color dot having an electrode coupled to the first first-pixel switching element, wherein the first first-pixel associated dot is located between the first first-pixel first-component color dot and the second first-pixel first component color dot; and
wherein the first second-pixel color component further comprises a second second-pixel first-component color dot having an electrode coupled to the first second-pixel switching element, wherein the first second-pixel associated dot is located between the first second-pixel first-component color dot and the second second-pixel first component color dot.

21. The display of claim 20, wherein
the first pixel further comprises:
   a second first-pixel color component having a first first-pixel second-component color dot and a second first-pixel second-component color dot, wherein the first first-pixel second-component color dot has an electrode and the second first-pixel second component color dot has an electrode;
   a second first-pixel switching element coupled to the electrode of the first first-pixel second-component color dot and the electrode of the second first-pixel second-component color dot and configured to drive the electrode of the first first-pixel second-component color dot and the electrode of the second first-pixel second-component color dot to a first polarity; and
   a second first-pixel associated dot having an electrode coupled to the first associated dot switching element, wherein the second first-pixel switching element is located within the second first-pixel associated dot, and wherein the second first-pixel associated dot is vertically aligned with the first first-pixel associated dot and located between the first first-pixel second-component color dot and the second first-pixel second-component color dot; and wherein the second pixel further comprises:
   a second second-pixel color component having a first second-pixel second-component color dot and a second second-pixel second-component color dot, wherein the first second-pixel second-component color dot has an electrode and the second second-pixel second-component color dot has an electrode;
   a second second-pixel switching element coupled to the electrode of the first second-pixel second-component color dot and the electrode of the second second-pixel second component color dot and configured to drive the electrode of the first second-pixel second-component color dot and the electrode of the second second-pixel second component color dot to the first polarity; and
   a second second-pixel associated dot having an electrode coupled to the first associated dot switching element, wherein the second second-pixel switching element is located within the second second-pixel associated dot and wherein the second second-pixel associated dot is vertically aligned with the first second-pixel associated dot and located between the first second-pixel second-component color dot and the second second-pixel second-component color dot.

22. The display of claim 20 further comprising:
a third pixel comprising:
   a first third-pixel color component having a first third-pixel first-component color dot, wherein the first third-pixel first-component color dot has an electrode;
   a first third-pixel switching element coupled to the electrode of the first third-pixel first-component color dot and configured to drive the electrode of the first third-pixel first-component color dot to the second polarity; and
   a first third-pixel associated dot having an electrode, wherein the first third-pixel switching element is located within the first third-pixel associated dot and wherein the first third-pixel associated dot is horizontally aligned with the first first-pixel associated dot;
a fourth pixel comprising:
   a first fourth-pixel color component having a first fourth-pixel first-component color dot, wherein the first fourth-pixel first-component color dot has an electrode;
   a first fourth-pixel switching element coupled to the electrode of the first fourth-pixel first-component color dot and configured to drive the electrode of the first fourth-pixel first-component color dot to the second polarity; and
   a first fourth-pixel associated dot having an electrode, wherein the first fourth-pixel switching element is located within the first fourth-pixel associated dot and wherein the first fourth-pixel associated dot is vertically aligned with the first second-pixel associated dot; and
a second associated dot switching element coupled to the electrode of the first third-pixel associated dot and the electrode of the first fourth-pixel associated dot, wherein the second associated dot switching element is configured to drive the electrode of the first third-pixel associated dot and the electrode of the first fourth-pixel associated dot to the first polarity.

23. The display of claim 22, wherein the first pixel and the second pixel are on a first row of pixels and the third pixel and the fourth pixel are on a second row of pixels and wherein the first row of pixels is adjacent to the second row of pixels.

24. The display of claim 23, further comprising
a plurality of first row pixels, wherein the first pixel and the second pixel are part of the plurality of first row pixels;
a first row associated dot electrode coupled to the first associated dot switching element and to associated dots of the plurality of first row pixels;
a plurality of second row pixels, wherein the third pixel and the fourth pixel are part of the plurality of second row pixels; and
a second row associated dot electrode coupled to the second associated dot switching element and to associated dots of the plurality of second row pixels.

25. The display of claim 20,
wherein the first pixel further comprises
   a second first-pixel associated dot having an electrode coupled to the first associated dot switching element;
   wherein the first first-pixel color component further comprises a third first-pixel first-component color dot having an electrode coupled to the first first-pixel switching element, wherein the second first-pixel associated dot is located between the second first-pixel first-component color dot and the third first-pixel first component color dot; and
wherein the second pixel further comprises
   a second second-pixel associated dot having an electrode coupled to the first associated dot switching element;
   wherein the first second-pixel color component further comprises a third second-pixel first-component color dot having an electrode coupled to the first second-pixel switching element, wherein the second second-pixel associated dot is located between the second second-pixel first-component color dot and the third second-pixel first component color dot.

* * * * *